United States Patent [19]

Hepp

[11] 4,357,660

[45] Nov. 2, 1982

[54] FORMATION DIP AND AZIMUTH PROCESSING TECHNIQUE

[75] Inventor: Vincent R. Hepp, Ridgefield, Conn.

[73] Assignee: Schlumberger Technology Corporation, New York, N.Y.

[21] Appl. No.: 465,951

[22] Filed: May 1, 1974

[30] Foreign Application Priority Data

May 1, 1973 [GB] United Kingdom .............. 20610/73
Apr. 1, 1974 [GB] United Kingdom .............. 14306/74

[51] Int. Cl.$^3$ .............................................. G01V 3/18
[52] U.S. Cl. ..................................... 364/422; 33/302; 33/303; 324/323; 324/347; 364/300
[58] Field of Search ............... 33/302, 303; 235/151.3; 324/1, 323, 347, 354; 444/1; 364/422, 300

[56] References Cited

U.S. PATENT DOCUMENTS

3,309,607  3/1967  Yungul ..................................... 324/1
3,466,532  9/1969  Kolb ......................................... 324/1

OTHER PUBLICATIONS

Matthews et al., Supplementary Computer Programs for Dipmeter Analysis, 1965 PWLA Conference, pp. 1–19.

*Primary Examiner*—Charles E. Atkinson
*Attorney, Agent, or Firm*—Cooper, Dunham, Clark, Griffin & Moran

[57] ABSTRACT

Illustrative embodiments of the present invention include methods and apparatus for processing measurements indicative of the dip and azimuth of formation features at various depths in a borehole to produce three-dimensional representations of the formation features. These three-dimensional representations may be in the form of two-dimensional presentations of apparent dip traces for various depths in one or more planes. The apparent dips may be varied with distance from the borehole in accordance with information derived from dips above and below a selected dip. The three-dimensional representations may also take the form of a contour map of a formation surface around the borehole which represents a three-dimensional structural model derived from dips above and below the contoured formation surface.

Dip and azimuth variations over a given interval are used to define a family of surfaces in a three-dimensional reference system. Each dip represents a possible tangent plane to one of the surfaces at its intersection with the borehole. Dips are statistically analyzed to define a structural model, such as intersecting or faulted planes or cylindrical folds. Once a model is defined, the position of any surface in the model with direction and distance away from the borehole may be found and represented as variations in apparent dip in a given azimuth or as variations in dip or contour lines.

A statistical analysis of combined dip and azimuth variations determines a dominant mode for a dip distribution which corresponds to the structural dip for an automatically determined interval, even though the interval may also contain many dips corresponding to stratigraphic or depositional features.

46 Claims, 33 Drawing Figures

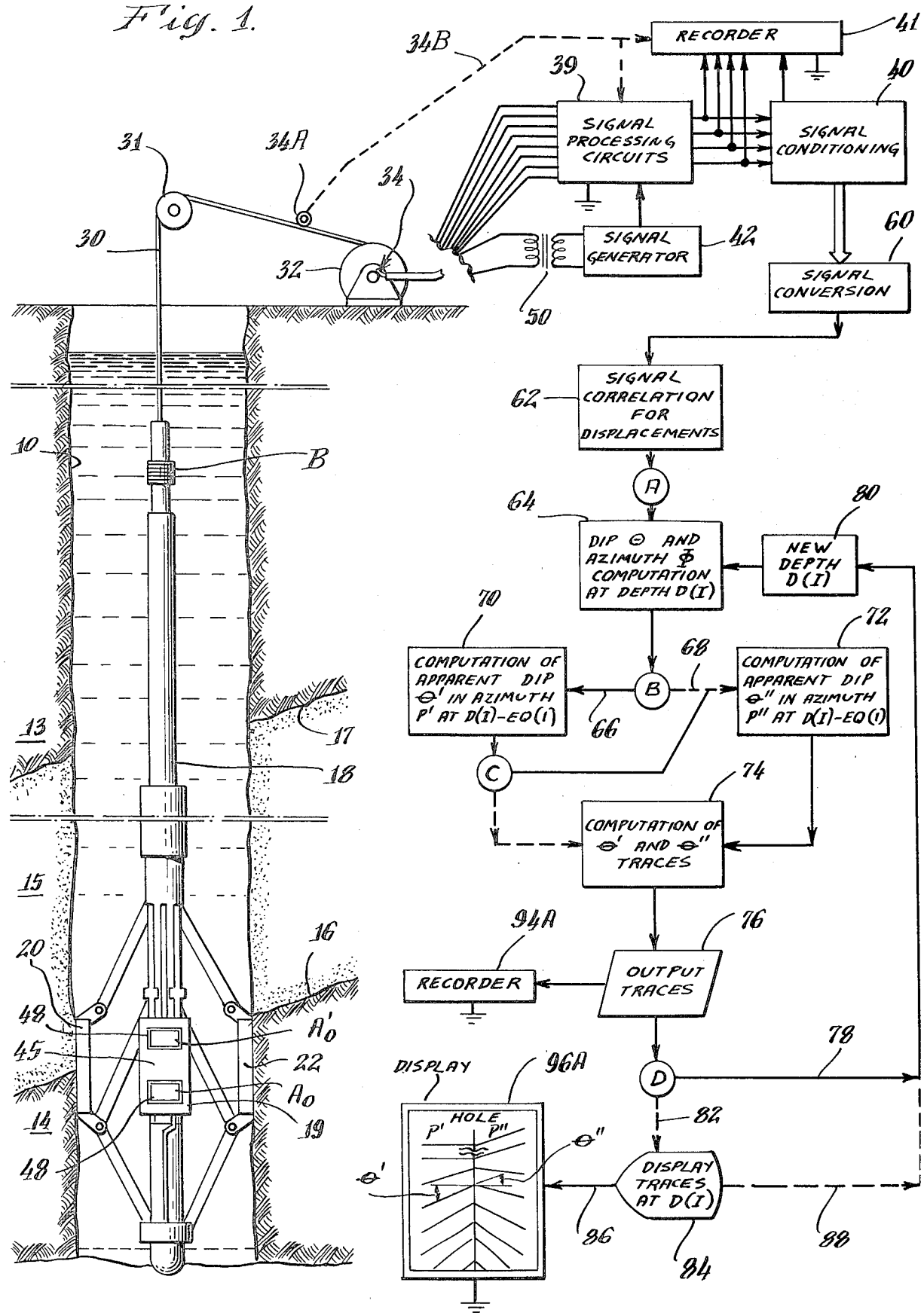

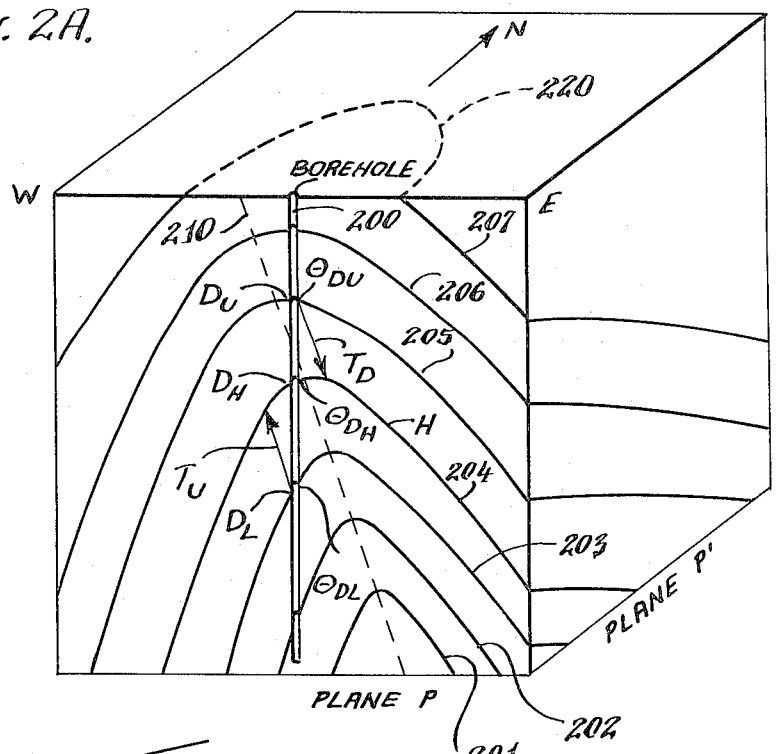
Fig. 2A.
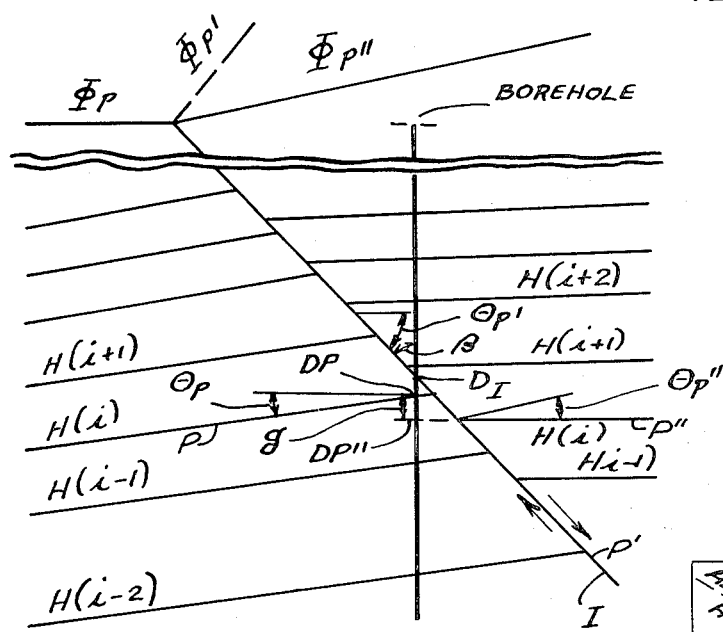
Fig. 4A.
Fig. 4B.
h IS IN PLANE P AT X(P), Y(P)
h' IS IN PLANE P' AT X(P'), Y(P')
h" IS IN PLANE P" AT X(P"), Y(P")
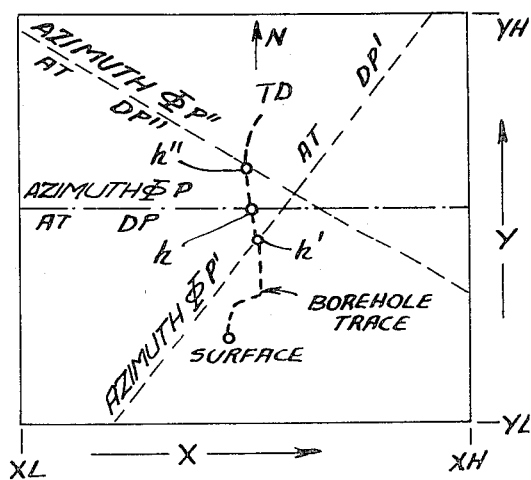

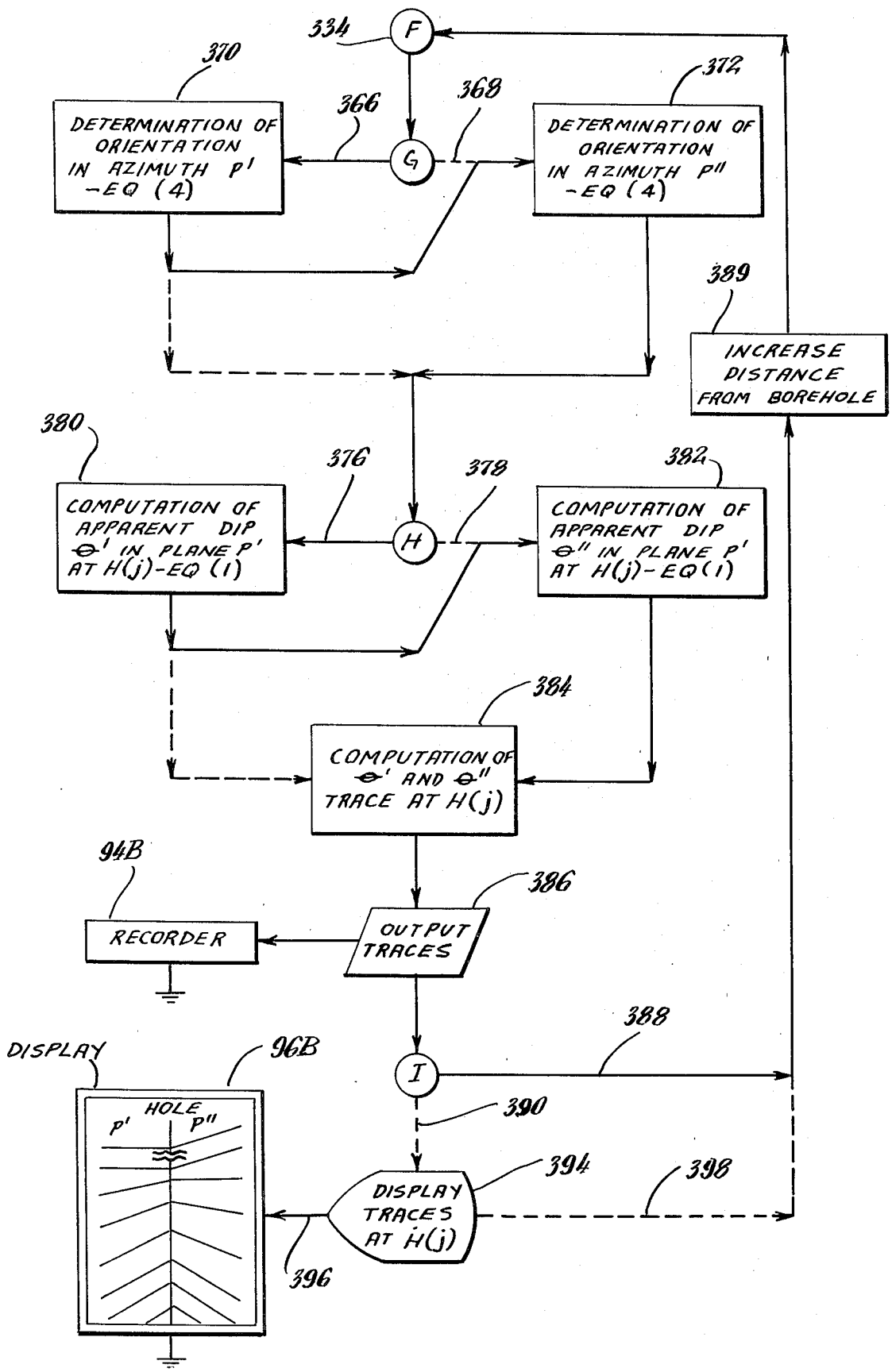

$\Delta S = (D_U - D_S) \cos \beta$
$\Delta S = X \tan \alpha_U$ $(D_L - D_S) \cos \beta = X \tan \alpha_L$
$(D_U - D_S) \cos \beta = X \tan \alpha_L - X \tan \alpha_U$
$h \cos \beta = X (\tan \alpha_L - \tan \alpha_U)$ $$X = \frac{h \cos \beta}{\tan \alpha_L - \tan \alpha_U}$$

$h = D_L - D_U$ (NOT TO SCALE OF FIG. 4C)

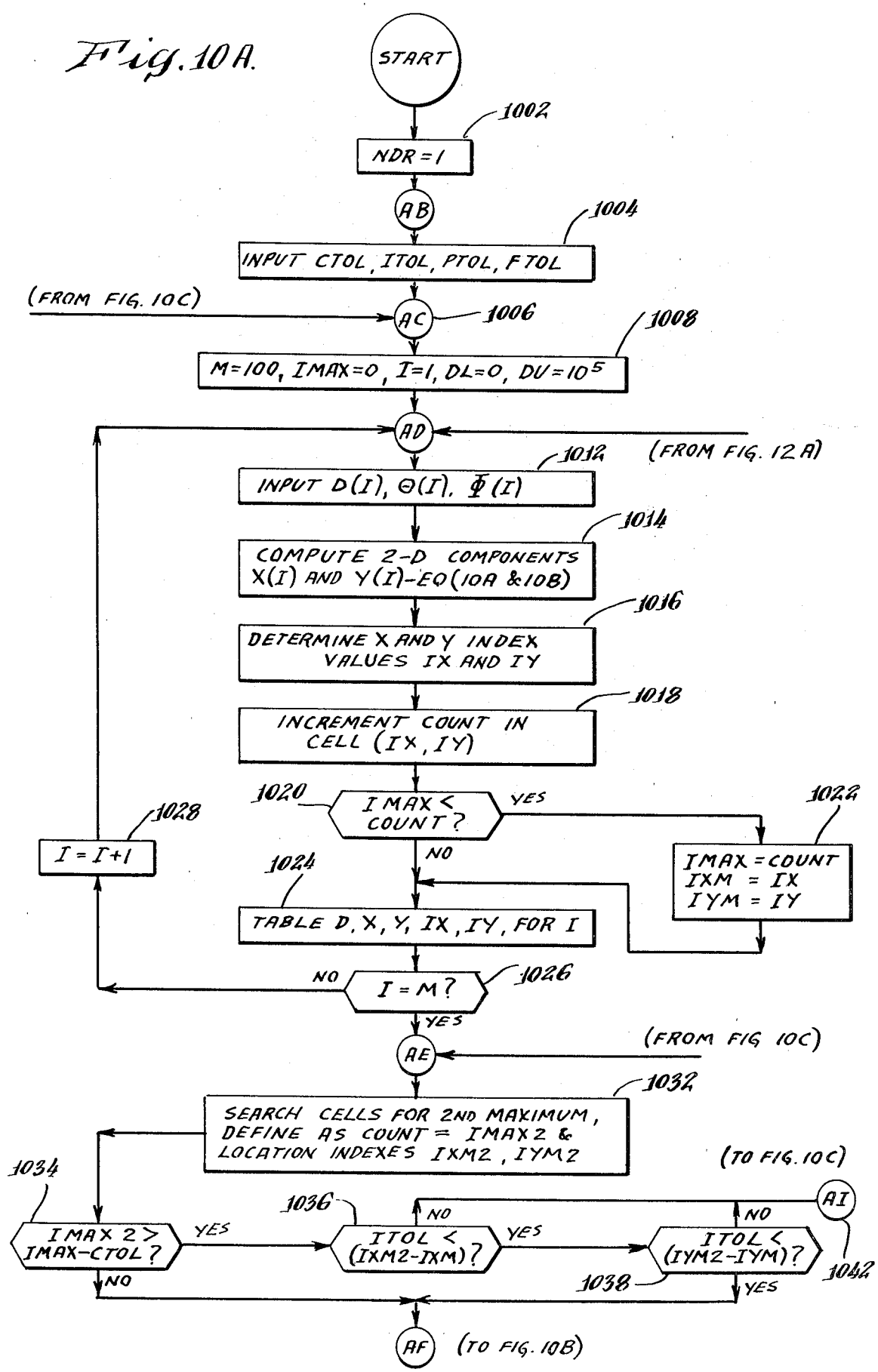

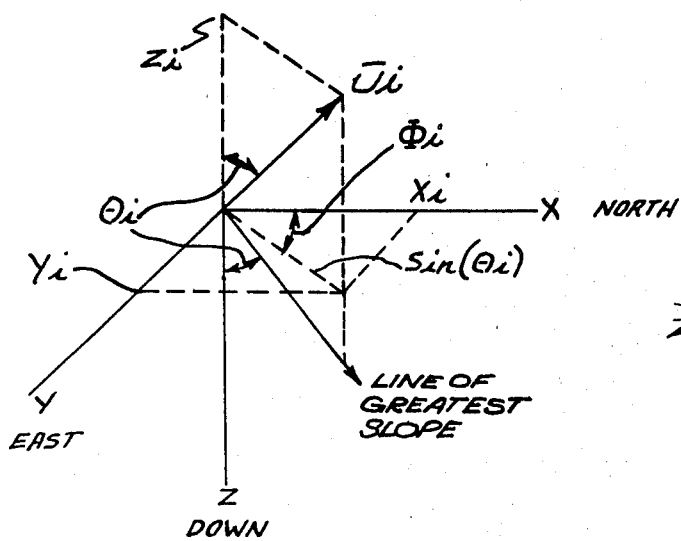

$X_i = \sin(\Theta_i)\cos(\Phi_i)$
$Y_i = \sin(\Theta_i)\sin(\Phi_i)$
$Z_i = -\cos(\Theta_i)$

*Fig. 11A.*

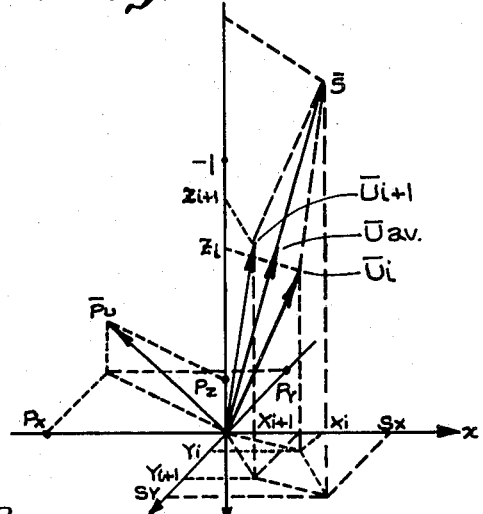

*Fig. 11B.*

$\bar{U}_{av} \begin{cases} U_X = \Sigma x_i/R \\ U_Y = \Sigma y_i/R \\ U_Z = \Sigma z_i/R \end{cases}$ $R = \sqrt{(\Sigma x_i)^2 + (\Sigma y_i)^2 + (\Sigma z_i)^2}$ $\bar{P}_U \begin{cases} P_{XU} = P_X/L \\ P_{YU} = P_Y/L \\ P_{ZU} = P_Z/L \end{cases}$ $\bar{P} \begin{cases} P_X = Y_i Z_{i+1} - Y_{i+1} Z_i \\ P_Y = Z_i X_{i+1} - Z_{i+1} X_i \\ P_Z = X_i Y_{i+1} - Z_{i+1} Y_i \end{cases}$ $L = \sqrt{P_X^2 + P_Y^2 + P_Z^2}$

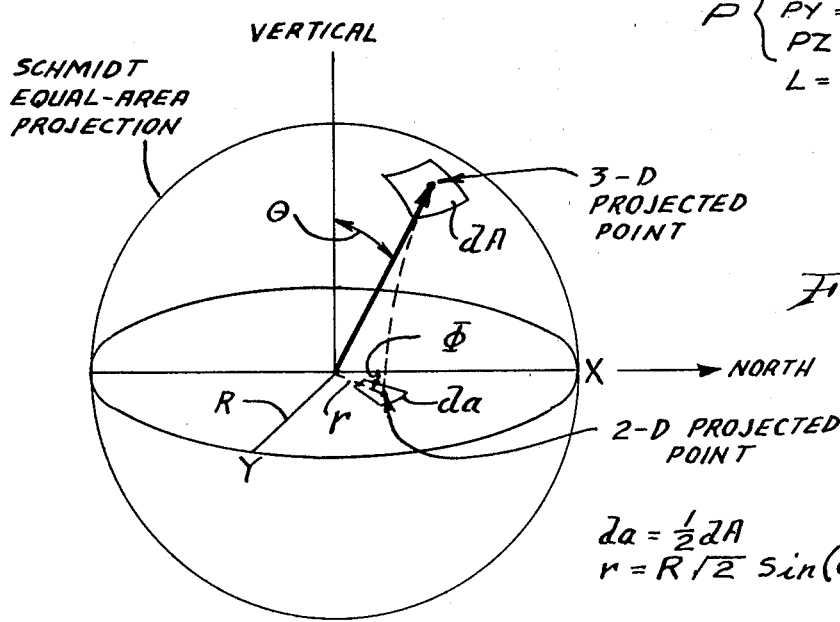

*Fig. 11C.*

$da = \tfrac{1}{2} dA$
$r = R\sqrt{2}\sin(\Theta/2)$

FORMATION DIP AND AZIMUTH PROCESSING TECHNIQUE

BACKGROUND OF THE INVENTION

This invention relates generally to techniques used in dipmeter well logging, and more particularly to new techniques for automatically processing dip and azimuth measurements to produce more useful three-dimensional representations of subsurface formations.

A common method of measuring the dip angle and direction or azimuth of subsurface formations employs a dipmeter tool passed through a borehole drilled into the subsurface formations. This tool may apply any of numerous means to obtain signals representative of variations of a particular formation characteristic, such as its resistivity. One such tool is described in the paper: "The High Resolution Dipmeter Tool", by L. A. Allaud and J. Ringot, published in the May-June 1969 issue of *The Log Analyst*.

Dip and azimuth measurements representing the inclination of a formation feature may be determined from dipmeter signals containing information representing the intersection of such a feature at three or more radially spaced points on the borehole surface. The displacement between two points intersecting a common feature may be determined by correlating corresponding pairs of the dipmeter signals each representing the common feature in the correlated portion of the signals. Two displacements between three different points determine the position of a plane. The position of the plane is conveniently expressed by its dip Θ, an angle measured from a horizontal plane, and its azimuth Φ, an angle measured from a reference direction (usually true North).

Typically, the dipmeter signals are recorded on computer compatible magnetic tape at the well site for later processing. The recorded signals are processed using any of several techniques. Manual, semi-automatic and fully automatic processing may be used with the automatic processing being performed with either analog or digital computers. When digital computers are used, a computer program is also required.

A computer program to perform the digital processing operations is described in a paper, "Automatic Computation of Dipmeter Logs Digitally Recorded on Magnetic Tape" by J. H. Moran, et al. and published in the July, 1962 issue of the *Journal of Petroleum Technology*. An additional computer program is described in the paper, "Computer Methods of Diplog Correlation" by L. G. Schoonover, et al., pages 31-38, published in the February 1973 issue of *Society of Petroleum Engineers Journal*. Further, programs to process digitally-taped dipmeter data may be obtained from digital computer manufacturers, such as IBM.

Results from digital processing are normally presented in tabular listings of dip and azimuth measurements versus borehole depth. However, when large numbers of such measurements result, as from recent high resolution dipmeter techniques, such listings are usually augmented by graphic presentations to allow easier interpretations of these measurements.

The interpretation of dip and azimuth measurements is directed toward two general objectives, the determination of either stratigraphic or structural features. Stratigraphic features of interest are typically depositional in nature, such as the type of deposition, internal cross bedding, direction of transport, thickening, etc., of the particular stratigraphic bed. Structural features of interest are the type of structure, the nature of its controlling feature such as a fault, plane, fold axis, its symmetry, etc., and the orientation of this feature, i.e., its dip, azimuth, depth and distance from the borehole, for example.

Graphic displays or dip and azimuth representations vary with the interpretation objective. Accordingly, relationships between corresponding dip and azimuth measurements with depth and distance are considered in different manners.

For stratigraphic purposes, the trends of adjacent dip measurements with depth are usually used to classify the measurements into groups for analytical purposes. For example, dips representing a trend of rapidly increasing dip with depth will be considered separately from dips representing a trend of rapidly decreasing dip with depth. A trend of increasing dips with depth in a given direction is usually attributed to crossbedding characteristic of channel fill deposition and is often referred to as "red" patterns in this art. Similarly, a trend of decreasing dip with depth in a given direction is usually attributed to current bedding, as found in thin sedimentary structures, and is often referred to as "blue" patterns.

In the stratigraphic analysis, it is important that the azimuth of these dips must remain substantially constant and thereby represent the general direction of sediment transport or perhaps the probable direction of down dip thickening. Also, dipmeter results are combined in a given analysis from relatively short depth intervals corresponding to a given depositional or stratigraphic unit.

Thus graphic displays used for stratigraphic analysis often ignore the actual depths once the above dip versus depth trend qualifies a group of measurements. Further, since in many cases the actual dip angle is not important and only the dip azimuth is significant, the dip angle may be completely ignored in the graphic display. Such displays are designed to statistically determine the azimuth corresponding to a primary and perhaps a secondary direction of transport or deposition.

Graphic displays used in stratigraphic analysis are typically the azimuth frequency plot (no dip or depth representation) and the Schmidt net and the Stereonet (azimuth versus dip but still no depth representation). These nets and several variations thereof have certain statistical characteristics in that they may be used to enhance either low or high dip measurement point groupings. Note that each given dip and azimuth measurement is combined and represented by a point in these nets. A description of some of these displays and their application is given in the paper "Stratigraphic Applications of Dipmeter Data in Mid-Continent" by R. L. Campbell, Jr., published September 1968 in the *American Association of Petroleum Geologists Bulletin*.

Stratigraphic and structural analyses distinguish themselves in the type of information needed. In stratigraphic analysis, the dipmeter signals hopefully represent bedding planes within the boundaries of a given stratigraphic unit. These bedding planes have little, if any, regional extent. In structural analysis, a deliberate attempt may be made to mask out such sedimentary features in favor of enhancing the boundaries of the individual strata. Here these boundaries have large regional extensions which are of interest in mapping.

Short lengths (1 to 2 or 3 feet) of dipmeter signals are correlated to obtain stratigraphic information while long lengths (10 to 20 or 30 feet) of signals are often correlated to obtain structural information. While use of long correlation lengths to obtain structural dip has been standard practice for some time, there are certain disadvantages associated with this practice. One is that the use of long correlation lengths masks dip patterns needed for stratigraphic analysis, thus additional computations must be made using a short length to obtain stratigraphic information. Another is that most long correlation length techniques may be influenced by frequently occurring stratigraphic features having a common dip and direction, even though each such feature is less pronounced than the structural features. Thus, the use of long correlation lengths does not assure obtaining accurate structural dip information. Yet another disadvantage is that current correlation techniques tend to ignore possibly objectionable effects of rotation of the recording tool within the long correlation interval.

Accordingly, it is therefore an object of the present invention to provide a technique of determining more accurate structural information without necessitating long correlation lengths.

In some cases dip and azimuth measurements derived from short correlation lengths are averaged over a given interval to obtain a representative dip for the interval which, under some circumstances, might be regarded as structural dip. Even though intervals for such averaging may be selected to contain measurements more-or-less conforming to an expected structural dip and azimuth in order to improve the result, this selection process requires considerable manual study. This adds both time delays and expense to the process.

It is, therefore, an additional object of the present invention to provide an automatic technique to accurately determine structural information without the necessity to pre-select the dip and azimuth intervals.

Structural dip measurements are often associated with patterns, as are the stratigraphic dips. For example, long intervals of relatively constant dip and azimuth are known as "green" patterns in this art. However, when individual bed boundaries, which may have been substantially parallel when deposited, are subsequently folded, faulted, rotated or warped in some manner, the dip angles will change from bed to bed. If, in addition, the now non-parallel boundaries are tilted, the azimuth measurements of the boundaries will also change from bed to bed. Such structural distortion tends to complicate both the stratigraphic and structural pattern recognition methods.

Special techniques are required in using graphic displays for dip pattern recognition where structural changes impose changes in the expected dip and/or azimuth trends. In some cases, the structural change can be regarded simply as a general tilting of a stratigraphic section, for example. This change can be represented by a known tilt angle and direction. In such cases, it is possible to remove this tilt from the dip and azimuth measurements throughout the entire affected interval before using these measurements in the previously mentioned graphic displays.

However, when the structural change cannot be represented by a single tilt angle and direction; i.e., represented by a change in a single dimension, or this change is undefined, there may be problems in defining and representing the structural change with depth and in the removal of the varying degree of structural change from each stratigraphic unit.

Therefore, a further object of the present invention is to provide a technique of determining representations of structural features which reflect changes in more than one dimension, for example, where the tilt angle and/or direction changes with depth.

Structural changes, varying with both depth and direction, also complicate graphic representations of dip and/or azimuth with depth. For instance, the prior art practice of representing apparent dips in a given direction versus depth—sometimes known as STICK plots because of their appearance—give an inaccurate indication when changes in both dip and direction take place with depth. For example, a change in dip may be indicated when only a change in the direction of the dip takes place. In this sense, such plots are only two-dimensional representations in that they only represent dip in one plane versus depth.

The above limitation of displaying dips versus depth in only one given direction is somewhat overcome in a graphic display known as a FAST plot. Here the dips are traced on a cylinder with its axis scaled versus depth, such that the apparent dips are viewable in whatever given direction the viewer positions the cylinder. However, the viewer can only contemplate one direction at a time.

Accordingly, it is an object of the present invention to provide a technique for producing graphic representations of changes in dip and azimuth measurements with depth in more than one direction or plane at a time.

In addition to changes of dip and azimuth with depth, it is useful to study changes with distance from the borehole. Toward this end, the geological cross-section or the contour map is frequently employed. Either may be regarded as a map. The cross-section is a map of traces representing the intersection of formation surface with a substantially vertical plane aligned in a given direction, thus representing apparent dip of the surface with depth and distance measured in the plane of a given horizon. The contour map is a map of traces representing the intersection of a formation surface with a horizontal plane, thus representing changes in depth with direction and distance; i.e., with various N-S and E-W coordinates. Since three dimensions are represented in such maps, we define such representations as three-dimensional representations, even though they are usually presented as two-dimensional plots.

The cross-section is a useful graphic representation of dips of formations with depth in a given direction over a substantial distance away from a given borehole. It may also be useful to relate formations found in two or more boreholes included in substantially the same vertical plane. A STICK plot constructed in this plane from dips in one or more of the boreholes facilitates the drawing of such a cross-section. When the formations are planar, the dips represented by these plots determine the slope of the lines corresponding to formations extending away from the borehole representations.

However, when the dip of the same formation is shown to vary from borehole to borehole, as shown by different dips on the STICK plots or as confirmed by correlation of a given formation from borehole to borehole, the formations can no longer be considered as planes. The construction of the cross-sections where dips vary with distance; i.e., non-planar surfaces, thus becomes much more complex, as straight line extrapolations of the dip away from the borehole are no longer accurate.

It is therefore an additional object of the present invention to provide a technique for producing graphic representations of changes in dip with distance away from a borehole in a given direction or azimuth.

Maps are standard tools in structural geology. They may represent any three given parameters or dimensions. Two dimensions are usually geographical coordinates. The third dimension may vary with the type of map. For example, the common topographical map represents the three dimensions of the actual earth's surface. The elevation of the surface is the third dimension in this case.

The depth of a given formation surface or stratigraphic horizon measured from an arbitrary reference plane, such as sea level, is frequently used as the third parameter of dimension in structural mapping. Where this horizon reflects structural information, such a map may properly be regarded as a structure contour map. Here, equal-depth or depth contour lines parallel the dip strike lines; i.e., ±90° to the direction of the dip angle. The distance between contour lines varies according to the dip angle. Shallow dips are indicated by widely spaced lines and steep dips by closely spaced lines.

Dip measurements play an important part in creating structure contour maps. A representative dip and azimuth measurement is derived for the horizon being contoured. This dip angle is projected from the borehole position in the direction indicated by the dip azimuth. Contour lines are then positioned along this line at a spacing consistent with the dip angle.

Contour lines are rarely straight. Straight lines only result when the surface being mapped is a simple tilted plane. Nature is rarely so simple. Even horizons which may have been originally planar are subjected to structural changes such as folding, faulting and drape. These changes are of interest in hydrocarbon exploration in that they form potential traps for the hydrocarbons. Thus, determining the direction and degree of curvature of contour lines is fundamental to structural mapping.

Prior art methods of contouring frequently employ additional geophysical information such as seismic data obtained from surface exploration methods. Information from other boreholes are also used, such as the map locations, depth of intersection and dip of the surface being mapped. Contour lines are arbitrarily curved to match any difference in dips at each borehole.

There have been prior art attempts to extract guidance in contouring a given horizon from dip and azimuth measurements in a single borehole taken from above and below the horizon of interest. For example, the document, "Fundamentals of Dipmeter Interpretation" published in 1970 by Schlumberger Ltd., New York, N.Y. suggests there is a way to translate such information into a structural contour map when varying dip with a constant azimuth and varying dip with a varying azimuth are observed (see pages 84-87). A concept of "wall image on the structural horizon" is mentioned.

The above concept assumes all structural horizons are isometric reproductions of each other. An axial plane must exist which defines the major features of the structure. This plane must not parallel the borehole if dipmeter measurements are to be useful in defining the structure. The well image is visualized by making the shortest possible translation of each horizon parallel to the axial plane which will, in effect, reduce the thickness of each horizon to zero. This gives a well image which is essentially perpendicular to the strike of the axial plane and passing through the borehole.

In practice what is actually done is to draw a line perpendicular to the strike of the major feature; i.e., its axial plane. Points are distributed along this line corresponding to each dip in the order of their depths, their spacing being wide for shallow dips and close for steep dips. Contour lines are curved to run perpendicular to the dip azimuth at each dip point.

While the above practice is helpful, the necessity to rely on intuition or a pictorial concept in determining the distribution of the dips and the positions of the contour lines makes the method lack in accuracy and consistency. In addition, in order to be of any meaning at all, it requires a skilled interpreter to make this determination. Further, the determination indicates the nature of the structure in only a small portion of the area around the borehole; i.e., in a single plane normal to the axial plane and passing through the borehole.

Another object of the present invention, therefore, is to provide a technique of automatically producing three-dimensional representations of formation features from dip and azimuth measurements which accurately represent variation in structural features with both distance and direction from a borehole.

In accordance with these and other objects of the present invention, apparatus and methods are provided for automatically producing with a machine three-dimensional representations of formation features from measurements indicative of dip and azimuth in a borehole beneath the earth's surface. In one form of the invention, computations of apparent dip representations in two different given azimuths are made from dip and azimuth measurements of formation features at various depths. A three-dimensional representation of these apparent dip representations is produced.

The apparent dip representations in the three-dimensional representations may be in the form of traces corresponding to the intersections of the formation features with planes aligned in the directions of the given azimuths.

The apparent dip traces for each plane may be positioned on their respective sides of a line representing the intersection of the two planes. A representation of the borehole may be added to the three-dimensional representation when the borehole deviates substantially from vertical. One or both of the planes aligned in the direction of the azimuths may also be deviated to include the borehole.

In a core complex form of the invention, a structural model is determined which represents formation dip and azimuth at different depths and thereby the dip and azimuth at different distances and directions from the borehole. This model is then utilized to compute the orientation (depth, dip and azimuth) of the formation feature with distances from the boreholes, which allows extending a dip and azimuth of a formation feature at the borehole away from the borehole. In the case of traces corresponding to the intersection of the formation feature with a plane, the traces are modified in accordance with the model predicted change in apparent dip in the direction of the plane.

The determined structural model is also utilized in producing other forms of the invention, such as a contour map of a given formation feature. In this case, the dip and azimuth of a formation feature at the borehole is extended both in distance and in direction from the borehole.

The determination of the structural model is made from the dip and azimuth of formation on features at several depths. The dip and azimuth is converted to a vector positioned at the borehole intersection of a surface in the structural model and therefore, defines one point on one surface in a three-dimensional representation of a model composed of a family of similar surfaces. Tests comparing the vectors further define types of surfaces such as tilted, intersecting, co-planar, faulted, folded, etc., and the direction of such structural features.

Equations corresponding to the type of surface are matched to the dip, azimuths and depths. These equations are then utilized to compute the characterization of the surface at any position on a selected surface relative to its borehole intersection. The characterization of the selected surface may be presented in three-dimensional representations in the form of trace intersections in one or more planes. When the plane is substantially vertical, the traces appear as dip representatives. When the plane is horizontal, the traces appear as contour lines.

In some cases, the representative structural information used to determine the structural model is provided by information from other sources such as nearby boreholes. An additional form of the invention provides representative structural information from measurements indicative of dip and azmuth in the instant borehole. A three-dimensional representation of the distribution of dip and azimuth is produced and a statistical analysis is performed to determine the dominant mode of the distribution and thereby the structural dip and the corresponding depth interval.

For a better understanding of the present invention, together with other and further objects thereof, reference is had to the following description taken in connection with the accompanying drawings, the scope of the invention being pointed out in the appended claims.

FIG. 1 illustrates a method and apparatus for producing dipmeter signals, displacements between these signals and the corresponding dip and azimuth measurements, and for processing these measurements in accordance with one form of the invention.

FIG. 2A shows a structural model in which formation features change their dip and azimuth values with depth and with distance and direction from the borehole.

FIG. 3B illustrates another method of producing another form of three-dimensional representation of formation features.

FIG. 4A illustrates a three-dimensional representation of formation features in which the formations change dip and azimuth in accordance with their positions relative to a structural plane.

FIG. 4B shows the relationships of the various planes illustrated in FIG. 4A in terms of the strike at their intersections, real or projected, with the borehole as viewed from above.

FIGS. 10A, 10B and 10C illustrate in detail a method of analysis of dip and azimuth measurements to produce representative dip and azimuth values corresponding to a structural feature.

FIGS. 11A and 11B illustrate the relationships between certain terms and notations used herein.

FIG. 11C illustrates the relationships which allow a three-dimensional equal area spherical representation to be accurately transformed into a three-dimensional representation in two dimensions.

Figure 2B:
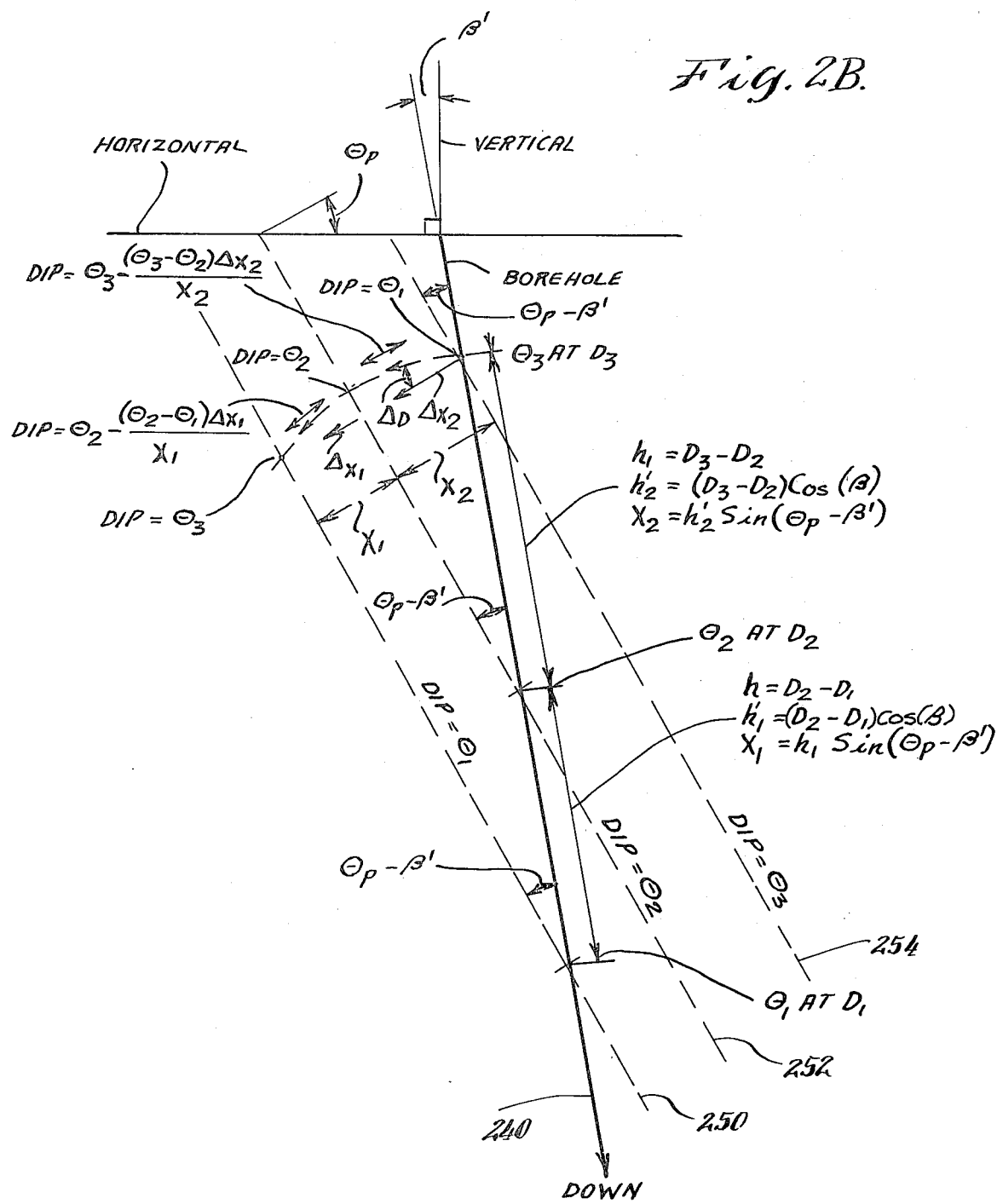
FIG. 2B illustrates certain relationships between the dip of certain adjacent horizons which allow the translation of the dip at one point on one horizon to another point on another horizon.

Referring now to FIG. 1, there is illustrated a method of obtaining and processing signals obtained from a borehole investigating device commonly known as a dipmeter. A more complete description of one such device may be obtained from U.S. Pat. No. 3,521,154 issued July 21, 1970 to J. J. Maricelli. The purpose of the dipmeter is to obtain signals from three or more radially spaced pads which reflect certain formation features useful in determining the orientation of the formations penetrated by the borehole.

Typical earth formations are represented by shale formations 13 and 14 with an intervening sand formation 15. Typical formation features are the boundaries 16 and 17 shown between these formations. Additional formation features such as the crossbedding already discussed may be found within any of the formations.

The borehole apparatus 18 is lowered into a borehole 10 for investigating the earth formations. The downhole investigating device 18 is adapted for movement through the borehole 10 and includes four pads designated 19, 20, 21 and 22 (the front pad member 19 obscures the view of the backpad member 21, and is not shown).

The pad members 19 through 22 are adapted to derive measurements at the wall of the borehole. Each includes a survey electrode Ao. One of the pads herein designated pad 19 may contain an additional survey electrode Ao' useful in determining the speed of the tool. Each survey electrode is surrounded by an insulation material 48. The insulation material and thus also the survey electrodes are surrounded by a main metal portion 45 of the pad. The metal portion 45 of each pad, along with certain other parts of the apparatus, comprise a focussing element for confining the survey current emitted from the various survey electrodes to a desired critical pattern. Survey signals representative of changes in the formations opposite each pad are obtained from circuits comprising the Ao electrodes, focussing elements and current return electrode B.

The upper end of the device 18 is connected by means of armored multiconductor cable 30 to a suitable apparatus at the surface for raising and lowering the downhole investigating device through the borehole 10. Mechanical and electrical control of the downhole device may be accomplished with the multiconductor cable 30 which passes over a shieve 31 and then to a suitable drum and winch mechanism 32.

Electrical connections between various conductors of the multiconductor cable which are also connected to the previously described electrodes, and various electrical circuits at the surface of the earth are accomplished by means of a suitable multi-element slipring and brush contact assembly 34. In this manner, the signals which originate from the downhole investigating apparatus are supplied to the signal processing circuits 39 which in turn supply the signals to a signal conditioner 40 and recorder 41. Additionally, a suitable signal generator 42 supplies current downhole via transformer 50 and to signal processing circuits located at the surface. More details of such circuits are described in the aforementioned Maricelli patent.

The signals obtained from the downhole device may be recorded graphically by a film recorder 41. One such recorder is described in U.S. Pat. No. 3,453,530 issued to G. E. Attali on July 1, 1969. In addition, the signals may be processed to obtain discrete samples and recorded on tape. A suitable tape recorder is described in U.S. Pat. No. 3,648,278 issued to G. K. Miller et al on Mar. 7, 1972. The signals or samples thereof may also be transmitted directly to a computer. One transmission system which may be used is described in U.S. Pat. No. 3,599,156 issued to G. K. Miller et al on Aug. 10, 1971.

The signals may be sampled by driving a sampling device, such as those in the above-described tape recorder, by the cable motion as measured at the surface. For example, the cable length measuring wheel as shown at 34A may be used in controlling the signal processing, sampling and recording as indicated by signal line 34B. Therefore, each sample represents a depth increment and displacements determined between such sampled signals are indicative of depth displacements.

The recorded to transmitted signals may also be processed as sampled data by general purpose digital computing apparatus properly programmed in a manner to perform the process described herein or by special purpose computers composed of standard modules arranged to accomplish the same process.

Alternatively as shown in FIG. 1, the signals may be processed at the well site again using conventional digital computing apparatus interfaced to the signal conditioner 40. One such computing apparatus is the Model PDP-11/45 obtainable from Digital Equipment Corporation. Suppliers of such equipment may also supply signal conditioning circuits 40 and signal conversion means 60 for conditioning and converting analog signals to digital samples suitable for subsequent digital storage and processing. Further, such computing apparatus ordinarily includes a memory for storing data and information such as parameters, coefficients and controls used and generated by the processing steps.

A brief description of one of the many processes which may be performed at the well site by such computers is illustrated by Blocks 62 through 96A of FIG. 1. This and other processes will be described in greater detail. For example, see FIGS. 3A and 3B which illustrate some alternate processes which may replace those illustrated in FIG. 1.

When performed at the well site, it may be desirable to record and/or display the results of such processing. Thus, the well site computer may be also connected to any of several types of recorders. For example, the recorder 94A may be of the same type as recorder 41 or of the type of tape recorder previously referenced. The display device 96A may be of the CRT type. The common analog or incremental X-Y Plotter might also be used. Therefore, the available details, circuits and utilization of these devices will not be described herein.

Referring again to FIG. 1, there is shown in the form of a process flow diagram a process illustrated by Blocks 62 through 84 which may be automatically performed according to this invention on special purpose analog equipment constructed to enable the indicated steps, or programmed to enable a general purpose digital computer to be controlled to perform the illustrated process which will now be described in detail. The processes illustrated by such flow diagrams and the accompanying descriptions herein enable the described process to be programmed. The resulting program provides control for any of several general purpose digital computers to perform the process. These computers may vary from large scale IBM Model 370 type systems that are located at central computing centers to small scale computers such as the DEC 11/45 which may be located at the well site.

The programming of these computers may be accomplished in languages such as Fortran. Further, some of the routines such as signal correlation have been previously programmed and are available to the users of such machines. For example, users of IBM 360/370 equipment may obtain an IBM program for processing dipmeter tapes. In this case, the processes illustrated in Blocks 62 and 64 need not be programmed. However, for purposes of completeness, a brief description of the correlation process will be provided at this point.

The dipmeter signals are cross-correlated to determine displacements between points on a corresponding dip plane which may be characterized by its true dip $\Theta$ and the azimuth $\Phi$ of the down dip direction. Normally, these dip and azimuth measurements are then output or displayed in various forms versus depth.

As indicated in Block 62, the three- or four-dipmeter signals may be correlated using any of several standard correlation equations. The signals are correlated in pairs to produce a corresponding correlation function. Correlation function represents the degree of likeness between the correlated signals at various displacements of the signals. Depending on the particular function, the best likeness may be a maximum or minimum of the function. In any case, the best likeness corresponds to a displacement determination which is satisfactory in most cases. These displacement determinations are combined with the corresponding distance between the pads which originated the signals and a displacement vector may be determined.

Two displacement vectors determined between any two pads and a common pad will define a dip plane. Each dip plane may be characterized by its dip $\Theta$ and its azimuth $\Phi$. Several planes may be determined at a given depth D(I) but, in general, a single plane is determined for a given depth level. Consequently, at Point A of FIG. 1, a number of dip and azimuth values may be available, either from a combination of more than three displacements determined as indicated in Block 62 or from previous dip and azimuth determinations.

Block 64 thus represents the determination of a single dip and azimuth value to represent depth D(I). This determination may be made in accordance with previously described use of long correlation intervals or it may be made by use of dip averaging techniques such as those described in a paper entitled "A Three-Dimensional Vector Method As An Aid To Continuous-Dipmeter Interpretation" by M. H. Neederlof, et al, published in the Nov./Dec. 1971 issue of Geologie en Mijnbouw, Volume 15 at pp. 725–732. Still further, the representative dip and azimuth computations may be performed by features of this invention which will be described later.

In any case, at Point B, a single dip and azimuth value representative of the depth D(I) is available. In accordance with one form of this invention, apparent dips $\theta'$ and $\theta''$ are computed for two given vertical planes P' and P'', respectively. These two planes are not required to be in any particular relationship with each other, the borehole or any other plane. Preferably, they are planes separated by an intersection angle of several degrees or perhaps up to 90 degrees. Traces corresponding to the apparent dips are produced. The traces may then be plotted on corresponding sides of a line representative of borehole length, for example. The resulting display, as shown in FIG. 1, produces the effect of a three-dimensional picture of the formations penetrated by the borehole.

Referring to FIG. 1, as indicated by Branch 66 and in Block 70, the computation of an apparent dip $\theta'$ in a given plane, here designated as P', is now performed. As indicated in the diagram, a similar computation for an additional plane P'' will also be needed as indicated in Block 72. As indicated by the dashed line 68 connecting Point B in Block 72, the computations indicated in Blocks 70 and 72 may be performed in any given order or simultaneously as equipment provides.

The computation of the apparent dip is a simple relationship with the true dip given by the following equation:

$$\theta = \text{Tan}^{-1}(\Theta \times \text{COS}(\Phi - \phi)) \qquad \text{Equation (1),}$$

where $\phi$ is the azimuth of the given vertical plane or cross-section, $\Theta$ is the true dip magnitude and $\Phi$ is the azimuth of the true dip. Note that $\theta$ is always smaller than $\Theta$, or at the most equal to $\Theta$.

The computations of the apparent dips $\theta'$ and $\theta''$ for planes P' and P'' are performed for the same values of $\Theta$ and $\Phi$ using their given azimuths of $\phi'$ and $\phi''$, and Equation (1), as shown in Blocks 70 and 72, respectively. These $\theta'$ and $\theta''$ values are further processed as indicated in Block 74, independent of whether the apparent dips are computed in a particular sequence or in parallel, as indicated by the dotted and solid lines leading to Block 74. Here, as indicated, the computation of traces corresponding to the apparent dips takes place. Since both apparent dips correspond to the same depth D(I), the traces connect at a point corresponding to the scaled depth and extend to the left and to the right from this point at angles indicative of the apparent dip $\theta$ for planes P' and P'', respectively.

One trace may be made at each depth and output at the completion of each depth level as indicated in the next Block 76. The output traces may be plotted at this time or recorded as indicated by recorder 94A, for later plotting or display. However, the recorder 94A may in fact be part of the computer memory. In this case, the trace information may readily be retrieved and output for plotting when any or all of the traces have been computed.

After output of the traces, the process may continue from Point D as indicated by Branch 78 to increase the depth D(I) as indicated in Block 80 and subsequently a new dip and azimuth process takes place for this new depth as indicated in Block 64 and previously described.

As indicated in an optional process by the dotted line 82 connecting Point D and Block 84, a real-time display may be performed at the computation site. In such cases, the output traces are transmitted through an appropriate interface to the display apparatus 96A. These apparatus are designed for computers and may be in the form of cathode ray tubes, plotters, or the like.

Indicated in FIG. 1 is a typical display with the vertical intersection of Planes P' and P'' and the borehole represented by a line corresponding to approximately the center of the display and dividing the display into left- and right-hand portions. On the left-hand side of the line, the apparent dips are indicated in accordance with the apparent dips for plane P'. On the right-hand side of the line are the apparent dips for the plane P'' for the corresponding depths. Each trace thus represents a line broken at its intersection with the line representing the intersection of planes P' and P'' and inclined at an angle corresponding to the apparent dips in one or the other of the section planes.

A line indicating a horizontal plane intersecting the borehole aids in giving perspective to the display. As noted in the display, this line will also be broken at the intersection of planes P and P'' and deviates from a straight line in accordance with the difference between the azimuths of the planes P' and P''. Of course, it is obvious that apparent dip traces would appear to be straight lines for the case where the azimuth of both planes are the same and in such case there would be no need of such a display.

Referring now to FIG. 2A, there is shown a structural model considerably more complex than the family of planes assumed in the computation described above in regard to FIG. 1. FIG. 2A represents a given formation feature, such as a surface, as its trace would appear in the three visible planes of a cube. In plane P, including the borehole 200, a series of curved traces, designated as 201 through 207, indicate a sequence of formation features intersecting the borehole at various depths.

One formation feature, designated as horizon H, intersects the borehole at depth $D_H$.

The angle at which these features cross the borehole; i.e., their dip in plane P, varies from surface to surface. However, as is apparent in FIG. 2A, the dips change not only with depth but vary with distance and direction from the borehole since the surfaces are no longer planes. In non-planar cases, it is therefore inaccurate to represent dip traces as straight lines as in the display 96A of FIG. 1.

In the case of non-planar surfaces, various structural models may be used to predict the changes in dip and depth with distance and direction from the borehole. The model shown in FIG. 2A represents cylindrical surfaces which are also inclined from the horizontal plane as indicated by contour line 220. Assuming that the true dips are represented in plane P, it would appear that the dip information in one trace is reflected in its adjacent traces.

Assuming that the surfaces were originally parallel and subsequently were folded along a common axial plane such as indicated in FIG. 2A by the dashed line 210 normal to plane P, each trace approximates its adjacent traces as if they were shifted along the axial plane. For example, consider the horizon H at $D_H$ and its adjacent horizons immediately above and below. A dip equal to $\Theta_{DL}$ of the lower horizon 203 (measured at its intersection with the borehole at DL) appears on Horizon H at a point above DL along a parallel to the axial plane. In a similar manner, the dip $\Theta_{DU}$ of the upper horizon 205 appears on horizon H at a point below $D_U$ along a parallel to the axial plane.

Thus, horizon H may be considered as a composite of surface 203, translated upward a distance equal to that indicated in FIG. 2A as $T_U$ along the axial plane and surface 205 translated downward a distance $T_D$ along the axial plane. These translation distances may be determined from the dip angle of the axial plane and the difference in borehole intersection depths between the surfaces. A structural model that includes the orientation of the axial plane and the depths and dips of the adjacent surfaces may be used to extend the depths and dips of a given horizon beyond its intersection with the borehole. More particularly, such a defined model may be used to determine apparent dips in any section plane with distance from the borehole and to construct traces representative of these apparent dips to form a cross-section in one or more given planes.

Figure 3A:
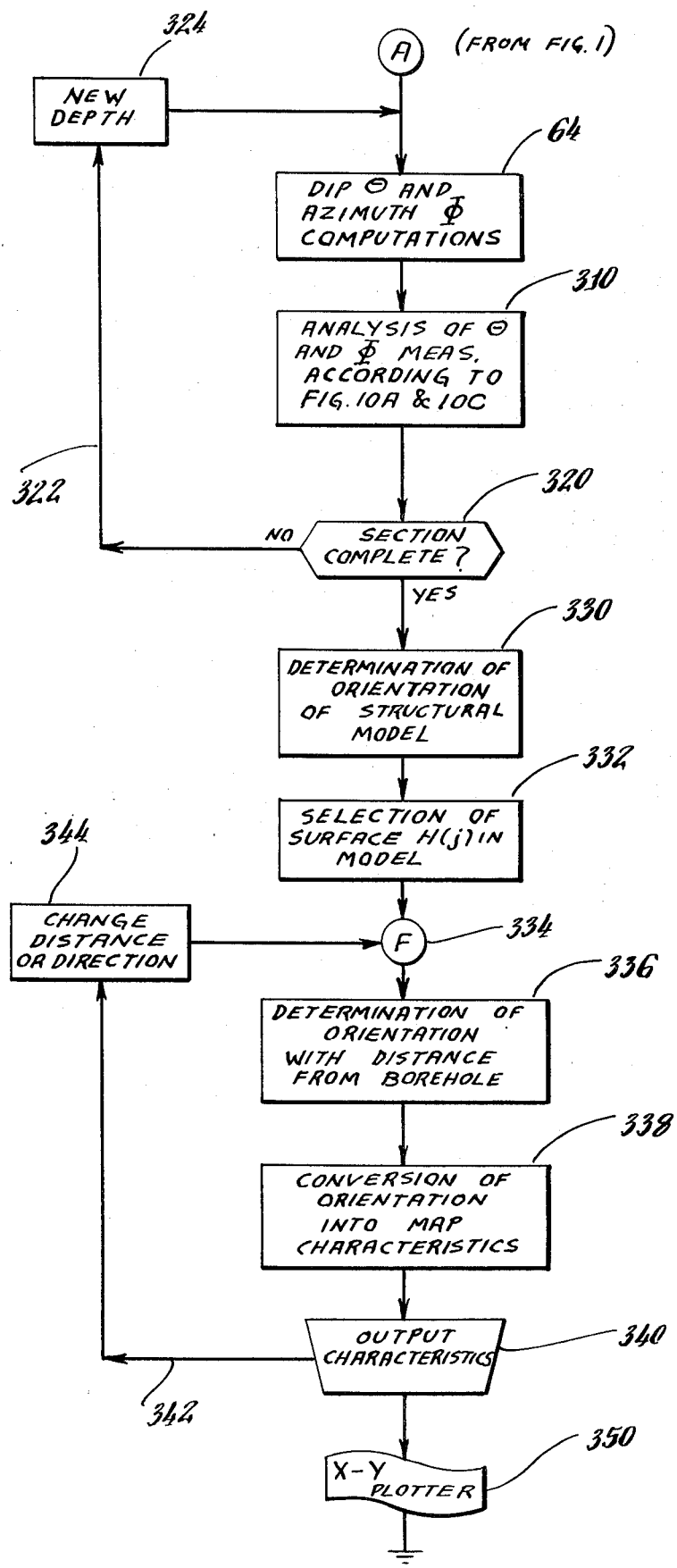
FIG. 3A illustrates one method of producing one form of a three-dimensional representation of formation features utilizing a structural model such as shown in FIG. 2A.

Thus, in accordance with this invention, cross-sections in one or more planes, such as shown in display 96B of FIG. 3B, and contour maps may be constructed using such models. The processes for defining complex models will be described later. The processes for producing such three-dimensional representations will be described in further detail in regard to FIGS. 2B, 3A and 3B, 5 through 7, 10A, 10B and 10C and 12A and 12B.

There are many additional structural models which may be used to characterize changes in depth, dip and azimuth of a family of surfaces. Planar models are illustrated in FIGS. 2B, 4A through 4D, and 8E. Also, other folded structural models may be used. For example, FIGS. 9A, 9B and 9C illustrate additional types of folding and how they relate to model elements which help to define the model.

One method of characterizing a simple surface, such as that penetrating the borehole at $D_3$ in FIG. 2B, will now be described. Consider FIG. 2B to be constructed in a plane normal to the axial plane of a folded structure; i.e., in a plane common to the formation dips. Thus, the cross-section need not be necessarily vertical, or, for that matter, in the plane of the borehole. Lines indicating the formation dip in a plane normal to the axial plane will appear in true dip. Also, lines parallel to the axial plane will appear as having the dip $\Theta_P$ of the axial plane. Lines 250, 252 and 254 are such lines, here defined in that they also pass through the borehole intersection points of the formation features at $D_1$, $D_2$ and $D_3$, respectively.

If a family of surfaces are folded in a common plane, such as the section plane of FIG. 2B, in a manner that the surfaces are parallel at all points equally distant from the axial plane, the dips of all surfaces at a given plane parallel to the axial plane will be equal. Thus, planes parallel to the axial plane and intersecting the borehole at a point of known dip define equal-dip planes. The dips of all surfaces at their intersection with this plane are equal to the dip of the surface at the intersection of the plane with the borehole. Lines 250, 252 and 254 are in such planes with their dips measured at their intersection with the borehole. Thus, line 250 may be labeled as DIP=$\Theta_1$ as measured at intersection depth $D_1$.

Using the above concept a surface having a dip $\Theta_3$ at $D_3$ may be extended to intersect the line corresponding to DIP=$\Theta_2$, since it is known that the dip at this intersection must equal $\Theta_2$. Further, the dip of this extended surface would be expected to vary systematically from $\Theta_3$ to $\Theta_2$ between the corresponding equal-dip lines.

The distance X between the equal-dip lines may be computed from the distance h measured along the borehole between the dip measurement points corrected for any angular difference $\beta$ between the borehole and the section plane, and the angular difference between the dip of the axial plane $\Theta_P$ and the apparent borehole deviation $\beta'$ in the section plane. In FIG. 2B, only the corrected borehole distances $h'_1$ and $h'_2$ are shown.

It will be appreciated that the position of a surface intersection with an equal-dip line will also be needed. Several approaches are possible. A simple one would be to consider a line normal to an equal-dip line, such as DIP=$\Theta_2$, and intersecting a dip measurement point, such as $D_3$. The length x of this line may be found from:

$$x = h' \sin(\Theta_P - \beta') \qquad \text{Equation (2A)}$$

Using this distance x the dip of a given surface may now be computed at any point $\Delta x$ measured along x from one dip $\Theta_i$ toward the intersection of the next equal-dip line for a second dip $\Theta_j$, according to the formula $$\Theta_{\Delta x} = \Theta_i - \frac{(\Theta_i - \Theta_j)}{x} \Delta x. \qquad \text{Equation (2B)}$$

Only one further piece of information is needed to complete the characterization of the surface away from the borehole, and that is the change in depth $\Delta d$ of the surface with increasing distance from the borehole. One method of determining the depth of the surface at any point between equal-dip lines may be obtained by using the above equation for dip with distance. For example, for each small increment $\Delta x$ of increase in distance x, $\Delta d$ may be determined from:

$$\Delta d = \Delta x \tan(\Theta_{\Delta x}) \qquad \text{Equation (2C)}$$

The total change in depth may be obtained by summing the Δd values. The actual depth may be obtained by correcting the borehole intersection depth of the surface with this change.

In a more general expression, the distance x between two equal-dip planes and measured normal thereto is considered as the abscissa and the borehole intersection point is the origin $X_o$, $Y_o$. The position of the surface may then be defined by the differential equation $dy/dx = \text{Tan}(\Theta_{(P)} - \Theta_{(x)})dx$. Integration defines y as $$y_o + \int_{x_o}^{x} \text{Tan}(\Theta_{(P)} - \Theta_{(x)})dx,$$

where $\Theta_{(x)}$ may be defined from fitting several dip measurements or interpolated between dip measurements as in Equation (2B). $\Theta_{(P)} = \Theta_P$ unless, for instance, the axial plane is warped.

Referring again to FIG. 2B, this example of a cross-section of a folded structural model will now be used to demonstrate certain relationships between the dips representative of structural formation features above and below a given surface and their use to extend the dip representations of the given surface beyond its intersection with the borehole.

A borehole is shown penetrating a horizontal plane at an apparent deviation angle $\beta'$ in the section plane. Since the actual borehole deviation $\beta$ may not lie in the plane of cross-section, the apparent deviation $\beta'$ may differ somewhat, but may be computed by a well-known relationship.

In FIG. 2B, the borehole intersects, at the deepest illustrated point, a formation at $D_1$ which has a true dip $\Theta_1$; a second formation at an intermediate depth $D_2$ at a true dip $\Theta_2$ and a third formation at depth $D_3$ at a true dip $\Theta_3$. Each dip is different, indicating a folded structure. Further, since the dips change in the same direction with depth, for example, in this case, the dips decrease from $\Theta_1$ to $\Theta_3$, a systematically folded structure is suggested. If a further analysis indicates that the dips are normal to a common plane and the orientation of this plane is determined, a translation procedure may be used to extend a dip determined at the borehole intersection away from the borehole to produce either a contour map of a given surface around the borehole or to produce a cross-section in which the extended dips varies with distance from the borehole in the section.

Consider now the borehole intersection of a surface of dip $\Theta_3$ at depth $D_3$. The normal distance (indicated in FIG. 2B as $x_2$) to the next equal-dip line on the left is determined using the next lower dip $\Theta_2$, since $\Theta_3$ indicates the surface is decreasing to the left. The borehole depth difference h indicated here as $(D_2 - D_3)$ between $\Theta_2$ and $\Theta_3$ is corrected for any angular difference between the borehole and the cross-section plane. This corrected difference is indicated here as $h_2'$. The distance $x_2$ is determined using EQ.(2).

With $\Theta_i$ and $\Theta_j = \Theta_3$ and $\Theta_2$, respectively, the dip $\Theta_{\Delta x}$ may be determined at any distance $\Delta x$ measured to the left along $x_2$ from the borehole at $D_3$, using EQ.(2B). The depth at this distance is determined by summing the total number of incremental depth changes Δd as computed from Equation (2C) to find the total change ΔD at this point and subtracted ΔD from $D_3$.

In the above manner, when the surface has been extended to intersect the DIP = $\Theta_2$ equal-dip line, the dip of the surface is found to be equal to $\Theta_2$ and the difference in depth is found to be approximately x Tan $(\Theta_3 - \Theta_2)/2$. At the intersection, the above equations are modified to reflect the use of the dip $\Theta_1$ at $D_1$ to continue the extensions of the surface to the left.

It will be appreciated by those in this art that the above described method of extending a given surface away from the borehole may also be performed by using alternate methods, such as using incremental changes in the distance h; for example, Δh and h could be substituted in Equation (2B) above.

Referring now to FIG. 3A, there is shown an additional process which may be used in place of the steps following point A of FIG. 1. This process differs from that shown in FIG. 1 in that, like the method illustrated in FIG. 2B, more than one dip and azimuth measurement is now used to define a structural model. This model may have been partially defined by placing restrictions on the meaning of these dip measurements. For example, the dips may be regarded as representative of planes and, in such cases, if there is a substantial difference in dip, an intersection between the planes or a fault might be assumed. Alternatively, dip and azimuth variations over a given interval may be assumed to represent a family of nonintersecting surfaces, each dip defining a point on one of the surfaces in a three-dimensional reference system.

In certain cases, it is necessary to make assumptions as to some of the model elements. For example, the model may assume there is a constant bed thickness between any two surfaces, that the surfaces are cylindrically folded and, perhaps parallel to one another along an axial plane, a common axial surface or axial line or, even more specifically, that the axial surface is a warped plane.

A sequence of measured dips may be analyzed to determine which type of model is appropriate. For example, an analysis may determine that a model employing cylindrical folding about a given axial surface may be appropriate. Further analysis may determine that the axial surface is a plane or a line. In addition, the orientation of the axial plane or line may be determined in such cases.

With the model elements determined or assumed, the dips represent tangents to a family of surfaces belonging to the model. Any of the surfaces may then be selected as a representative horizon and a contour map generated or, if desired, a cross-sectional plane constructed. Further details of one method will be described now with a regard to FIG. 3A.

In FIG. 3A, Point A and Block 64 are reproduced from FIG. 1 and have already been described. Block 310 in FIG. 3A, represents the analysis of the true dip and azimuth measurements. These measurements may be as computed previously as indicated in Block 64 or may be as obtained from printouts or from output tapes generated by previous computer processing or entered from manual computations.

The dip and azimuth measurements are analyzed according to procedures briefly described at this point but described in more detail later herein with regard to FIGS. 10A through 10C. The analysis provides representative structural dip and azimuth measurements for a given structural section. As indicated in the next Block 320, a number of dip and azimuth measurements comprising a section of a structural unit are required for the analysis. Thus, if the indicated test in Block 320 answers NO, the process continues with new depths to complete the section as indicated in Block 324.

If, however, the test indicated in Block 320 indicates that a complete section has been analyzed; i.e., enough representative dips of differing depths and values are present to define the model, the model determination is made as indicated in Block 330. Further details of this determination will be given in regard to description of FIGS. 12A and 12B for the more complex models. In a simple case, a planar model may be determined, in which case the model elements are defined by the dip and azimuth of the planar surfaces. In any case, one of these surfaces or horizons such as H(J) is selected for further processing as indicated in Block 332.

At Point F, any of several processes may be used to determine a three-dimensional representation of the features of the selected surface, using the dip and azimuth measurements analyzed as indicated in Block 310 in combination with the model characteristics determined as indicated in Block 330. For example, one three-dimensional representation may be a contour map. In this case, the process continues as indicated in Block 336. If a cross-section were to be determined, the process might continue as indicated from Point F in FIG. 3B.

In order to contour the selected surface, the orientation of this surface is determined with distance from the borehole. This process is indicated in Block 336 of FIG. 3A. For example, the direction and distance corresponding to the point where the surface has a given depth may be determined. This depth may correspond to one of the contour depths. Then, as indicated in Block 338, with the direction, distance from the borehole intersection and contour depth determined for a map point, this information may be converted to any of several mappable characteristics. For example, the value and direction of a particular contour depth may be used to characterize the surface if a contour map is to be made. However, in place of the contour line, a dip symbol corresponding to the direction and magnitude of the surface at the map point may be used.

As indicated in Block 340, the map characteristic corresponding to the map point may be output at this time. This output may be in the form of instructions transmitted to a local or remote plotter. As indicated in Block 350, one such plotter is the common X-Y plotter, typically computer driven, and well-known for its use in generating contour maps. Alternately, the output may be recorded for later use. For example, the output may be recorded on magnetic tape for subsequent plotting.

The process continues as indicated by Branch 342 by changing the distance or direction from the borehole as shown in Block 344 beginning again at Point F. Additional map characteristics of the previously selected surface are thereby determined and output until the surface has been characterized for the desired area.

Rather than characterizing the surface in a horizontal plane as is typically the case with contour maps, a cross-section along one or more planes may be desired. The process for obtaining such a cross-section is similar to that described above, but restricted to the directions of the planes involved.

For a description of this process, refer to FIG. 3B, beginning at Point F, as shown in FIG. 3A, where the determination of the orientation of the selected surface is restricted to a given plane or planes. It may be necessary to first make a determination of the orientation of the surface in a particular plane P which characterizes the structural model as described in regard to Block 336. This plane need not be a plane selected for cross-section. For example, the dip with distance from the borehole normal to the axial plane of the folded structure may be determined as described in regard to FIG. 2B. Neither this distance or dip may be appropriate for the plane of cross-section and either may be adjusted to compensate for the difference of azimuth between the plane P and the cross-section plane.

The dip angle and direction in plane P may be made for a distance and depth in this plane which has been adjusted for the desired corresponding distance and depth in plane P′ as indicated in Block 370 and in plane P″ in Block 372. The determination of the orientation in plane P, therefore, considers the orientation as it would appear in the cross-section plane.

For example, the distance x′ from the borehole in plane P′ may be adjusted to the distance x in plane P by using the angular difference $\alpha$ between the planes and well known trigonometric relations. One relation is the following equation:

$$x = x' \cos(\alpha) \qquad \text{Equation (4)}.$$

Also, Equation (1) may be used to correct the dip determined in plane P to that in plane P′. This computation is indicated in Block 380 for plane P′ and Block 382 for plane P″.

As shown in FIG. 3B the computations of the orientation in a particular plane may be done in any desired sequence as indicated by the solid and dashed lines in the figure. Further, only one plane, for example, plane P may be considered as shown by the dashed lines bypassing Blocks 372 and 382. The computations indicated in Blocks 370 and 372 may be done in any sequence or in parallel as is the case for the computations indicated in Blocks 380 and 382. When two planes P′ and P″, are used in the cross-section, these traces are computed and merged before output as indicated in block 384, as previously described in reference to Block 74 of FIG. 1. As indicated in Block 386, the outputs may be recorded on recorder 94B for later display, recorded to be displayed along with additional output or displayed as computed either locally or remote to the computation site as indicated by Branch 390 and Block 394.

In the form derived by the process illustrated in FIG. 3B, the apparent dip representation is a trace corresponding to the intersection of the surface or horizon selected to be displayed with the section plane rather than to an arbitrary dip measurement as illustrated in FIG. 1A. Also, as distinguished from the display shown at 96A in FIG. 1, the traces are not restricted to straight lines as indicated at 96B of FIG. 3B. This is because the information obtained from dips above and below the displayed horizon have been used to define a structural model characterizing the horizons in terms of its dip with distance and direction from the borehole. Thus, the traces of this display may take on a curvature with distance from the borehole in the cross-section plane, or as illustrated, planes P′ and P″. As a result this display represents information comparable to that illustrated by the three-dimensional cube shown in FIG. 2A. Such a display readily indicates the nature of the changes in dip with distance from the borehole in the cross-section plane.

The process illustrated by FIG. 3B continues as illustrated by Branches 388 or 398, depending upon the optional inclusion of the display step, by increasing the distance from the borehole as indicated in Block 389 and repeating the above described process beginning again at Point F. Thus, the determination of trace begins at the point representing the intersection of the selected surface or horizon with the borehole and continues with increasing distance from the borehole until the desired distance in the section plane is reached.

If desired, additional surfaces included in the same structural model may be processed by beginning at Block 332, FIG. 3A. Still further, horizons not included in the current structural model may be processed by beginning the process at Point A of FIG. 3A. Thus, a complete display of a number of horizons representing the various depths and even various structural models may be obtained. The resulting display clearly indicates variations in dip and depth with distance from the borehole in the section planes. These indications are valuable in evaluating the future disposition of the borehole; i.e., whether to sidetrack or abandon, for example, or to predict the location of future prospects.

FIG. 4A (Sheet 2) illustrates a cross-section of three formation features in a model which may be utilized in accordance with the invention described herein. In this example, the three features correspond to three structural planes in the figure. They are designated as planes P, P' and P'' which may correspond to the illustrated plane H(i) in the upthrown block, the fault plane intersection trace I and plane H(i) in the downthrown block, respectively, of a normal fault configuration. The planes on either side of the normal fault plane, that is, planes P and P'', may be any of a series of horizons which are designated in this case as H(i+j), where j varies in accordance with the horizon being the first, second, third, etc., horizon above or below the selected horizon H(i). In this example, horizons present in section $\Phi_P$ plane are also present in the section $\Phi_{P'}$ plane. However, they have been sheared and displaced by a vertical interval designated in FIG. 4A as "g" by the faulting occurring in plane P'. In addition to this displacement there may be a certain amount of rotation in the fault such that the dip $\Theta$ and azimuth $\Phi$ are different on each side of the fault for the corresponding horizons, as shown in sections taken in planes $\phi_P$ and $\phi_{P'}$.

FIG. 4A illustrates the horizons in section plane $\phi_P$ as seen when the fault plane P' is considered normal to the display surface; i.e., the paper itself. Section plane $\phi_P$ corresponds to a vertical section normal to the azimuth $\phi P'$. A second section along azimuth $\phi_{P''}$ is also illustrated for the downthrown block. Thus the fault plane P' appears as a trace corresponding to the intersection line I between section planes $\phi_P$ and $\phi_{P'}$.

A vertical hole drilled in the position illustrated would encounter the horizons present in the downthrown block at shallow depths and the dip and azimuth measurements correspond to those horizons shown in section $\phi_{P'}$ with increasing depths until reaching a depth designated as $D_I$ in FIG. 4A and corresponding to the fault intersection. At this point the dip and azimuth of the fault may be measured. Below this point the dip and azimuth measurements correspond to the horizons in the upthrown block; i.e., those shown in section plane $\phi_P$. Although the horizon indicated as H(i) in FIG. 4A does not actually intersect the borehole in the downthrown block as shown for plane P'', its depth of penetration DP'' may be obtained by projecting its dip, as obtained from horizons above H(I) in the downthrown block, as for example, horizon H(i+1) which is paralled to H(i), and a known depth somewhere within the downthrown block corresponding to this horizon. Alternatively, if the vertical distance between horizon H(i+1) and horizon H(i) is known, the depth of H(i) in the downthrown block may be determined directly as a function of the gap "g" as will be further described herein.

It should be pointed out that a borehole need not be vertical. It is required only that the positions of the specific points of intersection and depths DP of each plane with the borehole be known and that computations associated with that plane be performed in regard to each corresponding position.

For example, FIG. 4B illustrates a map or downward view of a trace of a nonvertical borehole. Here the section planes shown in FIG. 4A are now represented as the dip azimuth traces of a representative horizon at its borehole intersection h. Without dip information or contour lines, the map illustrated in FIG. 4B is of limited value.

The structural fault is a common formation feature of significant importance in geological exploration. Thus, contour maps or cross-sections accurately indicating the position and continuity of faulted formation surfaces are useful in hydrocarbon exploration. Such maps and corresponding cross-sections may be constructed using the principles of this invention.

When a borehole penetrates a fault, the dipmeter dip and azimuth measurements frequently indicate the intersection point of the fault with the borehole, its dip and azimuth, or at least, limitations of such and the dip and azimuth of the formation surfaces above and below the fault plane. Thus, with proper analysis the dipmeter defines the orientation of three planes; the plane of the formations on either side of the fault plane, and the plane of the fault itself. In order to construct a map or cross-section, one further measurement is needed. This is the vertical displacement of the formation surfaces which occurred in the faulting.

The determination of the vertical displacement may be accomplished in several different ways. One method is to compare the information on a borehole penetrating the fault with the information from a borehole which did not penetrate the fault. Such a comparison leads to the conclusion that a certain vertical section or "stratigraphic gap" is present in the faulted borehole. Where boreholes are not vertical, the dipmeter information may be used in the well-known manner to correct the apparent gap to a vertical equivalent.

A still further correction may be required when rotation as well as displacement has occurred as the result of the fault. In such cases, the displacement should be adjusted to represent the displacement occurring in a plane normal to the formation surface and passing through the borehole at a point where the surface would have intercepted the borehole had not the fault intervened.

One method of constructing a contour map of a given formation surface or horizon, will now be described. It will be appreciated by those in this art that the steps to be described may be performed in several different orders. Also, it will be appreciated that there are different, but equivalent, constructions which may be used for some of the individual steps. Further, the number of contour lines and their spacing may also be varied.

In order to simplify the explanation, certain terms will now be defined: the dip of a given plane, be that plane a formation surface or a fault plane, will be designated a $\Theta_P$ and its azimuth as $\Phi_P$. The depth at which a given plane actually intersects or is projected to intersect the borehole is designated as DP. The horizontal distance from this intersection point normal to a given contour depth CD is designated as dh. Further, the steps of computing and constructing should be understood to by any equivalent step which may accomplish a stated purpose. Thus, a computation may be performed using a three-dimensional coordinate system or spherical trigonometric methods. The construction of lines may correspond to deriving equations for the line in such computational systems; or a corresponding point representative of the line in a plane normal to the line.

In one form, the procedure used to construct a contour map representing a fault in a given formation surface is as follows:

(a) In a plane normal to the plane P to be contoured and passing through the borehole at the actual or projected intersection depth DP, compute the horizontal distance dh from the borehole along the dip azimuth $\Phi_P$ to a point corresponding to a given contour depth CD by the equation $$dh = (DP - CD) \text{ TAN } (\Theta_P) \quad \text{Equation (5)}.$$

(b) Construct a provisional contour line $CL_p$ for plane P in a horizontal plane equal to CD and passing through the above point normal to the azimuth $\Phi_P$.

(c) Construct at least one additional provisional contour line at a contour interval CI and parallel to $CL_P$ which is spaced ds from $CL_P$ where $$ds = CI/\text{TAN } (\Theta_P) \quad \text{Equation (6)}.$$

(d) Repeat steps (a), (b) and (c) for the same contour depth CD for a second plane P' and thereby producing a second set of contour lines.

(e) Determine the intersection of corresponding contour lines (those with the same CD value) and delete that part of the provisional contour lines from each plane which extends beyond these intersections.

Note that these intersection points define the intersection line between planes P and P'. This line may be further indicated on the contour map by connecting such intersection points with a line.

Thus, the above steps serve to define contour lines crossing from one plane into another, as from plane P into plane P', in this case. For example, plane P may represent a formation surface actually penetrated by the borehole and plane P', a fault plane, or simply any plane not parallel to plane P. The intersections of additional planes may be contoured in the same fashion.

Thus, to complete the contouring of a formation surface across a fault, such as the case shown in FIGS. 4A and 4B, the above-described steps would be repeated, using planes P' and P", thus crossing the fault plane P' and continuing to the formation surface on the other side of the fault. Here, as previously discussed, when the faulting also induces rotation, planes P and P" may not be parallel. As long as the depth of intersection of plane P" has been properly determined as previously described, the above steps will accurately define the contour lines representative of plane P".

In the case of non-vertical boreholes as shown in FIG. 4B, compensation is provided by relocating the contours corresponding to each plane by the difference in position between h, h' and h", their respective borehole intersection points.

Figure 5:
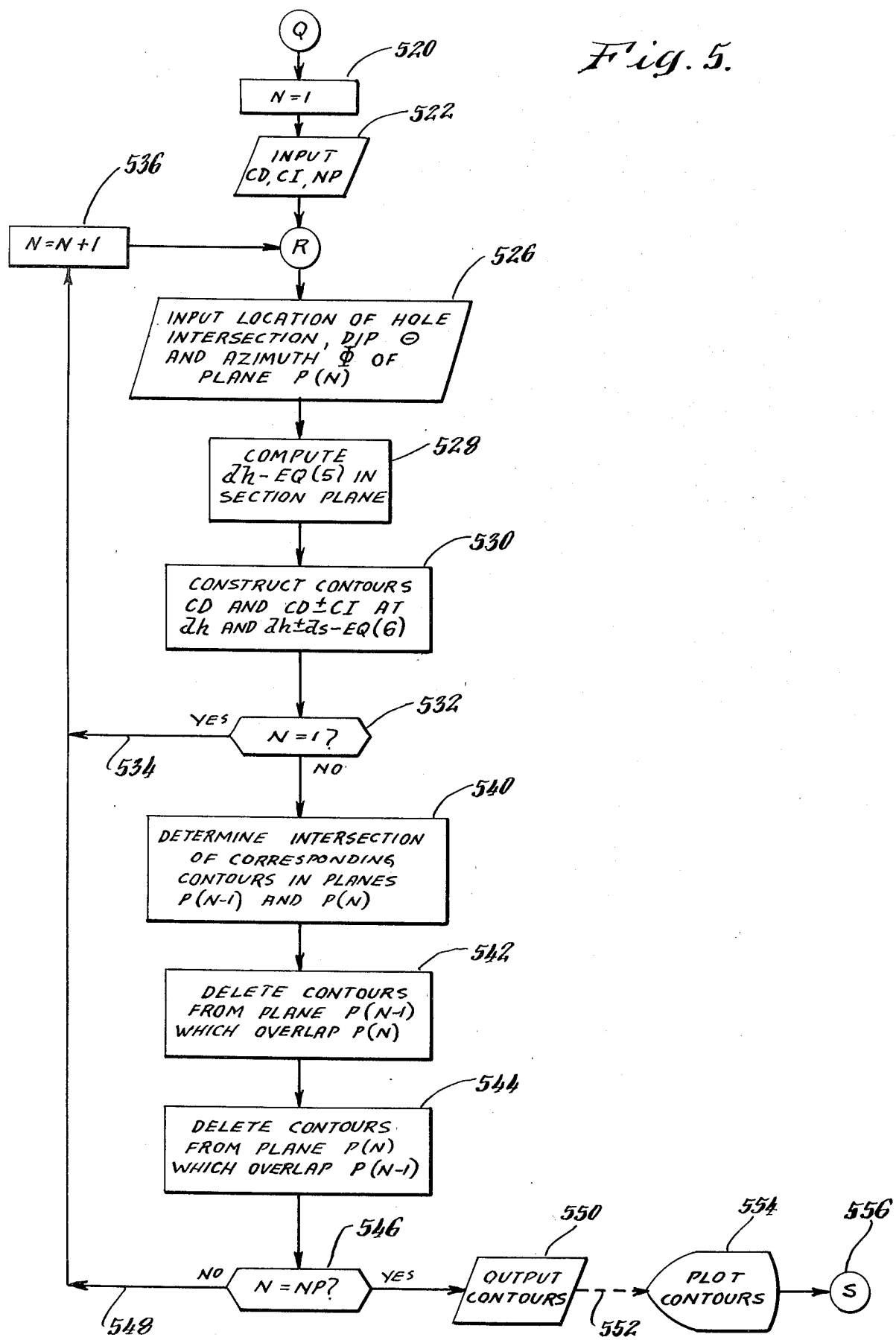
FIG. 5 illustrates one method of producing a three-dimensional representation of formation features from dip and azimuth measurements in the form of a contour map.

As previously stated, one form of implementing the processes of this invention utilize a programmed digital computer. FIG. 5 shows a flow chart illustrating the steps which may be programmed to implement the above-described process on a general purpose digital computer. Each of the illustrated steps may readily be implemented in a small number of programming statements.

Beginning then, at Point Q of FIG. 5, a counter N is initialized to a value such as 1, corresponding to the first plane to be contoured. This is illustrated in Block 520 by the programming statement "N=1", for example. The next step in the process may be as illustrated in Block 522, where the contouring information is specified. Here the contour depth CD, the contour interval CI and the number of planes NP would be input. Note that all the steps would not need to be specifically programmed as shown in such figures. For example, the steps illustrated in Blocks 520 and 522 could be reversed in sequence and the effect would be the same.

Point R of FIG. 5 illustrates a common return point for the process which will be referenced again in the following description. The next Block 526 indicates further input and corresponds to the location of the borehole intersection, the dip $\Theta$ and the azimuth $\Phi$ of the first plane P(N) to be contoured. Here the borehole intersection is designated both in terms of its depth DP and also as to its map location h, as referenced to the x and y coordinates of the map, as shown in FIG. 4B.

The designation P(N) corresponds to the current plane and, as will be recognized, a series of such planes will be considered. Thus P(N) corresponds to the current plane, P(N+1) designates the next plane to be processed and P(N−1) designates the last plane processed. The input is arranged such that adjacent planes are processed in sequence. Thus, it will be assumed that plane P(N) is adjacent to plane P(N+1), for example.

The next step in the proess as indicated by Block 528 is to compute the horizontal distance dh using Equation (5) previously described. Since the value DP and the azimuth $\Phi$ of the dip define a vertical section plane, it is convenient to measure dh from the borehole point at DP in the horizontal plane defined by the azimuth $\Phi$. Positive values of dh are measured in the up dip direction and negative values of dh are measured in the down dip direction from the borehole. Thus the point for constructing a given contour CD is defined by dh measured accordingly from the borehole along the azimuth $\Phi$.

The next step in the process as indicated by Block 530, is to construct a provisional contour and, as is well-known, such contours are constructed in the horizontal plane and perpendicular to the azimuth $\Phi$. Block 530 further indicates additional contours may be constructed parallel to this contour and at spacings corresponding to ds. The computation of ds may utilize Equation (6) and the previously specified contour interval CI. Two or more contours are needed to define a given plane or formation surface. A single contour provides the strike of the surface and defines it as a plane if it is a straight line. Additional contours determine which is up or down dip and the degree of the dip is reflected in the spacing of the contours.

As indicated in Block 532 at least two planes are required to proceed. A test on N, as in Block 532 may be made. As indicated, if N=1, only one plane has been processed and the test answers YES so that the process continues through Branch 534 and to Block 536 where the value of N is incremented by 1. The process continues at previously discussed Point R of FIG. 5. An additional plane designated as P (N), but now where the value of N has increased by 1, will now be processed as described above. When the test indicated in Block 532 finds the value of N greater than 1, the test answers NO, and the process may continue as shown in Block 540 of FIG. 5.

At this point in the process, adjacent planes designated as P (N−1) and P (N) have been processed, and since they have different azimuth or at least dip values, their corresponding contour lines must intersect at some point. Thus the process indicated in Block 540, may now determine the intersection of the contour line corresponding to CD in the two adjacent planes. Similarly, the intersection of the additional contours determined as in Block 530 are determined. Thus a series of intersection points will be defined which correspond to the intersection line between planes P (N−1) and P (N).

Methods of determining the intersection of two lines are well known and may vary in accordance with the coordinate system employed. In one form, the intersection may be determined using only the horizontal plane and thus only two coordinates are involved. For example, the contour line CD in plane P (N−1) and the corresponding contour line in plane P (N) may both be expressed as equations for a line passing at a distance dh from the position h of the wellbore and normal to the azimuth of the dip of the corresponding plane. As such the determination of the intersection may be made by simultaneous solutions of the two equations.

The next step in the process, as indicated by Blocks 542 and 544 may correspond to deleting unneeded portions of the contour lines constructed as indicated in Block 530. After determining the intersection points as in Block 540, it is possible to determine which contour lines overlap which other contour lines. Thus, Block 542 represents the deletion of contour lines which began in plane P (N−I) and extend through the intersection point with the corresponding contour, and thus overlap contours in the plane P (N). The portions of these contours which extend beyond the intersection points and into plane P (N) are not appropriate and are therefore deleted.

In similar fashion, Block 544 reverses the process for the adjacent plane and deletes those contours which begin in plane P (N) and extend through the intersection point and into plane P (N−I). Thus, the intersection points act as termination points of corresponding contours.

At this point, two planes and their intersection have been defined and contoured. As many additional contours as needed to define the area to be mapped may be determined at this or other times in the process. Only two contour lines need actually be determined to define the intersection line.

Block 546 is indicated in FIG. 5 to be the next step in the process and tests to see if the current plane P (N) is the last plane as would be indicated by N=NP. If this is the case, the test would answer YES and the contours would be output as indicated in Block 550. However, if further planes remain to be contoured as indicated by N being less than NP, the test indicated in Block 546 answers NO and the process continues as indicated by Branch 548 to Block 536, previously discussed.

An additional plane would subsequently be read beginning again at Point R of FIG. 5. Again, as previously described, this plane would be contoured, and the intersection of the resulting contours with the previously contoured plane P (N−I) subsequently determined. The above described processes would be repeated until the test indicated in Blocks 546 answered YES indicating all the planes comprising the structural features to be mapped at this time have been contoured.

As indicated by optional Branch 552, the actual contour plot or map need not be made at this time. For example, output representations may now be recorded on magnetic tape for later plotting or transmitted to remote locations for remote plotting at a place or time more convenient to the user. The actual recording, transmission and plotting apparatus are well known and will not be described herein.

As indicated by Point 556, additional processes may follow the previously described process, such as additional surfaces to be mapped or additional structural features to be considered, some of which may be defined by additional features of this invention.

Figure 6A:
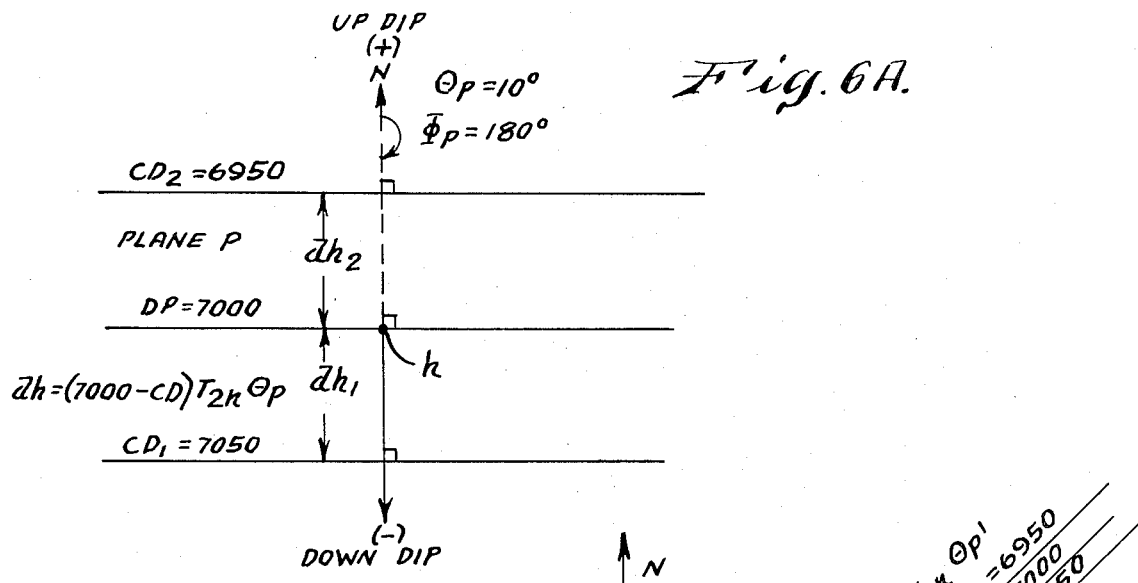
FIGS. 6A through 6F show the status of various line representations at different steps in the process illustrated in FIG. 5.
Figure 6B:
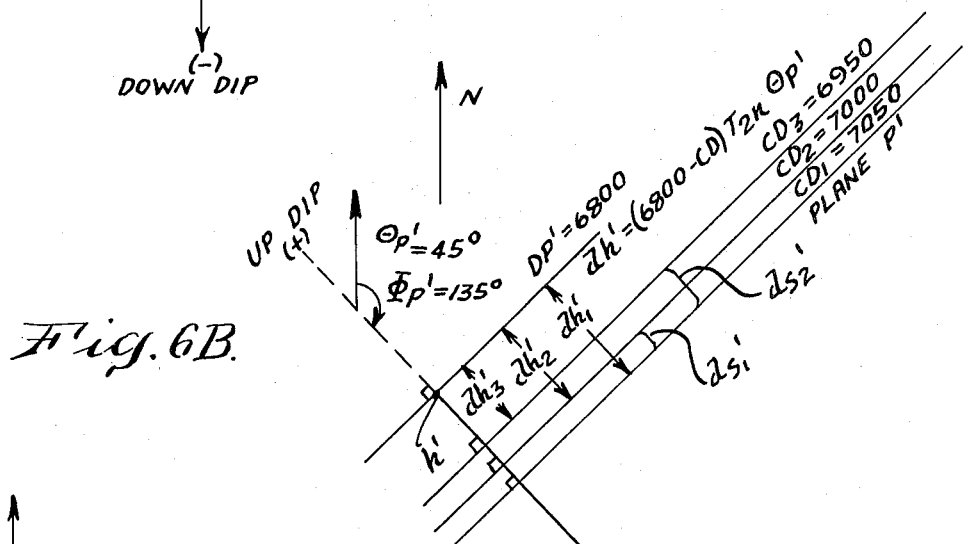
Figure 6C:
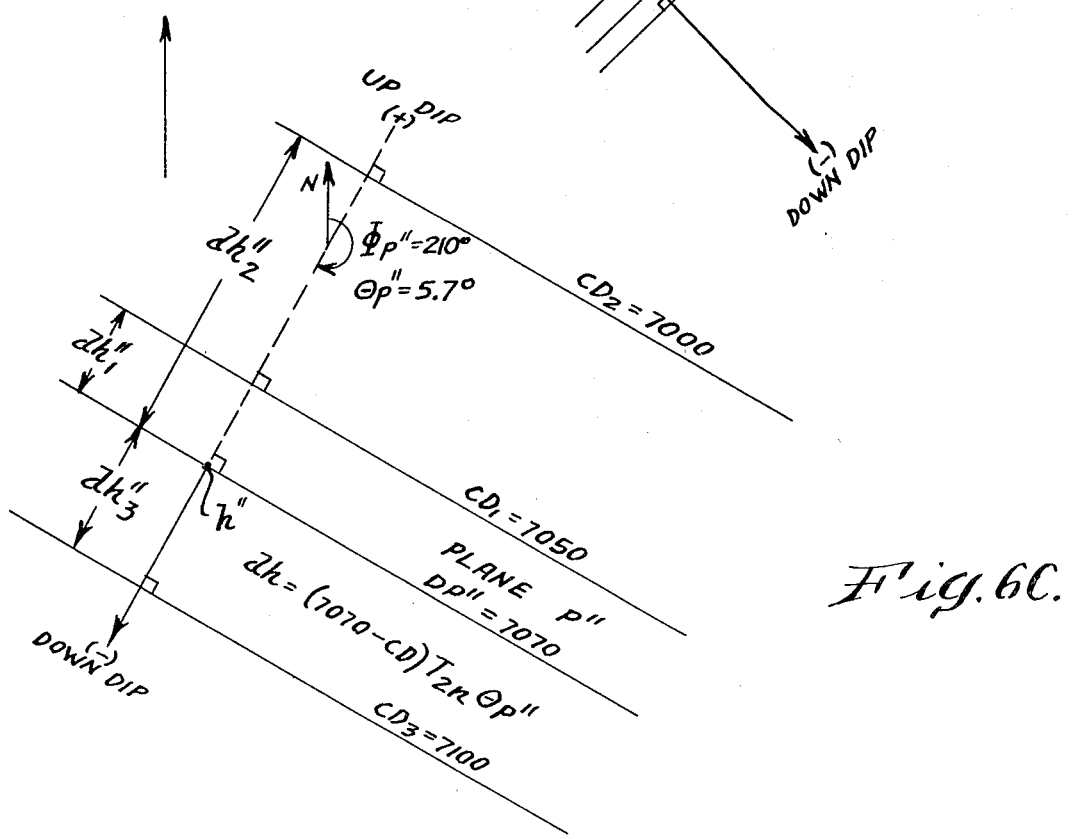
Figure 6D:
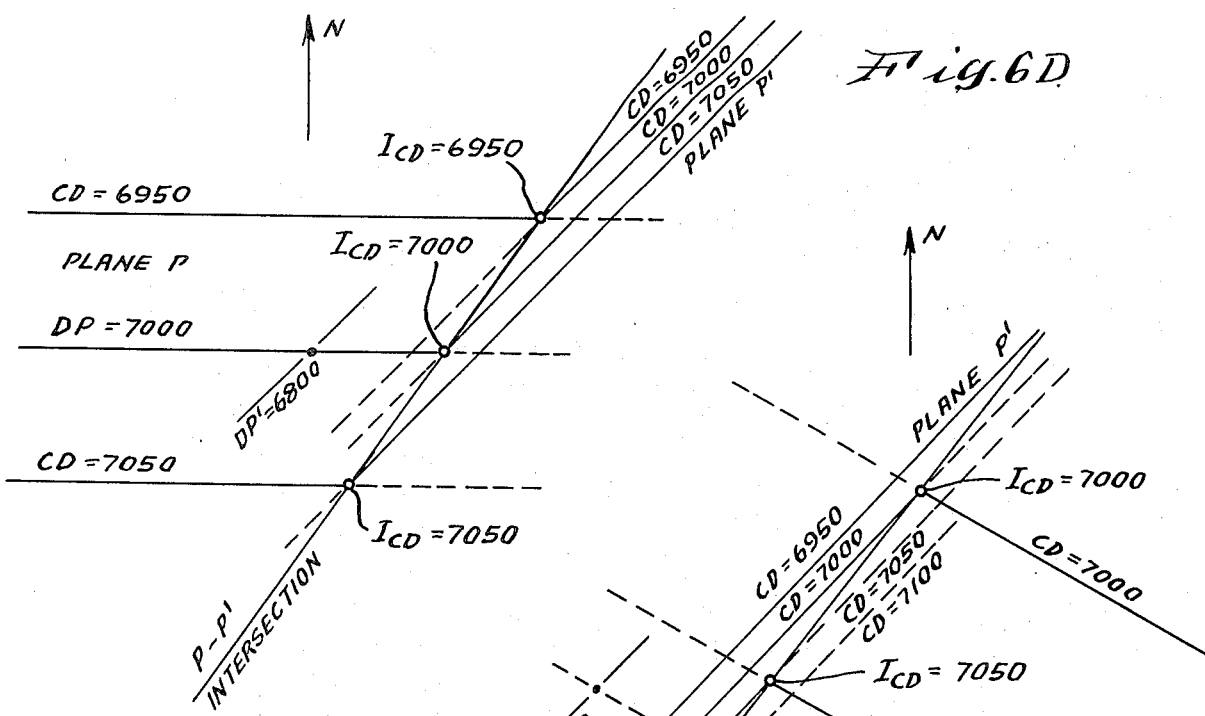
Figure 6E:
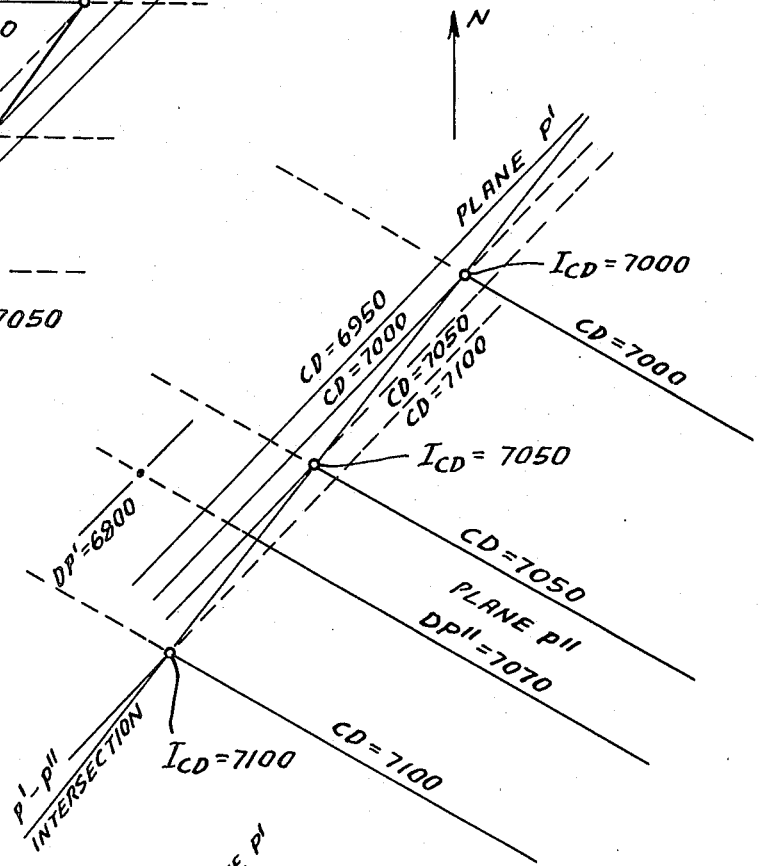

The above described steps are further illustrated in regard to the descriptions of FIGS. 6A through 6F. By way of example, the structural planes shown in FIGS. 4A and 4B are used. FIG. 6A illustrates the construction of contour lines on plane P, FIG. 6B illustrates this step for contour lines on plane P' and FIG. 6C, on plane P". FIG. 6D represents the results of the determination of the intersection points $I_{CD}$ between planes P and P', thus defining the line of intersection between these two planes. Here, the overlapping parts of the provisional contour lines extending from one plane past the line of intersection have been deleted. FIG. 6E illustrates the results of the corresponding step as performed between plane P' and plane P".

Figure 6F:
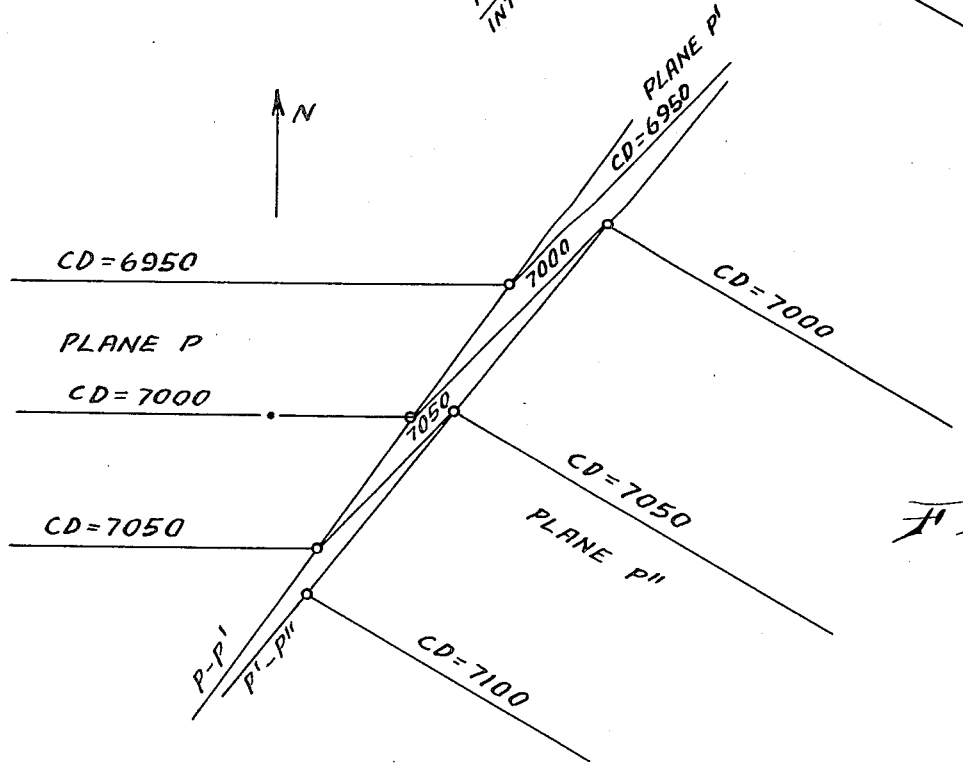

Finally, in FIG. 6F, the resulting contour map without the construction details is shown. Note that here the intersection lines, P-P' and P'-P" are shown. Thus, the contour map of FIG. 6F accurately indicates a formation surface represented by P and P" interrupted by the fault plane P'. As is apparent from the fact that the contour lines in plane P are closer than those in plane P" that the dip of plane P is steeper than that of plane P". Further since these contour lines are not parallel, the fault P' does exhibit rotation.

As previously stated, the above described process may be performed utilizing a general purpose digital computer. As such, it may be performed as part of a generalized procedure for processing dip and azimuth measurements or as a specific procedure for producing three-dimensional representations of a formation feature crossing from one plane to another. Of course, it will be recognized that neither of the planes would necessarily be a fault, but could in fact be a pinch-out of an erosional noncomformity.

Now considering FIGS. 6A through 6F in conjunction with FIG. 5, at Block 522 of FIG. 5, CD=7050, CI=50 and NP=3 are input. At Block 526, the coordinates of the borehole intersection h with plane P, considered here as P(1) are input. The coordinates are referenced to the area to be mapped, as shown in FIG. 4B and include the input of the intersection depth DP(1), here 7000, the dip of plane P(1), here $\Theta_P=10°$ and the azimuth $\Phi_P$ of 180°.

As illustrated in FIG. 6A, distance from the hole at h to the contour CD is then computed as indicated at Block 528. This distance is designated as $dh_1$ in FIG. 6A. The construction of CD and at least one other contour line is indicated by Block 530. The azimuth line is drawn through the borehole intersection point h and oriented in the direction of the azimuth $\Phi_P$. The distance $dh_1$ is measured from h along this line and the contour line CD=7050 is constructed normal to the line at the point defined by $dh_1$ as indicated at Block 530. As previously discussed and as indicated in FIG. 6A, if dh is negative the distance is measured along the azimuth line in the down dip direction and if positive, in the up dip direction.

Additional contour lines may be constructed parallel to the CD=7050 and spaced a distance ds, corresponding to the contour interval from this line. As it turns out in this example, DP=7000 equals one of the possible contours, which in this case, passes through the borehole. Additional contours spaced ds away from these contours may also be constructed as indicated by the contour for 6950.

As indicated in Block 532, it will be determined that only one plane has been contoured, as N=1, and the process continues, incrementing N as in Block 536 and returning to input the definition of another plane.

In this case, the plane P(2)=P' and is the fault separating the upthrown block, which has just beem contoured, from the downthrown block including plane P" and will be contoured later. In this example, the fault is the type known as a normal fault and dips at 45° at an azimuth of 135°. This information, along with its borehole intersection depth DP' at 6800 may often be determined by well-known techniques from dipmeter information alone. If not, the intersection point DP' may be found by determining the intersection of two or more horizons present in both P and P", by the method of determining the intersection of non-parallel planes which will be described later. Thus, the dip, the direction of its azimuth and its intersection depth DP' with the borehole may be found.

The next step, previously described for plane P, is to calculate the distance dh' in the dip azimuth plane. Thus, as indicated in FIG. 6B, dh'=(6800-7050) tan ($\Theta_{p'}$).

As with plane P, the distance dh' is measured along the azimuth plane, here also in the down dip direction, because dh' is negative, to fix the point for the contour depth CD=7050. Additional contours designated as $CD_2$ and $CD_3$ may be calculated either by calculating additional dh' distances using Equation (5) to fix additional contours for $CD_2$=7000 and $CD_3$=6950, respectively. Alternately, these additional contours may be located by calculating, as indicated in Block 528, distances $ds'_1$ and $ds'_2$ for spacing these contours from the base contour CD=7050.

At Block 532, N now equals 2 and the required two planes have been contoured, so the test answers NO. The process illustrated in FIG. 5 would continue now as indicated in Block 540. However, the process could alternately contour all NP known planes first, before continuing. Then, even the provisional contours shown in FIG. 6C could be defined at this time.

For example, FIG. 6C corresponds to plane P" and to the downthrown block resulting from the normal fault corresponding to plane P'. In this case, the downthrown block has a dip of 5.7° and an azimuth of 210°. As often the case with normal faults, the dip and azimuth measurements of plane P" may be obtained from the dipmeter from parallel beds above P". This information, along with the information that its borehole intersection depth is 7070, is input at Step 526. However, the borehole may not intersect the plane P". Thus DP" must be determined in such cases by other methods previously described.

Thus, the contour shown in FIG. 6C may be constructed in the same manner as the contour shown in FIGS. 6A and 6B at this time or at any other time prior to the need for these contours for the determination of the intersection of the corresponding contours in this plane with another plane.

FIG. 6D illustrates, as indicated in Block 540 of FIG. 5, the determination of intersection points $I_{CD}$ between corresponding CD contours from adjacent planes P and P'. In this case, the first plane corresponds to the upthrown block, the second plane P' to the fault plane itself, both previously contoured as shown in FIGS. 6A and 6B, respectively.

As is apparent in FIG. 6D, these intersection points form an intersection line which is designated as P-P' in FIG. 6D. As previously discussed, it may be useful to indicate this line on the actual contour map. It will be noted at this time that the contours extend beyond the intersection points as indicated by dashed lines. For example, the contour CD=6950 extends from plane P through the intersection line P-P' at points $I_{CD}$=6950 overlapping the contours CD=7000 and CD=7050 of plane P'. Block 542 of FIG. 5 corresponds to the removal or deletion of such overlapping portions of the contour lines originating in one plane, here P=P(1)=P(N−1), but extending beyond the intersection point into the adjacent plane, here P'=P(N))=P(2). Thus, the dashed extensions of the CD=6950, 7000 and 7050 contours of plane P are deleted at this time. In similar fashion, the overlapping portions of these same contours extending from plane P' into plane P at the intersection points are also deleted. This latter step is indicated as Block 544 in FIG. 5.

As indicated by Block 546, a process similar to the above may be performed between the contour lines of any additional planes, such as plane P' and plane P", the results of which are illustrated in FIG. 6E. The net results of the above-described process for the three planes, P, P' and P", are shown in FIG. 6F where the details of the determination steps and the deleted contours are now omitted. Only the actual contour lines and perhaps indications of the intersection lines are shown. Thus, FIG. 6F is illustrative of the actual contours which would be plotted as indicated in Block 554.

Figure 7:
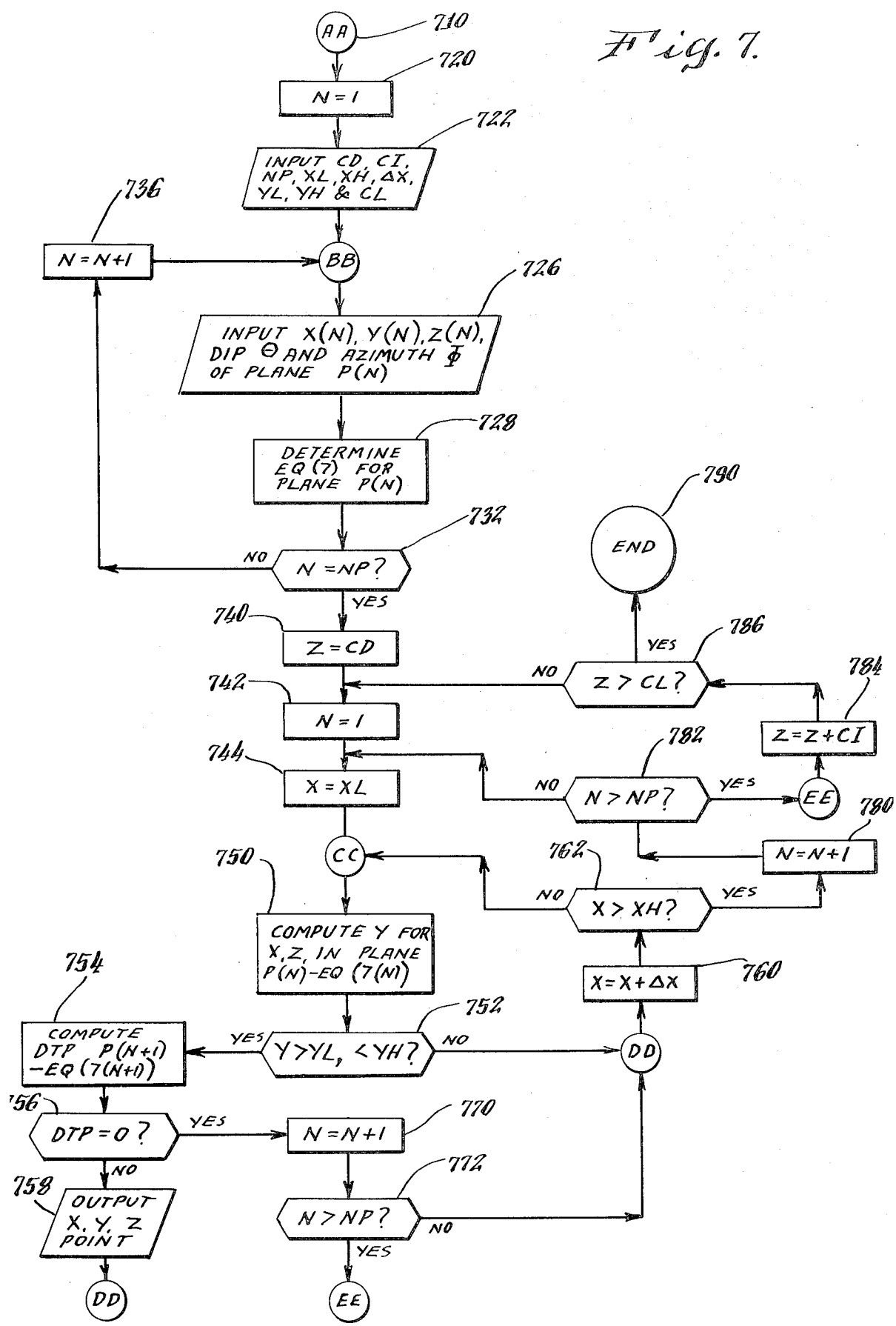
FIG. 7 illustrates another method of producing a three-dimensional representation of formation features from dip and azimuth measurements in the form of a contour map.

In FIG. 7, there is illustrated an alternate method of contouring a given horizon from one plane into several additional planes, here, as before, each plane being designated as P(N), P(N+1), etc. The planes may be input in the order which provides the highest contours in the first plane P(I) and the lowest contours in the succeeding planes. However, the planes may be machine sorted to order the planes in increasing values of DP. It may be convenient to define the last plane; i.e., P(NP) as a vertical plane corresponding to one edge, such as the right-hand edge of an area to be mapped or the map boundaries may be defined as shown in FIG. 4B.

In this particular embodiment, each plane is first described as an equation in terms of its map coordinates X and Y, and depth here designated as Z. In mapping, a given contour depth, Z=CD, is fixed, one of the two map coordinates assumed, and the second found from the equation for the plane. If the determined coordinate is within the mapping area, the distance from this possible map contour point to the next plane is then computed from its equation. If this distance indicates that the current contour in plane P(N) has not yet approached the next plane P(N+1), the contouring process continues. When the contour line is found to intersect the next plane, as indicated by the above distance becoming zero, the equation for the next plane is then used and a distance test is performed for the next succeeding plane, etc. When a given contour line has been tested for all NP planes, the next contour line is attempted until all possible contour lines have been considered.

The equation for a given plane P(N) is defined in three-dimensional coordinates (X, Y, Z) from a known point on its surface, such as its intersection point with a borehole, which may be now designated as X(N), Y(N), Z(N), and its dip $\Theta(N)$ and azimuth $\Phi(N)$ values. The latter two measurements also define three co-efficients specific to plane P(N). These three co-efficients are designated here as A(N), B(N) and C(N). Thus, any point X, Y, Z, in the plane P(N) may be found by solving the following equation:

$$A(N)(X-X(N))+B(N)(Y-Y(N))+C(N)(Z-Z(N))=0 \quad \text{EQ(7)}.$$

where
$A(N) = \sin(\Theta(N)) \cos(\Phi(N))$
$B(N) = \sin(\Theta(N)) \sin(\Phi(N))$
$C(N) = -\cos(\Theta(N))$ Thus, there are NP such equations; i.e., EQ(7(N)) for plane P(N), N=1 to NP.

The above equation may also be used to determine the distance DTP from a given point X, Y, Z to the plane P(N) by substituting the values of X, Y, and Z in the equation for that plane. It is useful to know that if DTP is 0, the point X, Y, Z lies in the plane; if DTP is negative, the point lies above the plane and, similarly, if DTP is positive, the point lies below the plane. Thus, this relationship is obviously valuable in constructing contour maps.

Referring now to FIG. 7, the above-described process may begin as shown at Block 710 at point designated as AA and is subsequently followed by the initialization of the plane indicator N to its initial value as shown in Block 720.

Next, as shown in Block 722, map characteristics may be input and are here designated as the contour depth CD, the contour interval CI, the number of planes NP, the lower and higher X and Y map coordinates; XL, XH, YL and YH, respectively, a mapping increment in one of the coordinates, here for example, $\Delta X$, and a limit CL for contours such that when CL is exceeded, the process is complete.

Next, as shown in Block 726 following the point designated BB, the inputting of the characteristics of each individual plane begins. As previously discussed, each plane is characterized by the X, Y and Z coordinates. For example, X and Y may correspond to the position of the borehole where the plane intersects the borehole at depth Z.

Next, as indicated in Block 728, the coefficients A, B and C and thus the determination of Equation (7), may now take place, thereby defining plane P(N) from the input of the previous step. This may be done for each succeeding plane as indicated in Block 732 until the value of N reaches the total number NP of planes.

When all the planes have been defined as may be indicated as shown in Block 732 by testing for N=NP, the contouring process may begin. The first contour Z may be defined as CD as shown in Block 740. The plane indicator N is again initialized as shown in Block 742 and the initial position of one of the coordinates, here designated as X is set to correspond to one of the limits of the map, here designated as XL, as shown in Block 744.

With the above preliminaries completed, the yet undefined coordinate, here Y, is found by solving for the coordinate in the equation for plane P(N), as shown in Block 750. Of course, it will be realized that there are now NP such equations so the equation for plane P(N) has been designated as Equation (7(N)).

The value of Y thus defined may now be tested against the map limits YL and YH, as shown in Block 752. If Y is within the area to be mapped, the test answer is YES and the process continues as indicated in Block 754.

At this time, all three coordinates X, Y and Z for a point in plane P(N) are known to be in the map area but now it remains to be determined if the point is visible from above, and thus to be contoured. This determination is represented by Block 754 where the distance DPT from this point to the next plane in sequence; i.e., plane P(N+1), is determined by substituting the current X, Y and Z values in the equation for the plane P(N+1) designated here as Equation (7(N+1)). DTP is tested for a small value, as indicated in Block 756 which would indicate the contour had intersected plane P(N+1). If this is not the case, then the contour defined by point X, Y, Z in plane P(N) is a valid contour and may be output as indicated in Block 758.

As previously discussed, the output may be recorded for later plotting or may be plotted at this time. In any case, the process continues to point DD where the coordinate X is incremented by the input increment value $\Delta X$, as shown in Block 760 and tested against its higher limit XH, as shown in Block 762. If the answer is NO, as it would be in most cases, the process returns again to Point CC and the process previously described to compute a new value of Y for this new X value which is then subjected to the above-described test.

If a value of Y found at Block 750 is not contained within the map area, the test indicated in Block 752 answers NO, the process returns to the above-described point DD and a new value of X is determined as described before. In this manner, all possible X and Y values are tested corresponding to contour Z in plane P(N). This continues until the contour intersects the subsequent plane as would be indicated by the test shown in Block 756 answering YES, or all possible X values have been considered as indicated by the test in Block 762 answering YES.

In the former case, the next plane is considered by incrementing the plane indicator N as shown in Block 770 and subsequently testing, as shown in Block 772 against the last plane NP. If not, the test answers NO and the process continues as previously described beginning again at point DD. In this case the contour will now be traced across a new plane until, of course, it either intersects the map boundary or intersects the next plane.

In this latter case, a new plane is again considered, which is again tested, as shown in Block 782, against the last plane NP. If this is not the case, the process repeats by initializing the X coordinate as shown in Block 744. As previously described, Y is determined for all possible X coordinate values. When X exceeds the map limit XH, as indicated when the test in Block 782 answers YES, the next plane is evaluated as indicated in Block 780.

If, however, all planes have been considered, the test considered in Block 782 answers YES and the process continues at Point EE to consider the next contour by incrementing the value of Z by the contour interval CI, as shown in Block 784.

As a method of terminating the process, Z may be tested against the contour limit CL as shown in Block 786, for example. If all contour lines have been considered, this test will answer YES and the process will end, as shown at Block 790. If, however, the test indicated in Block 786 answers NO, the process continues again by initializing the plane indicator N to the first plane as shown in Block 742 and the new contour is considered in the above-described process.

If the test indicated in Block 772 also answers YES, as was the case for the test indicated in Block 782, the process continues as described above at point EE.

Thus, in summary, the above process begins a contour in plane P(N) and continues the contour so long as it stays within the map coordinates or until it intersects the next subsequent plane P(N+1). If either is the case, a new plane is considered until all possible planes have been considered. At this point, a new contour line is defined and the process repeated until all possible contour lines of interest have been considered. As previously mentioned, vertical planes corresponding to the edges of the area to be mapped may also be employed to terminate the contour lines; i.e., when a contour line in plane P(N) is found to intersect plane P(N+1), where this latter plane is a vertical plane defining one of the map boundaries, and also corresponds to the last plane P(NP), the contour would be terminated.

It has been convenient to assume all dip measurements are structural in nature. However, this is an oversimplification, which can be dangerous in structural mapping. As is well-known in the detection of folded structures, changes in their dip or azimuth with depth is considered to be significant. If a stray measurement, perhaps caused by a stratigraphic feature, was considered as a structural surface, distortion of the structural model may occur.

As previously discussed, there have been prior art attempts to separate stratigraphic and structural dipmeter information. For example, the prior art attempts at defining what is known as "red" patterns, "blue" patterns and "green" patterns have this objective in mind. To some extent, the azimuth frequency plot is also useful. However, there are cases where none of the above processes provide conclusive results. Further, it is important to automate the process however it be accomplished.

The ideal process should be able to distinguish between and separate structural and stratigraphic dips. Structural dips are obviously useful in determining the characteristics of the structural models described herein. Stratigraphic dips are useful in determining the stratigraphic environment. Further, the use of structural dip is advantageous in the stratigraphic dip analysis once these two types of dips are separated. For example, stratigraphic analysis is simplified if subsequent structural deformation can be removed, thus restoring the stratigraphic information to the state that existed before the structural deformation.

Figure 8A:
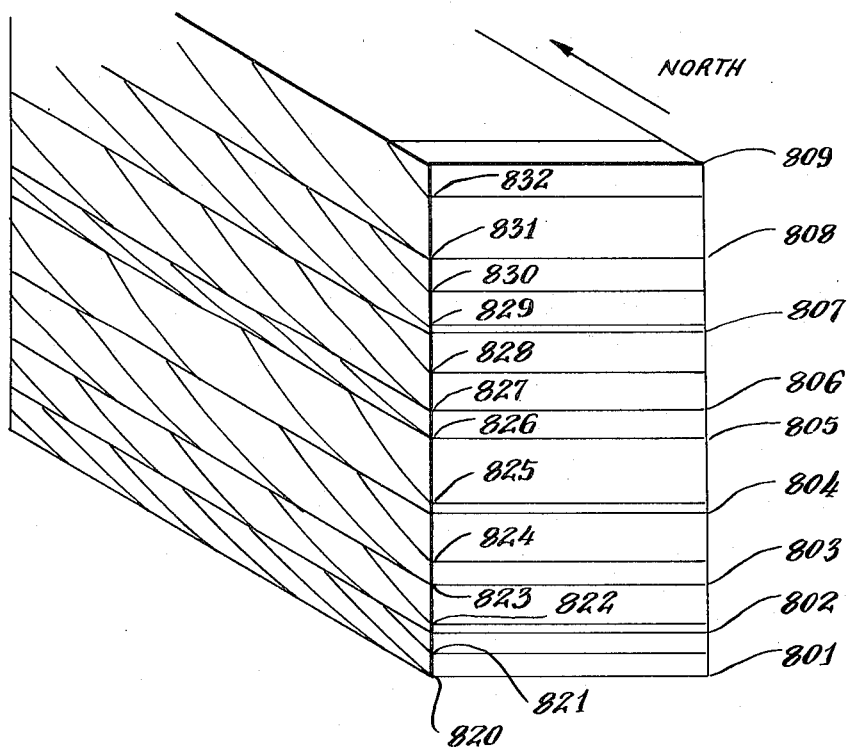
FIGS. 8A and 8B show how a mixture of stratigraphic and structural dips affect dip distributions and averages.

To further appreciate the nature of the problem, refer now to FIG. 8A where there is illustrated a section of formation containing both structural and stratigraphic dips. In this figure, the structural dips approximate horizontal planes and are designated as lines 801 through 809. In between these planes are numerous curves surfaces representative of stratigraphic components deposited between the structural planes. Unfortunately, the stratigraphic surfaces produce dipmeter signals which are not readily distinguished from the signals from the structural surfaces. Consequently, both structural and stratigraphic surfaces result in dip and azimuth measurements.

Figure 8B:
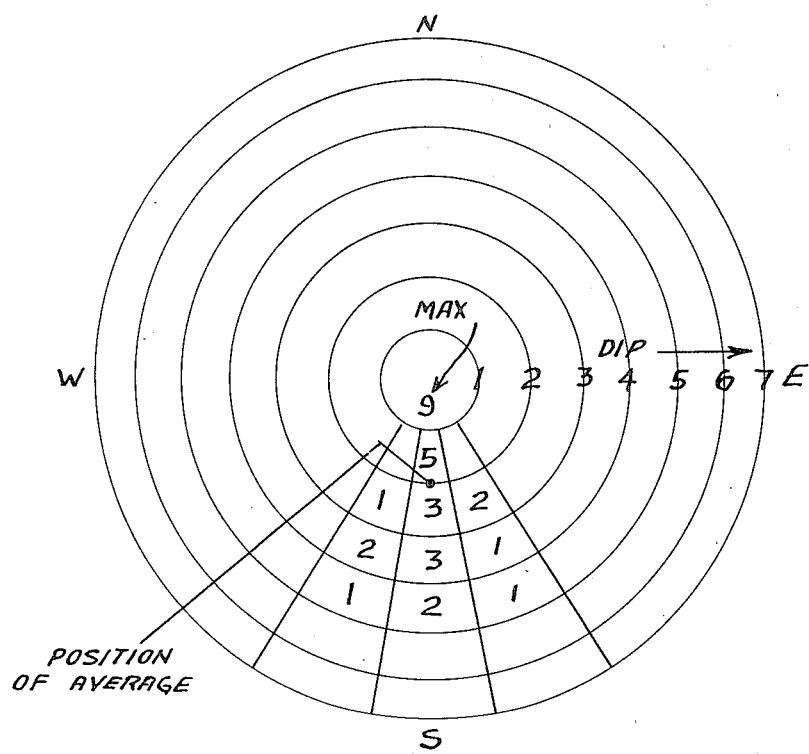

FIG. 8B illustrates a prior art attempt to compensate for stray stratigraphic dips. The figure represents a plot of the frequency distribution of the azimuth values for the dip measurements obtained from a section such as depicted in FIG. 8A. A circle is divided radially into increments of possible azimuth values, only three of which are shown. Additional concentric circles may be used to classify the dip magnitudes into groups of incremental values. Thus, all dips within a given range would fall within Circle 1 and dips within an additional dip increment between Circles 1 and 2, etc. In this case, increasing dip values are plotted in circles closer to the outside of the figure. The system of concentric circles and radial lines divides the figure into a number of areas used to classify the dip and azimuth measurements. In this case, the number in a given area represents the number of dip and azimuth values having the characteristics bounding the area.

In the illustrated case, the maximum number of dips found in a given area is nine. Other areas contain only five, three, two or one or zero dip measurements.

In at least one prior art method, the average dip value would be used for the structural dip. The average dip measurement in this case is a point indicated on Circle 2 of the figure. This value is obviously influenced by some of the stratigraphic dips.

Examination of FIG. 8A points out that the structural dip represents a limiting value for the stratigraphic dips. Stratigraphic dip surfaces build in dip magnitude from the structural dip with increasing deposition. Further, the increase in dip magnitude of the stratigraphic features often result in increasing deviations of the azimuth values. Thus, stratigraphic dips may be characterized by a wider distribution of dip and azimuth values while structural dips are characterized by substantially consistent values. In addition, the structural dips tend to be confirmed by the limiting case of the stratigraphic dips. Thus, the stratigraphic dips may be statistically distinguished from structural dips. Once this distinction is made, structural dips may be separated to determine a structural model, for example.

Figure 8C:
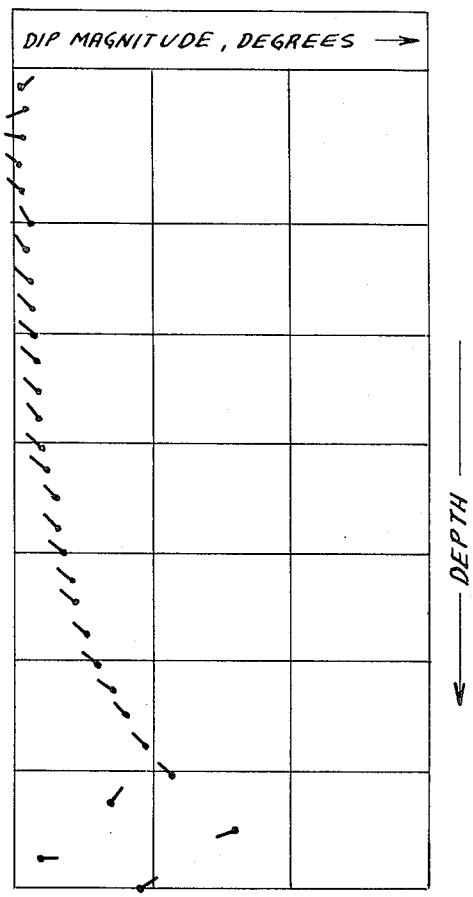
FIG. 8C shows an idealized progression of structural dips with depth indicating a folded structure.

In FIG. 8C there is shown an idealized group of structural dips belonging to a single structural model. In this case, the figure indicates the dip magnitude by a point displaced to the right from a baseline by an amount representative of the dip value. Attached to this point is a line extending outward in the direction of the azimuth for the dip value. FIG. 8C illustrates the case of dip magnitudes which decrease with decreasing depth while having substantially the same azimuth.

Figure 8D:
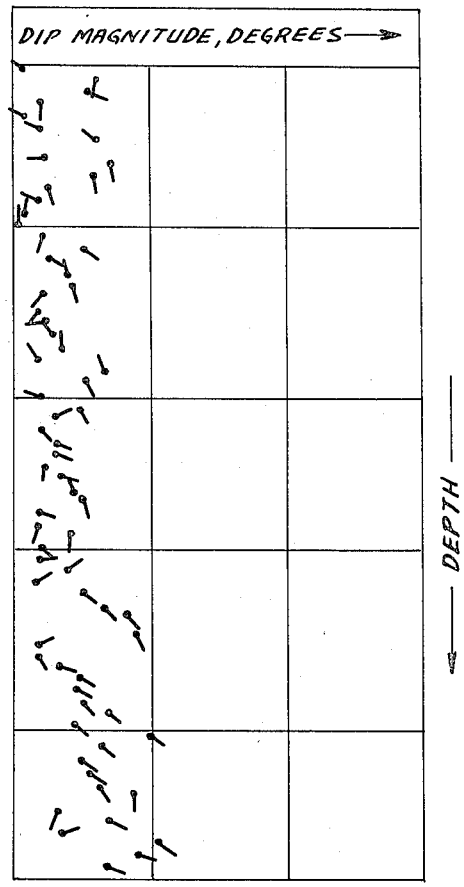
FIG. 8D illustrates typical dip measurements indicating a mixture of both stratigraphic and structural formation features.

In FIG. 8D, an actual example of dipmeter data is shown. In this case, both structural and stratigraphic dip measurements are present. It is apparent that not all of the dip measurements present in FIG. 8D represent a structural feature or should be used to define a structural model.

Structural features are not always as simple as the relatively flat planes depicted in FIG. 8A. For example, in FIGS. 9A through 9C, surfaces which may have been planar at one time are subject to structural deformation and folding.

FIG. 9A illustrates a structural model in which a sequence of formations of varying thickness are folded about a common axis, here designated as A. In this case, the structure may be characterized as being cylindrically folded in that the equations for the surfaces need be defined only in one plane. Further, the model exhibits concentric folding in that the surfaces are circles having a common axis.

The surfaces in model shown in FIG. 9A can be considered as parallel to one another only in the sense that the dip values along the radius of the circles are equal. Thus the radius lines are equal-dip lines. This is a relatively simple model with only a few dip points needed to characterize the model. For example, dips taken from two or more surfaces not located on the same radius or from two well separated points on one surface are all that are required. The dip values are considered as tangents to a family of concentric circles having a common axis. Two vectors normal to two points on one surface, or on different surfaces but having different dips, intersect at the axis of the family of circles, and therefore, define the orientation (direction and position) of the axis. With this information, the equations for any surface belonging to this model may be found and used to construct contour maps or cross-sections as previously described.

FIG. 9B represents a more complex model in that no single axial line exists for all of the surfaces. Rather, the axis of these cylindrical folds lies along a plane. In this case, two dip measurements define the orientation of this axial plane. However, additional measurements must be used to determine the shape of the fold pattern. They should not be obtained along a line parallel to the axial plane, however.

The shape of the model surfaces illustrated in FIG. 9B may be characterized by curve fitting certain properties derived from three or four different dips. The resulting curve may be used as a generatrix to define a family of surfaces related to the axial plane.

FIG. 9C represents a further variation in the structural model. In this case, the cylindrical surfaces may result from formations which varied in thickness before they were folded. However, here no common axis or axial plane is significant to define these surfaces. Rather, a warped axial surface may be considered. In such cases, significantly more dip measurements may be required to define such a structural model. As with the case of the concentric models, the equations for the models shown in FIGS. 9A and 9B may be used to construct either contour maps of any surface belonging to this family.

Additional models and their characteristics may be found in books entitled, STRUCTURAL GEOLOGY by Donal M. Ragan, published by John Wiley & Sons, New York, N.Y., and FOLDING AND FRACTURING OF ROCKS by John G. Ramsey, published by McGraw-Hill Book Co., New York, N.Y. These models are frequently used in the analysis of stress patterns to determine forces which caused the structural deformation.

Dip measurements taken along a borehole penetrating the above described folded structures are expected to vary both in magnitude and direction. When such folded structures still contain remnants of their stratigraphic surfaces, additional variations may be expected, representing the original stratigraphic dips further distorted by the folding.

As previously discussed, stratigraphic dips are expected to vary according to the nature of the deposition. As such, adjacent stratigraphic dip measurements are expected to vary rapidly both within a stratigraphic unit and from unit to unit.

Only the limiting values of the stratigraphic dips are expected to have any regional consistency. Thus, it may be possible to determine structural dip from dip measurements taken solely within a given stratigraphic unit; i.e., if the stratigraphic dips representing their limiting values may be determined and used as structural dips. These limiting values may be further reinforced by measurements representing the structural boundaries between the stratigraphic units. Thus, the combination of limiting stratigraphic dips and structural dips will uniquely effect the distribution of dips in both their magnitude and direction. Thus, it will be necessary to accurately represent variations in both dip magnitude and direction in order to perform the appropriate statistical analysis to determine, for example, the structural dip in the above cases, particularly when the stratigraphic and structural features have been extensively folded.

A dip angle and its associated azimuth direction may be converted into a dip and azimuth measurement representation in the form of a dip vector. More particularly, all such vectors may be considered as having the same length; i.e., a unitary length. These unit vectors may be represented by this x, y and z components in a three-dimensional coordinate systems. For a better understanding of these and other notations used herein, refer now to FIGS. 11A, 11B and 11C.

In FIG. 11A, a three-dimensional coordinate system is shown with its x axis representing the direction North, its y axis the direction East and its z axis representing the direction down or increasing depth. The azimuth $\Phi$ of a dip value is measured from North; i.e., from the x axis to the direction of the dip.

A formation dip may be represented by a dip vector normal to the formation and pointing upward in the direction of decreasing z values. The dip angle is measured from the z axis in a plane normal to the x-y plane and rotated from the x-z plane by an angle corresponding to the dip azimuth $\Phi$. Dip vectors are regarded as having a unitary length of one. A unit dip vector $\overline{U}_1$ may be represented either by its corresponding dip $\Theta_i$ and azimuth $\Phi_i$, by its associated unit vector $\overline{U}_i$ or its vector components $X_i$, $Y_i$ and $Z_i$, as shown in FIG. 11A. These components may be calculated by the following set of equations:

$X_i = \text{Sin}(\Theta_i) \text{Cos}(\Phi_i)$     Equation (9A);

$Y_i = \text{Sin}(\Theta_1) \text{Sin}(\Phi_i)$     Equation (9B);

$Z_i = -\text{Cos}(\Theta_i)$     Equation (9C), as shown in FIG. 11A.

The determination of relationships between two or more dip measurements require that either their angular designations $\Theta$ and $\Phi$ or their components measured along the appropriate coordinate axis be combined to evaluate the relation. For example, in FIG. 11B, two unit vectors, $\overline{U}_i$ and $\overline{U}_{i+1}$, are shown. FIG. 11B illustrates vector relationships $\overline{S}$, $\overline{U}_{av.}$, and $\overline{P}_U$ between unit vectors $\overline{U}_i$ and $\overline{U}_{i+1}$. $\overline{S}$ is a vector sum of a length dependent upon the number and direction of its components. $\overline{U}_{av.}$ is a vector along $\overline{S}$ of unit length; i.e., it is a normalized or unit vector correspondent of S.

$\overline{P}$ is the normalized cross-product vector and is normal to both $\overline{U}_i$ and $\overline{U}_{i+1}$.

The following notation will be used in regard to vectors, unit vectors, their components and normalization.

$\overline{U}_i$ is a unit vector whose components are $X_i$, $Y_i$ and $Z_i$, as shown in FIG. 11A, and are given by Equations (9A), (9B) and (9C), respectively.

$\overline{U}_{av.}$ denotes the unit vector U carried by the vector sum $\overline{S}$ of several unit vectors.

$\overline{S}$ denotes the vector whose components, $S_x$, $S_y$ and $S_z$, respectively, are the algebraic sums $\Sigma$ of the x, y and z components of the unit vectors summed; i.e., $$S_x = \Sigma x_i, \quad S_y = \Sigma y_i \text{ and } S_z = \Sigma z_i.$$

$\overline{U}_{av.}$ is along the direction of S as shown in FIG. 11B and is denoted as an average because its components: $U_x$, $U_y$ and $U_z$, are the averages of the components of the set of fectors summed; i.e., the algebraic sums divided by a normalizing term R; $U_x = S_x/R$, $U_y = S_y/R$ and $U_z = S_z/R$.

R is a normalizing term used to correct the vector sum components $S_x$, $S_y$ and $S_z$ to the components: $U_x$, $U_y$ and $U_z$ of the unit vector $\overline{U}_{av.}$ $$R = \sqrt{(\Sigma S_x)^2 + (\Sigma S_y)^2 + (\Sigma S_z)^2} .  \quad \text{EQ. (9D)}$$

$\overline{U}_i \cdot \overline{U}_{i+1}$ denotes the dot product of the two unit vectors, $\overline{U}_i$ and $\overline{U}_{i+1}$. It is a scaler equal to the Cosine of the angle between the unit vectors. It has no components; i.e., it is only a number corresponding to the normalized sums of the products of the unit vector components in the same plane. These products may be computed by the following equations:

$$D_x = X_i X_{i+1} \quad \text{EQ. (9E)}$$

$$D_y = Y_i Y_{i+1} \quad \text{EQ. (9F)}$$

$$D_z = Z_i Z_{i+1} \quad \text{EQ. (9G)}$$

$R_i$ denotes the normalizing term for the unit vector $U_i$ and $R_{i+1}$ for $U_{i+1}$. Either is given by EQ.(9D) but now the components of only one vector are summed so $\Sigma S_x = S_x = X_i$, for example. The complete normalizing term is the product of $R_i$ and $R_{i+1}$. Thus, the dot product is found by combining the above as $$\frac{D_x + D_y + D_z}{R_i R_{i+1}} . \quad \text{EQ. (9H)}$$

$\overline{U}_i \times \overline{U}_{i+1}$ denotes the normalized cross product $\overline{P}_u$ of the two unit vectors $\overline{U}_i$ and $\overline{U}_{i+1}$. It is a vector proportional to the Sine of the angle between the unit vectors. Its components are the normalized differences of the products of the unit vector components in the opposing planes. These differences may be computed by the following equations:

$$P_x = Y_i Z_{i+1} - Y_{i+1} Z_i \quad \text{EQ.(9I)}$$

$$P_y = Z_i X_{i+1} - Z_{i+1} X_i \quad \text{EQ.(9J)}$$

$$P_z = X_i Y_{i+1} - X_{i+1} Y_i \quad \text{EQ.(9K)}$$

L denotes the normalization term used for this product's components and is given by the equation:

$$L = \sqrt{P_x^2 + P_y^2 + P_z^2} . \quad \text{EQ. (9L)}$$

The normalized components $P_{xu}$, $P_{yu}$ and $P_{zu}$ of the normalized cross product vector $\overline{P}_u$ are found by the following equations:

$$P_{xu} = P_x/L \quad \text{EQ. (9M)}$$

$$P_{yu} = P_y/L \quad \text{(EQ. (9N))}$$

$$P_{zu} = P_z/L \quad \text{EQ. (9P)}$$

Further in regard to the notation refer now to FIG. 11C where a three-dimensional projection surface in the form of a sphere is is illustrated. The x and y designations remain the same. The dip vector normal to the dip plane is projected from the origin into the upper hemisphere. It will be appreciated that the spherical surface equally and accurately represents variations both in dip $\Theta$ and azimuth $\Phi$.

In order to transform this desirable property from the three-dimensional spherical representation into a two-dimensional representation; i.e., in the x and y coordinates only, a transformation will be necessary which preserves this property. The desired transformation should convert a given area in the spherical surface dA into a directly proportional area da in the x-y plane. Since the surface area of a circle of the same radius R as that of the hemisphere is one-half that of the hemisphere, it is to be expected that da equals one-half dA. It can be shown that the needed transformation may be accomplished by representing the dip vector as a point in the x-y plane located in the azimuth plane at a distance r from the origin where:

$$r = R \sqrt{2} \; \text{Sin}(\Theta/2)$$

as shown in FIG. 11C.

In terms of its corresponding x and y components, the location of the two-dimensional point representation of the three-dimensional dip vector takes the form of two equations:

$$x = S \times \text{Sin}(\Theta(I)/2) \text{ Cos}(\Phi(I)) \quad \text{EQ. (10A)}$$

$$y = S \times \text{Sin}(\Theta(I)/2) \text{ Sin}(\Phi(I)) \quad \text{EQ. (10B)}$$

where $\Theta(I)$ and $\Phi(I)$ are the corresponding dip and azimuth measurements for depth D(I).

In accordance with the invention, formation dip and azimuth measurements may be automatically processed to perform a statistical analysis using a coordinate system to equally and accurately represent variations both in dip and azimuth. One such system may be the three-dimensional coordinate system as described above with equal areas represented in the x, y and z; or spherical notation. Another such system may be the two-dimensional x-y coordinate system described above in which the dip and azimuth measurements are represented by a point properly transformed from the three-dimensional to the two-dimensional system so as to preserve its equal-area characteristics.

In any case, the coordinate system is divided into a number of cells having such an equal-area characteristic. For example, the transformed x and y axes may be divided into equal increments and thus divide the surface of a circle into equal-area cells. These cells may then be used in mapping the distributions of dip vectors. In this manner, cells in the transformed x-y plane equally represent small variations in dip and azimuth measurements. To retain the needed resolution these cells should be no larger than 8 degrees on edge. It is important to appreciate that a surface so divided is substantially different than the typical prior art counterpart.

With the above described notations and concepts understood, additional methods of automatically processing formation dip and azimuth measurements will now be described.

In the above description, it is apparent that the determination of a representative dip and azimuth measurement corresponding to a given plane or structural surface may not always be a simple procedure. As previously discussed in regard to Block 310 of FIG. 3A, in some cases an analysis of many dip and azimuth measurements may be required to improve the accuracy of a representative dip and azimuth, particularly, for instance, for the case of very low dips which lack in azimuth resolution. More particularly, when stratigraphic dips which may differ substantially from structural dips and known to be present, as in the case illustrated in FIG. 8A, the analysis must be able to separate the structural and the stratigraphic dips. One such analysis which will now be described is illustrated in the process flow diagram given in FIGS. 10A and 10B.

In this process, a relatively large number of dip and azimuth measurements obtained over a relatively long depth interval, perhaps resulting in one hundred or more measurements, is considered in the beginning of the analysis. Each dip and azimuth measurement is represented by its unit vector computed as previosly described in regard to FIG. 11A. In the preferred method, the dip representation takes the form of a point in one of the equal-area divisions of a hemisphere, transformed into x and y coordinates s described in regard to FIG. 11C. The angular components of dip and azimuth measurements are converted into coordinate components of a dip vector representative.

Its components are transformed and scaled into index values corresponding to an equal-area representation of the sphere in the form of two-dimensional cells. The indexes form the addresses of the cells. Thus, a dip representative results in index values which correspond to one of the equal-area cells. A count is made of the number of dip representatives from a given borehole interval resulting in an address corresponding to a particular cell. Further, the cell corresponding to the maximum number of dip representatives is determined, as well as any additional cells corresponding to large numbers of dip representatives.

If the maximum cell is distinguishable both by discontinuous separations from other maxima corresponding to large numbers of dip representatives and by substantial differences in the number of dip representatives corresponding to these maxima, the cell corresponding to the maximum number of dip representatives is considered to indicate the dominant mode of the dip representative distribution. Thus, the dip representative corresponding to this cell statistically represents the structural dip while the dip representative corresponding to other maxima may correspond to stratigraphic dips, or in some cases, to structural dips from surfaces included temporarily in the depth interval originally considered in the analysis.

If a cell corresponding to substantial numbers of dip representatives cannot be distinguished as an unique mode representative of a distinct formation interval, the interval is reanalyzed to determine which depths correspond to which modes. In this manner, dip representatives corresponding to depth intervals distinct from the depth intervals associated with the maximum mode; i.e., secondary modes distinct from the dominant mode, may be removed from the current analysis. This removal process usually allows the clear distinction of a single dominant mode and a corresponding depth interval. In this manner, a sequence of dominant modes for dip distribution; i.e., structural dip representatives, and corresponding depth intervals are determined.

These structural dip representatives may be used in a determination of three-dimensional representations of the formation features corresponding to the structural dips in accordance with other methods of the invention described herein. Minor modes occurring within the corresponding depth intervals or between depth intervals represented by the structural dips may be regarded as stratigraphic dips and thus processed separately as described elsewhere herein. Further, the determined structural dip representatives may be used to correct stratigraphic dip representatives for structural changes occurring after deposition and to thereby facilitate the analysis of stratigraphic dips.

Referring now to FIG. 10A, there is illustrated in the form of a process flow diagram a description of a process for automatically analyzing dip and azimuth measurements representative of a series of formation features at various depths in a borehole for variations in both dip and azimuth with depth. In the preferred form, the dip and azimuth measurements are dip representations in the form of vectors normal to corresponding formation features.

The process may begin as indicated in Block 1002 of FIG. 10A, corresponding to the initialization of an index counter NDR, for the number of dip representatives determined, to an initial value, here 1. The next step may be as shown in Block 1004, which corresponds to the input of certain parameters used to control the method of analysis, more particularly, certain tolerances used in the statistical tests.

For example, input may include the illustrated parameters CTOL, ITOL, PTOL and FTOL. CTOL corresponds to the minimum difference in the number of occurrences of two different dip distribution modes in order to allow both modes to be considered as possibly separate modes, as will be described later. The parameter ITOL is an angular increment which must separate two distinct modes.

Figure 12A:
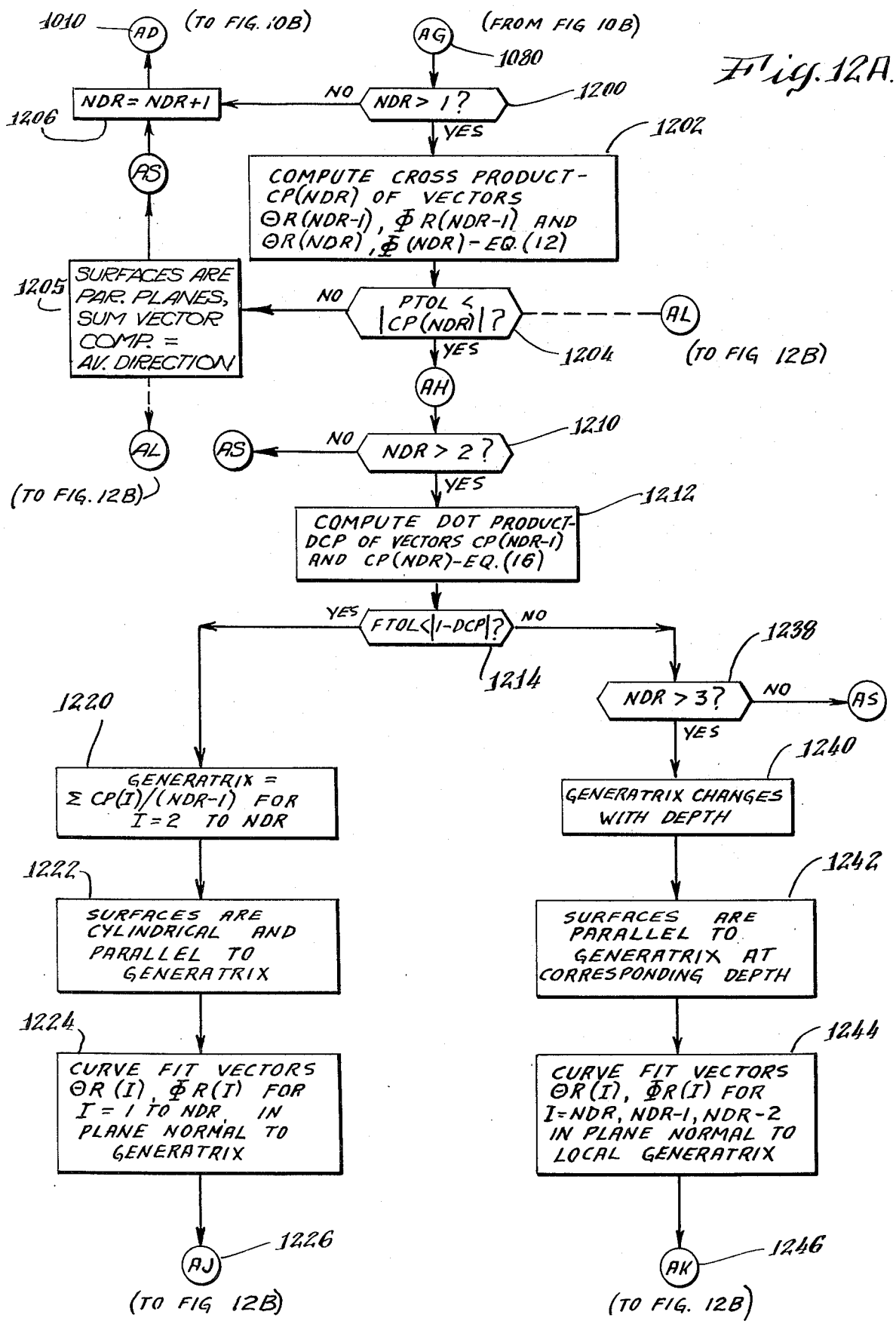
FIGS. 12A and 12B illustrate in detail a method of producing three-dimensional representations of formation features in the form of a map of formation representing a structural model.
Figure 12B:
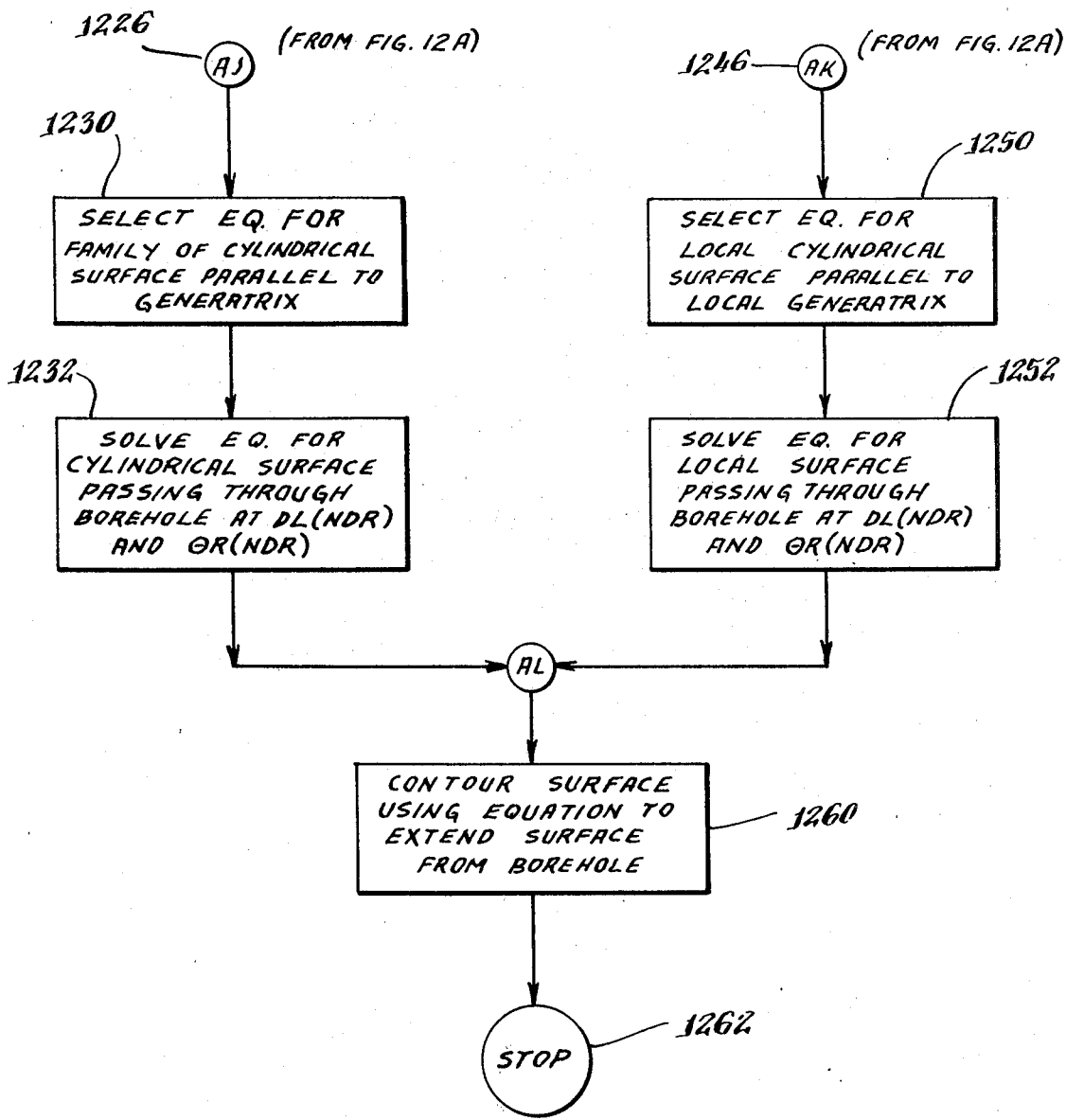

The parameters PTOL and FTOL are used in a subsequent process described in FIGS. 12A and 12B. PTOL corresponds to a small deviation tolerated in the cross product of two dip vectors used to detect parallel planes. FTOL corresponds to a small deviation permitted in a dot product of two cross product vectors from a value which distinguishes them as belonging to a family of cylindrically folded surfaces. The use of these tolerance parameters will become more apparent with the following description.

In Block 1008 of FIG. 10A, an initializing process is indicated which may be performed at this time. A constant M corresponding to the number of dip and azimuth measurements to be considered in the initial analysis is set to some arbitrary large number; for example, 100. Four storage parameters are initialized in order that subsequent values may be distinguished from the initial values. These storage parameters are IMAX, I, DL and DU, which may be set, respectively, to 0, 1, 0, and 100000. The DL and DU are set to very low and very large values, respectively, so that subsequent higher and lower values are meaningful.

The next step in the process may be as indicated in Block 1012 which corresponds to the input of a given depth D(I), and its corresponding dip Θ(I) and dip azimuth Φ(I) measurements. As previously discussed, this input may be obtained from previous output of a dipmeter correlation program, from manually determined measurements or from any of several prior art processes useful for determining such measurements. Then, as indicated in Block 1014, these measurements may be converted into a dip vector representative, or preferably, converted to its two components, x and y in a two-dimensional classification system which equally represents variations in both dip and azimuth. These components may be obtained by utilizing Equations (10A) and (10B), as previously described in regard to FIG. 11C.

Once these components have been determined, they may be scaled into their corresponding x and y index values, here designated as IX and IY, respectively. This scaling utilizes a scale factor S which considers the range of possible component values (from $+1$ to $-1$ or 2) and the total number of incremental divisions used to represent this range, usually 50. As previously discussed and as indicated in Block 1016, cells or arrays may be used to count the number of occurrences of a small range of corresponding dip values. One method of performing this count is to use the above-derived index values, IX and IY, as addresses corresponding to subscripts of a dimensioned array, here designated as CELL(IX,IY). The contents of this designated cell are then increased each time this combination of IX and IY values occur.

For example, consider $\Theta(I)=20°$ and $\Phi(I)=35°$ are read at Block 1012. At Block 1014, Equation (10A) gives $x = S \times \text{Sin } (20°/2) \text{ Cos } (30°) = S \times 0.174 \times 0.574$, and EQ.(10B) gives $y = S \times \text{Sin } (20°/2) \text{ Sin } (35°) = S \times 0.174 \times 0.819$ or approximately 0.105 and 0.145, respectively. $S = R\sqrt{2}$ and if R is considered here as unity so that $S = 1.414$, $X = 0.14$ and $Y = 0.20$. Further, if the scale factor was 25 for 50 divisions of each axis, $IX = 4$ and $IY = 5$. (Note here a roundoff of 3.5 to 4.0 is made for IX). CELL (IX,IY) = CELL (4,5). Thus, only this cell (out of $50 \times 50$ or 2500 cells) represents these measurements. Its previous contents may then be increased by one to perform the counting of such corresponding measurements. It is convenient at this time to track the cell corresponding to the maximum number of counts which may change as a result of the process indicated in Block 1018 of FIG. 10A. The test indicated in Block 1020 determines if the previous maximum value IMAX is exceeded by the current count of the CELL (IX,IY) corresponding to the instant dip measurement. If this is the case, the test answers YES and the process continues to Block 1022 where the value of IMAX is updated to equal the count in CELL (IX,IY) and the IX and IY address of the above cell stored in the storage parameters IXM and IYM. The process then continues as would be the case if the test indicated in Block 1020 answered NO, which would be the case if no new maximum count resulted from the processing of the instant dip measurement.

It is also convenient at this time to create a table of values for subsequent use in a process which will be described later in regard to FIG. 10C. Thus, as indicated in Block 1024 of FIG. 10A, a table is recorded containing the values of the depth D, the unit vector components X and Y for the dip vector, the cell coordinate addresses, IX and IY, all for the current (Ith) dip measurement.

The above described processes may then continue for a relatively large number M of measurements. M was previously established as shown in Block 1008. Thus, the test indicated in Block 1026 compares the number I of measurements processed with M, the number to be processed, and if more remain the test answers NO and the process continues as indicated to Block 1028 where the counter I is incremented to begin again with a new measurement at the point designated as AD in FIG. 10A. The above-described process continues until the test indicated in Block 1026 finally answers YES in which case a search for secondary maximum cells begins.

The above search may be performed as indicated in Block 1032 in any manner which locates cells other than the cell at IXM and IYM and which correspond to the next maximum count of dip measurements. Such cells may be found by a process such as shown in Blocks 1020 and 1022. When found, their maximum count may be designated as IMAX2 and their location as IXM2, IYM2, for example.

Such secondary maximum cells may be tested to see if their maximum values are close to that of the dominant maximum. For example, if the test indicated in Block 1034 of FIG. 10A finds the secondary maximum IMAX2 within CTOL counts of the dominant maximum IMAX, this test answers YES and the process continues with further testing to see if this secondary maximum is located near the dominant maximum.

One such nearness test is to test to see if the location of this cell is separated by more than ITOL cells from the maximum cell in both the X direction, as indicated in Block 1036, and Y direction as indicated in Block 1038. If this is the case, both these tests answer YES and two separate modes have been distinguished. However, if either of the above indicated tests answers NO, further analysis must be performed in order to distinguish a uniquely dominant maximum or mode. This distinction process is illustrated in FIG. 10C beginning at a point designated AI, and will be discussed shortly.

Figure 10B:
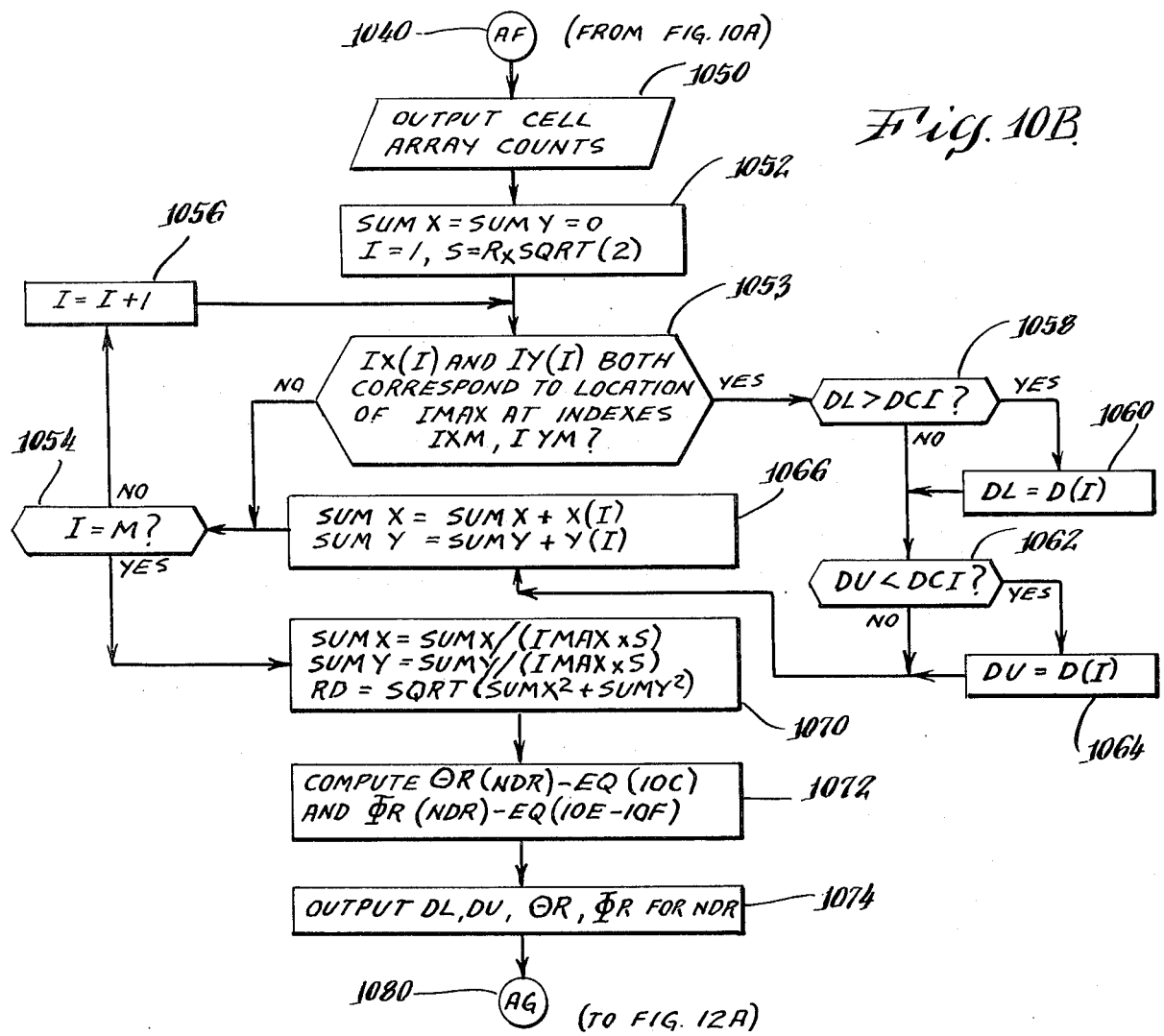

If a distinct mode for the dip vector distribution is found, the process continues as indicated by the test in Block 1034 of FIG. 10A, answering NO and beginning at point AF in FIG. 10B. There, as indicated in Block 1150, or at any similar time, it may be convenient to output, perhaps as a lineprinter listing or display, the contents of the two dimenstional array CELL (IX,IY). This may be done in the form of listing the count values of each of the cells in the cell array. Preferably, this would be done in a manner such that the rows in the listing correspond to cells along one axis and the columns in the listing correspond to cells along the other axis. Here, the two-dimensional cell array is a representation of the previously described three-dimensional equal-area sphere illustrated in FIG. 11C. In this manner, another three-dimensional representation, in this case, in two physical dimensions, is automatically produced with a machine in accordance with this invention.

In another process illustrated in FIG. 10B, representative dip and azimuth measurements along with an automatically defined corresponding depth interval, are determined. This process may begin as illustrated in Block 1052, for example. Here, X and Y component accumulators SUMX and SUMY, respectively, are zeroed and the dip measurement index I is set to its initial value. Further, a scaler $S = R \times SQRT(2)$ may be computed at this time for later repetitive use. Herein, SQRT designates the determination of the square root of the quantity following this designation. As is well known in the programming art, routines for this and similar standard functions are readily available.

Next, as indicated in Block 1053, the process may continue by searching a table, previously recorded as indicated in Block 1024, and testing to see if the Ith recorded cell addresses, IX and IY, both correspond to the addresses of the maximum count cell previously defined by its index values IXM and IYM, as indicated in Block 1022. If no correspondence is found, the test answers NO and the procedure tests if all of the tabled measurements have been checked. If not, the test indicated in Block 1054 answers NO, I is incremented as indicated in Block 1056, and the table testing continues at Block 1053 with a new I value.

If, however, the X and Y addresses of any dip measurement are both identical to the X and Y addresses of maximum count cell, the test shown in Block 1053 answers YES and a determination may then be made if this measurement extends either of the previous defined upper or lower depth intervals represented by the maximum count cell. Thus, as indicated in Block 1058, a test may be made to see if the previous lowest depth DL is exceeded by the current measurement depth D(I), in which case the test answers YES, and the DL is updated with D(I), as indicated in Block 1060. If the test answers NO, D(I) is further tested to see if D(I) is shallower than DU, corresponding to the uppermost depth measurement represented by the maximum count cell. If this is the case, the test indicated in Block 1062 answers YES, and DU is updated to D(I), as indicated in Block 1064.

The process then continues as if both depth tests had answered NO by accumulating the instant x and y dip vector components, X and Y, in the SUMX and SUMY accumulators, respectively, as indicated in Block 1066. The above processes continue until the test indicated in Block 1054 answers YES, in which case, as indicated in Block 1070, the x and y accumulations are normalized by dividing them by the number IMAX of accumulated dip measurements corresponding to the maximum count cell. The scaler S as used in the previously described equal area transformation may also be removed in the normalization. As shown in Block 1070, the normalized components are each squared and summed. A vector distance RD is computed from the square root of this sum.

Those familiar with vector computations will readily appreciate that Blocks 1066 and 1070 are steps leading to the determination of the vector sum of all of the dip vector representations corresponding to the maximum or dominant mode cell. Thus a new dip vector has been determined which is representative of the dominant dip measurement mode.

It will be further appreciated that representative dip and azimuth values corresponding to the dominant dip mode, as determined in the above analysis, may be computed from the above vector sum components. For example, as indicated in Block 1072, a representative dip value $\Theta R$ may be computed from the following equation:

$$\Theta R = 2 \sin^{-1}(RD/\sqrt{2}). \qquad \text{Equation (10C)}$$

It will be further appreciated that two equations may be necessary to determine the corresponding azimuth $\Phi R$. Since the azimuth has possible values ranging from 0 to 360 degrees, no single trigonometric function can uniquely distinguish which of the four possible quadrants are appropriate. In such cases, it is well known that the signs of the trigonometric Sine and Cosine functions may be used to make the quadrant determination. Thus, as indicated in Block 1072 of FIG. 10B, the following equations may be used:

$$\Phi R = \cos^{-1}(SUMX/RD) \qquad \text{Equation (10E)}$$

and $$\Phi R = \sin^{-1}(SUMY/RD) \qquad \text{Equation (10F)}$$

If both values are positive (1st quadrant), either value may be used. If the first is negative and the last positive (2nd quadrant), 90° is added, and if both are negative (3rd quadrant) 180° is added, and if the first is positive and the last is negative (4th quadrant) 270° is added to the result of Equation (10E), thus representing all four quadrants or azimuth range of 360°.

The above described steps produce a given set, designated here by NDR, of values characteristic of the interval between the depths now designated as DL and DU. As indicated in Block 1074, these values may be output as desired at this time. Typically, the values of interest will not only include the representative dip and azimuth measurements but could also include optional values. For example, the output could include, for quality control, the number IMAX of dip measurements corresponding to the dominant mode. The above process may be followed by any process utilizing the resulting depth, dip and azimuth representatives, such as the processes previously described, or to be described in regard to FIG. 12A.

However, as previously discussed, the initial analysis may not uniquely distinguish a dominant dip mode, as may be determined as indicated in Blocks 1034 through 1038 of FIG. 10A. In such case, an additional process is required, such as that illustrated in FIG. 10C, beginning at the point designated as AI in FIG. 10A and continuing in FIG. 10C.

Initially, two indicators, NR and I, may be set to 0 and 1, to indicate the number of measurements removed and processed, respectively, in the subsequent procedures. A search is made similar to that of previously described Block 1055 of FIG. 10B, but now to determine which dip measurements correspond to secondary maximum count cells or modes. Here these secondary modes are indicated by their previously determined, as in Block 1032, x and y addresses, IXM2 and IYM2, respectively.

Figure 10C:
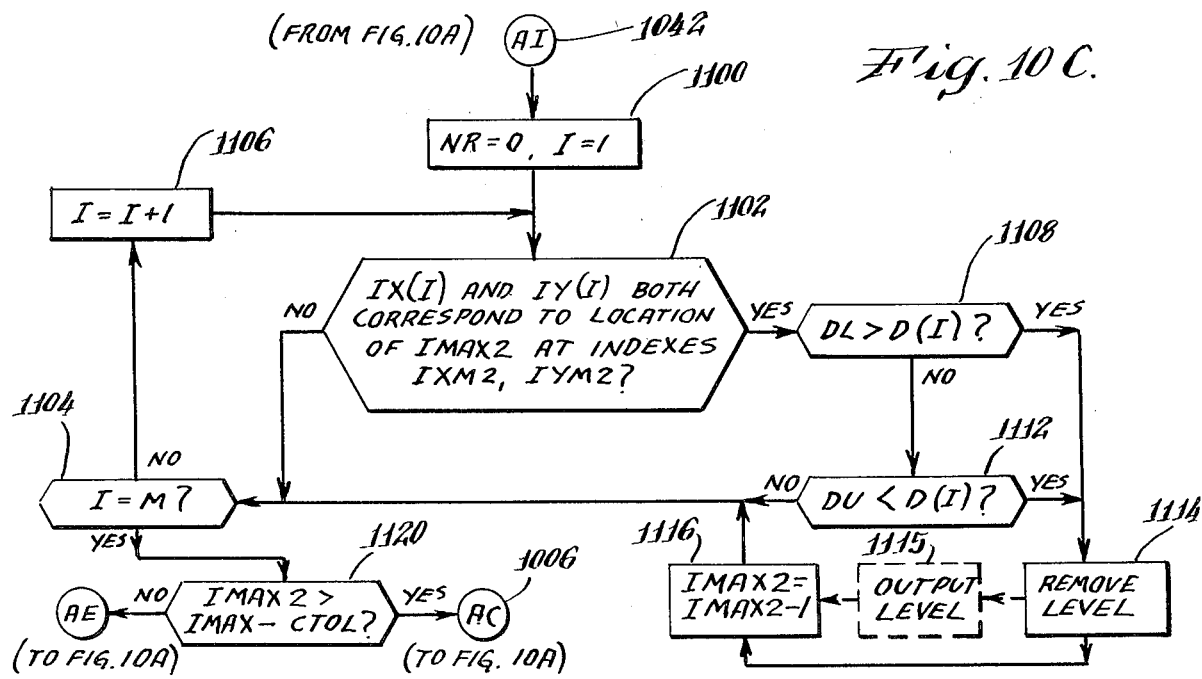

As with the tests indicated in Block 1055 of FIG. 10B, the tests indicated in Block 1102 of FIG. 10C answer NO when the instant dip measurement does not correspond to the dip measurement represented by the secondary mode as correspondence would be indicated by identical IX and IY addresses. When these tests answer NO, I is tested for the last measurement M, as shown in Block 1104, and if not, I is incremented to indicate the next measurement, as shown in Block 1106, and the above tests repeated with a new dip measurement.

When the Block 1102 tests answer YES, the dip measurements correspond to the secondary mode. Further testing, as indicated in Blocks 1108 and 1112, is now made to determine if the dip measurement corresponding to the secondary mode is from depths outside the lowest and highest extent, DL and DU, respectively, of the depth interval represented by the current maximum modes. If D(I) is less than DL, as shown in Block 1108, and greater than DU, as shown in Block 1112, these tests answer YES and the dip measurements do not belong to the depth interval associated with a dominant mode. Then, as indicated in Block 1114, these measurement levels are removed, at least temporarily, from the analysis since they may represent a different structural feature. IMAX2 is adjusted for each level removed, as indicated in Block 1116. The above process, as indicated by Blocks 1104 and 1106, then continues as if the previous tests answered NO until all of the M measurements have been processed, in which case the test indicated in Block 1104 answers YES.

Although it is possible to remove substantial numbers of measurements from secondary modes outside the depth interval of the current maximum mode by the above process, where for example, an inappropriate number or depth interval was first considered, enough levels may not have been removed to distinguish a dominant mode. A new evaluation of the current IMAX2 with IMAX-CTOL is indicated in Block 1120. CTOL is the number of dip measurements needed to distinguish a dominant mode from a secondary mode. If enough levels have been removed, this test answers NO and the process repeats again at Point AE of FIG. 10C to search for additional secondary maxima. These additional searches for secondary modes may be performed to assure that dip measurements associated with these secondary modes are also removed. If the above removal process is successful, the test indicated in Block 1034 will answer NO. The process will then continue to determine representative values for the now clearly dominant dip mode, as previously described beginning at Point AF in FIG. 10B.

If the search process finds additional secondary maxima, the process continues again at point AI of FIG. 10C, searching for and removing the dip measurements corresponding to these secondary maxima until either a dominant mode is uniquely separated from all secondary modes that may remain or a secondary maximum cannot be removed from the interval under analysis. In the latter case, the test indicated in Block 1120 would answer YES and the process would continue at point AC of FIG. 10C to begin a new analysis which may include additional dip measurements and a new interval.

An optional step is shown in FIG. 10C as Block 1115. As shown by the dashed lines including Block 1115 in the process, the dip and azimuth measurements as well as other desired characteristics correspond to the measurement levels removed because of their association with secondary modes, are output. As previously discussed, these measurements are frequently attributed to stratigraphic rather than structural figures. Thus, both the structural and stratigraphic information is distinguished and determined.

Referring once again to FIG. 10B, the outputting of the automatically determined extent of the depth interval and its representative dip and azimuth measurements, as indicated in Block 1074, may be followed as indicated by point AG to utilize these measurements. As indicated in FIG. 10B, point AG continues in FIG. 12A.

The process illustrated in FIG. 12A utilizes well known attributes of vector cross products and dot products, to analyze a number of dip vectors to determine the orientation of structural model elements. These model orientations may also be used in previously described processes, such as indicated in Block 330 of FIG. 3A, for example.

As the name implies, cross and dot products require the use of two vectors. Thus, when two or more representative dips have been determined by any of the previously described processes, and particularly by the processes illustrated in FIGS. 10A through 10C, a cross product may be computed to determine to what degree the vectors are in parallel planes. When three or more vectors produce two or more cross products, two cross products may be used to compute a dot product, which produces a number characterizing a common plane. It will be appreciated by those familiar with this art that such products equally consider variations in both dip and azimuth and that the common plane need not be vertical.

Measurement and computation errors are considered by testing the cross products and dot products against tolerance values PTOL and FTOL respectively. Thus, when a satisfactory approximation of a common plane for three or more dip measurements is found, certain simplified structural models may then be utilized to define a family of surfaces corresponding to these measurements. Further, orientation and the characterizing elements of these surfaces may be determined.

For example, when three or more dips are found to be parallel, no structure is indicated. However, if these dips are not parallel but are found to be contained in a common plane, cylindrical folding of the surfaces represented by the dip measurements is indicated. In such cases, the given surface may be represented by moving a single line, defined herein as the generatrix through a prescribed path. Thus, all surfaces are parallel to this generatrix. The curvature of this surface may be characterized as the path of generatrix. The orientation of this generatrix is given by the average of the normalized cross products of the dip measurement vectors or a vector normal to the dip vectors.

Once this has been done, a given surface is selected and the specific equation for this surface is expressed in terms of a three-dimensional coordinate system. One point on each surface is fixed by the depth of intersection of this surface with the borehole. The surface equation may then be solved to determine the position of any point on the selected surface at any distance or direction from the borehole intersection point. In this manner, a contour map or cross-section representing the surface at the borehole dip measurement point and extending away from the borehole may be produced.

Returning now to point AG of FIG. 12A for the details of the process, an initial determination as to the number NDR of dip measurements available is made as indicated in Block 1200. If only one dip is available, no further processing may be performed until an additional dip is available. Thus, the NDR is tested in Block 1200 and incremented, in this case as shown in Block 1206, to indicate additional representative dips are needed. As indicated, the processes may then return to point AD in FIG. 10B.

When two or more representative dips have been determined, as indicated by the test shown in Block 1200 answering YES, the first cross product may be computed. This cross product will be designated herein as CP(NDR). The cross product is computed from the previous (NDR-1) and the current (NDR) dip and azimuth measurements as previously described in regard to FIG. 11B. In the terms used in the FIG. 12A, cross products may be expressed as follows:

$$CP(NDR) = |\overline{U}(NDR-1) \cdot \overline{U}(NDR)| \qquad \text{Eq. (12)}$$

The components of the cross product may be derived by considering $\overline{U}_i = \overline{U}(NDR-1)$ and $\overline{U}_{i+1} = \overline{U}(NDR)$. Previously described equations (9I) through (9P) indicate the needed components in terms of $U_i$ and $U_{i+1}$.

The absolute value of the cross product is useful in determining whether there is any difference in the dip vectors used in its computation. Thus, as indicated in Block 1204 of FIG. 12A, this value is compared with the previously input parallelism tolerance PTOL which corresponds to the expected cross product for only small variations in a series of parallel planes. If the cross product does not exceed this tolerance, the test indicated in Block 1204 answers NO, and the model computations are restricted to surfaces which are parallel planes, as indicated in Block 1205. Accurate representative dip and azimuth values can be obtained in this case by summing the vector components already computed as in Block 1202 to obtain the vector sum $\overline{S}$ or vector average $\overline{U}_{av}$ as previously discussed in regard to Equations (9A) through (9D). Further, the steps indicated in regard to Blocks 1052, 1066, 1070 and 1072 of FIG. 10B may be used.

After fitting parallel planes, the process continues to point AS and then, as it would for the general case, the process returns to previously described Block 1206.

However, if the test indicated in Block 1204 answers YES, a non-planar structure is indicated. However, further processing requires at least three dips as indicated by NDR exceeding 2. If this is not the case, the test shown in Block 1210 answers NO and the process returns to point AS and to Block 1206 as before.

If the test answers YES, a dot product DCP of the two previously computed cross products may be computed at this time, as indicated in Block 1212. This computation has been previously discussed in regard to EQ.(9H) where the dot product of two unit vectors $\overline{U}_i$ and $\overline{U}_{i+1}$ was computed. Here, however, the unit vectors used in the computation are the last two unit cross product vectors $CP(NDR-1)$ and $CP(NDR)$. These components have already been computed as in Block 1202, but it should be noted that the components should be normalized before use in the dot product.

With the above considerations, the specific equation may be written as:

$$DCP = CP(NDR-1) \cdot CP(NDR) \qquad \text{EQ. (16)}$$

where
$X_1 = P_{xui}$, $X_{i+1} = P_{xui+1}$
$i = NDR-1$ and $i+1 = NDR$, etc.

The absolute value of this dot product may be compared with the difference from unity—indicating perfectly cylindrical folding—with a previously input tolerance FTOL, which is an allowed deviation from 1.

Thus, if the test indicated in Block 1214 answers YES, cylindrical folding is indicated and the process continues to Block 1220 for the determination of the generatrix. As indicated, the determination of the orientation of the generatrix may be accomplished by averaging the previous cross products.

As indicated in Block 1222, the surfaces represented by the dip measurements passing the above described tests are cylindrical. Each surface may be described as a family of lines parallel to the generatrix. However, to more completely define such a family of surfaces, the previously determined vectors may be curve fit in a plane normal to the generatrix as indicated in Block 1124 of FIG. 12A. A standard curve fit routine may be utilized here. Preferably, at least a second degree polynomial would be required.

At point AJ of FIG. 12A, the above process has determined that a number of dip measurements corresponding to formation features can be represented by a three-dimensional structural model. In this case, the model is a family of cylindrically folded surfaces intersecting the borehole at depths corresponding to the dip measurements with the dip of these surfaces tangent to the measured dip. The curvature of each surface is defined by a series of dip measurements having a common axial plane and which are regarded as samples taken at different points of several surfaces but each of which belong to the same family of surfaces and, therefore, define an equation for the curvature or generatrix path for the surface.

The above defined model may now be used in the processes described elsewhere and particularly in the process illustrated in FIG. 12B, which will now be described.

Referring now to FIG. 12B, the process illustrated in FIG. 12A may be continued at point AJ, shown in both figures. As indicated in FIG. 12B, one of the surfaces is selected as defined by the depth and dip of its borehole intersection, and a complete three-dimensional equation representative of this surface may now be solved as indicated in Block 1232.

With this solution, the cross sections representing this surface at any desired depth, distance or direction from the borehole may be produced. More particularly, contours representing the surface extending in all directions from the borehole may be generated at this time, as shown in Block 1260. If desired, additional surfaces may be selected, their equations solved and also contoured in accordance with the above described steps.

Returning now to Block 1214 of FIG. 12A, for the case where this test answered NO, indicating the surfaces are not cylindrical. Here, more than three different dip measurements will be required, as indicated when the test in Block 1238 answers YES. If not available, the process returns to point AS of FIG. 12A above, for additional measurements.

When a sufficient number have been obtained, as indicated by the Block 1238 test answering YES, the nature of the change of orientation of the generatrix with depth may be determined. For example, a model similar to that shown in FIG. 9C may be the case. As shown in Block 1242, these surfaces may be considered as being only locally cylindrical, with their generatrix having a different orientation for corresponding depth intervals. Thus, the curve fit indicated in Block 1244 employs the dip vectors representative of only the immediate depth interval.

Subsequent steps are similar to those for the cylindrical case, but now only consider the surfaces of the local generatrix as indicated in Blocks 1250 and 1252 of FIG. 12C. In either the family of cylindrical surfaces case or the local surface case, the process returns to common point AL in FIG. 12 with the complete solution for the equations describing a selected surface and the contouring of this surface as previously described in regard to Block 1260.

The above described processes may be varied in regard to the sequence of the specific steps, the use of trigonometric functions throughout rather than vectors, and in the use of more complex structural models when substantial numbers of dip variations allow the characterization of these more complex models. As a further example of modifications within the scope of this invention, when the test indicated in Block 1204 of FIG. 12A indicates a simple planar structure exists, the process can continue to Block 1205 previously described and then to point AL of FIG. 12B since all the information needed to contour such planes has already been determined at this point.

It will be appreciated that the above illustrated methods of determining representative dips for formation features; i.e., structural dips and further utilizing these dips to define structural models, need not be restricted to folded structures. For example, simple models where the surfaces are planes may be used. When these planes are not parallel, the test indicated at Block 1204 of FIG. 12A would answer YES, and when they dip in different directions, the test at Block 1214 would answer NO and a cylindrical surface could then be considered as indicated at Block 1242, but at Block 1244, the curve fit could restrict the sufaces to planes. In this case at Block 1244, each plane would have its own generatrix, and as such need not be parallel and in fact, may be considered to intersect, terminate at faults, etc.

Figure 4C:
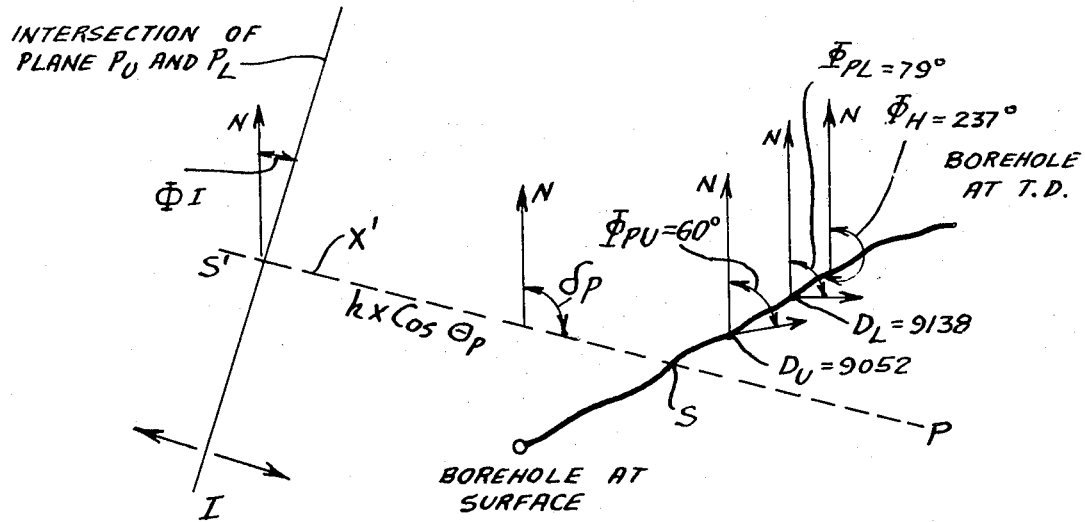
FIGS. 4C and 4D illustrate certain relationships between intersecting planes which allow their mapping from borehole dip measurements.
Figure 4D:
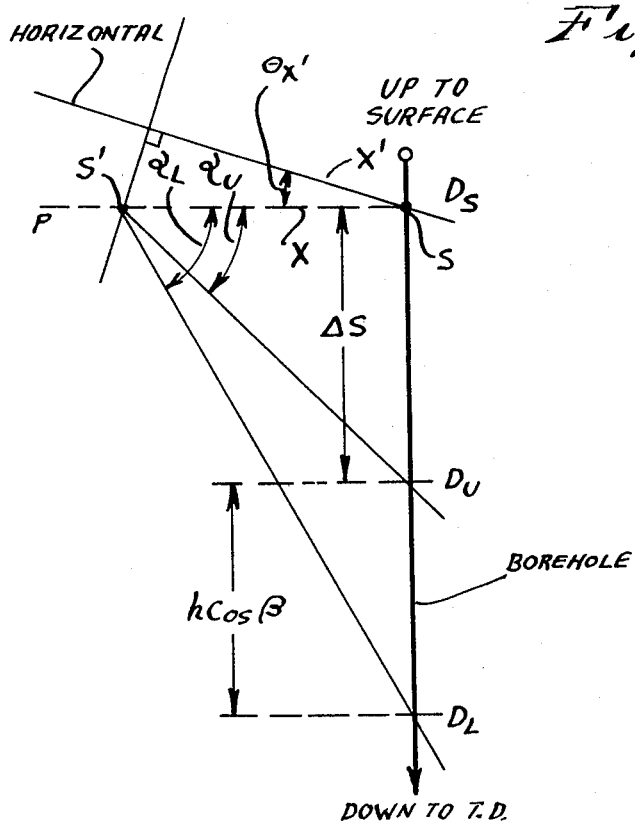

By way of example, refer now to FIG. 4C and FIG. 4D where there is illustrated the case of a structure consisting of two nonparallel planes (therefore intersecting) which dip in different directions (therefore the intersection line also dips).

Referring now to FIG. 4C (sheet 6) there is illustrated by example a method for computing certain characteristics of the above structural model. In this case, the model comprises two statistically representable planar surfaces which are not parallel and therefore assumed to intersect along a line I at a distance x from the borehole. In some instances, two dipmeter measurements may correspond to the dip of the nonparallel planes. It is preferred that analytical methods described herein be used to determine their representative dips, corresponding depths of their intersection, with the borehole and the orientation of the borehole between these intersections.

In FIG. 4C there is shown in a horizontal plane the traces of the borehole, the intersection line I and a special line P, which has the characteristics of being both normal to the intersection line and to the borehole, at least over an interval between the borehole intersection depths $D_U$ and $D_L$ of the two nonparallel planes, $P_U$ and $P_L$, respectively.

As indicated in FIG. 4C the borehole need not be vertical, and, in fact, frequently will vary substantially both in distance and direction from its surface location. Thus the borehole intersection depths $D_U$ and $D_L$ for the upper plane $P_U$ and lower plane $P_L$ are not superimposed one above the other as shown in FIG. 4C. The borehole interval between $D_U$ and $D_L$ may be approximated by a straight line having a known deviation $\delta$ from the vertical along an azimuth $\Phi_H$.

In the example shown in FIGS. 4C and 4D the depth of intersection for planes $P_U$ and $P_L$ are indicated as $D_U = 9052$ and $D_L = 9138$, respectively. FIG. 4D illustrates a view normal to the intersection line I. Note that this plane may not be vertical. Thus, the dip angles for planes $P_U$ and $P_L$ will not appear as true dips in FIG. 4D in such cases. Also note that the scale of FIG. 4C is not the same as in FIG. 4D. As usually is the case, the borehole will not be normal to the intersection line and therefore will not appear in true projection in a plane normal to the intersection line. Accordingly, the line lengths shown in FIG. 4D are represented as distances only for purposes of illustration. However, the corresponding trigonometric corrections are provided.

Also, the angles measured in the plane illustrated in FIG. 4D; i.e., normal to the line I are not referenced to their usual horizontal or vertical lines.

It will be appreciated that once the orientations are determined; i.e., the dip $\Theta$ and azimuth $\Phi$, for the intersection line and the special line P, which allows the distance x corresponding to the closest approach of the borehole to the intersection line to be projected in true length, the angular differences $\alpha_U$ and $\alpha_L$ between line P and the true dip values for planes $D_U$ and $D_L$; i.e., as they would appear in a plane normal to the intersection I, may be determined. Also, the angular dip difference $\beta$ between the borehole and a plane normal to line I may be determined.

With these angular differences, the needed distances x and $\Delta S$ may be computed by well known trigonometric relations such as those shown on FIG. 4D. Further, with the orientation of the intersection line I, the distance x and its horizontal projection x' determined, contour lines or cross-section traces may be terminated accurately. However, since the determination of these angular differences and distances may become quite complex when the borehole deviates substantially from the vertical and the intersecting planes dip in different directions, a procedure for these determinations will now be described which utilizes processes illustrated in FIGS. 10A and 12A. Of course, such procedures may readily be programmed and implemented on a general purpose digital computer.

These two dip and azimuth measurements representative of the planes $P_U$ and $P_L$ are converted into dip vectors $\overline{U}_i$ and $\overline{U}_{i+1}$ by methods previously described herein in regard to Blocks 1024 (FIG. 10A) or 1205 (FIG. 12A). In a similar manner the borehole deviation and deviation azimuth are converted into a unit vector $\overline{H}$ pointing uphole. The cross product $\overline{U}_i \times \overline{U}_{i+1}$ is determined as described in regard to Block 1202 of FIG. 12A and FIG. 11B, and provides the vector $\overline{I}$, corresponding to the line of intersection. The absolute value of $\overline{I}$ provides the sign of the angular difference $\alpha$ between the upper and lower planes and measured in the plane normal to line I. The azimuth of the horizontal projection of the line I is given by the arctangent of the ratio $P_{yu}/P_{xu}$ where these terms are defined by Equations (9N) and (9M), respectively and described herein in regard to the description of Block 1202 of FIG. 12A.

As previously discussed, it is also necessary to determine the angular difference $\beta$ between the borehole and a special line P so that the true length of a line x corresponding to a point of closest approach of the borehole to the intersection line 1 may be determined. In a process similar to that described above, the cross product $\overline{P}$ is determined between the unit vector for the borehole $\overline{H}$ and the normalized intersection line vector $\overline{I}_N$. Here $\overline{I}_N$ is found by division with its absolute value. The absolute value of this cross product $\overline{P}, \overline{H} \times \overline{I}_N$ is equal to the Cos $(\beta)$.

The method of computing dot products has been previously described in regard to Block 1212 of FIG. 12B and FIG. 11B. The dot product of the normalized cross produce vector $\overline{P}_N$ (normalized by division with its absolute value as in the case of $\overline{I}$ above) with the dip vector $\overline{U}_i$ for the upper plane yields the Sin $(\alpha_U)$, where $\alpha_U$ is the angular difference between line x and plane $P_U$. In a similar manner, Sin $(\alpha_L)$, where $\alpha_L$ is the angular difference between line x and plane $P_L$ is found from the dot product of the normalized cross product vector $\overline{P}_N$ with the dip vector $\overline{U}_{i+1}$, the latter being for the lower boundary. From Sin $(\alpha)$, Tan $\alpha$ may be computed from $$\frac{\sin(\alpha)}{\sqrt{(1 - \sin^2(\alpha))}}.$$

This determination is made for both $\alpha_U$ and $\alpha_L$.

Referring again to FIG. 4D which shows the above determined angular differences, it can be seen now that the above steps have provided the information necessary for a complete solution of two intersecting planes. The distance x is now computed from the equation:

$$x = \frac{h \cos(\beta)}{\tan(\alpha_L) - \tan(\alpha_U)}$$

Here, h corresponds to the difference in borehole depths between the intersections of the planes. The horizontal distance x' corresponding to the distance x of closest approach as given by the equation $x' = x \sqrt{(P_{xu})^2 + (P_{yu})^2}$ where $P_{xu}$ and $P_{yu}$ are defined by EQS. (9M) and (9N), previously described. The azimuth $\Phi_x$ of line x is given by the equation $\Phi_x = \text{Tan}^{-1}(P_{uy}/P_{ux})$.

In the example given in FIG. 4C, the following results may be found. At Block 1202 of FIG. 12A, the unit vector $\overline{I}$ is found from the cross product of $\overline{U}_i$ and $\overline{U}_{i+1}$ with EQ. (12) or (9H) and defined $\Theta = 24°$, $\Phi_I = 200°$. Similarly when applied to $\overline{H}_N$ and $\overline{I}_N$, $\overline{H}_N \times \overline{I}_N$ now defines $\overline{P}$ with $\overline{P} = \cos(\beta)$ as 0.809 $(\beta = 36°)$.

At Block 1212 of FIG. 12A, Equation (16) applied to $P \times U_i$ then defines Sin $(\alpha_U)$ and when applied to $P \times \overline{U}_{i+1}$ defines Sin $(\alpha_L)$, which respectively define tan $(\alpha_U) = 0.485$ and tan $(\alpha_L) = 0.966$ $(\alpha_U = 29°$ and $\alpha_L = 44°)$.

At Block 1240 and 1242 a separate generatrix for each plane at depths $D_U$ and $D_L$ is defined normal to the azimuth of their dips. The curve fits at Block 1244 are equations for planes terminating at line I, which is located a horizontal distance $x' = 141.9$ feet along line P from the borehole intersection at $S = 8965$.

At Block 1250, either plane may be selected and contoured at Block 1260.

In terms of the process illustrated in FIG. 7, the structural model information needed for input as at Block 726 of FIG. 7 to determine the equations for either of the planes $P_U$ and $P_L$, as shown at Block 728 of FIG. 7 is complete for this case. More particularly, the equation for the intersection line I is now defined in terms of its x and y coordinates. Therefore, it is obvious that the equation indicated at Block 754 and the test at Block 756 of FIG. 7 may be now defined in accordance with this line. With these modifications, the process illustrated and described in regard to FIG. 7 may be used to determine contour lines corresponding to one of the planes.

These and other modifications may also be made at other points in the process to better utilize the direct determination of the orientation of the intersection line I obtained by the above described process. For example, the depth of the intersection line I at the point of its intersection with line x may be determined through trigonometric relations characterizing the vector $\overline{P}$ and the intersection depth $D_S$ of the line x with the borehole.

Figure 8E:
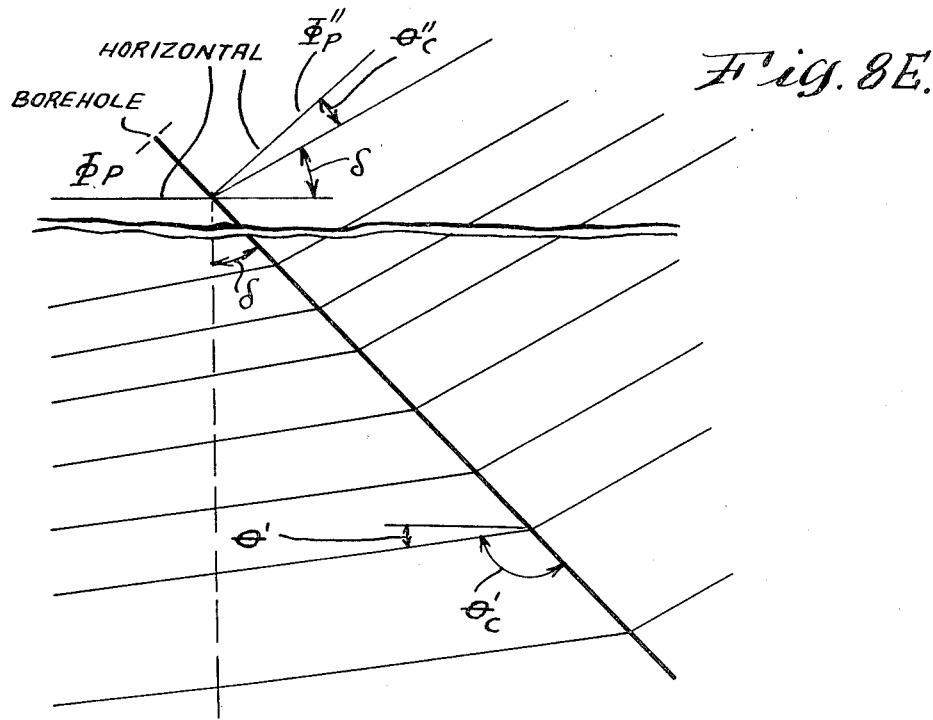
FIG. 8E illustrates a three-dimensional representation of formation features in which one of the planes is inclined from vertical to include a deviated borehole.
Figure 9A:
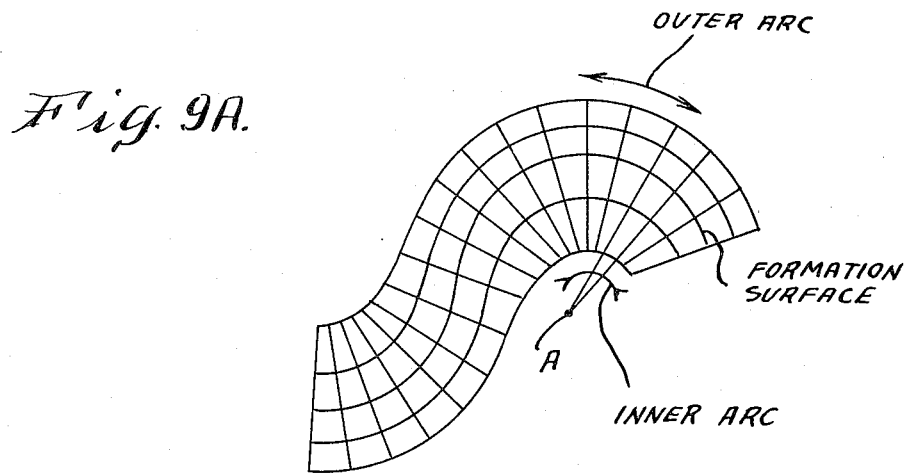
FIG. 9A shows a structural model with surfaces which are cylindrical and concentrically folded about a common axis.
Figure 9B:
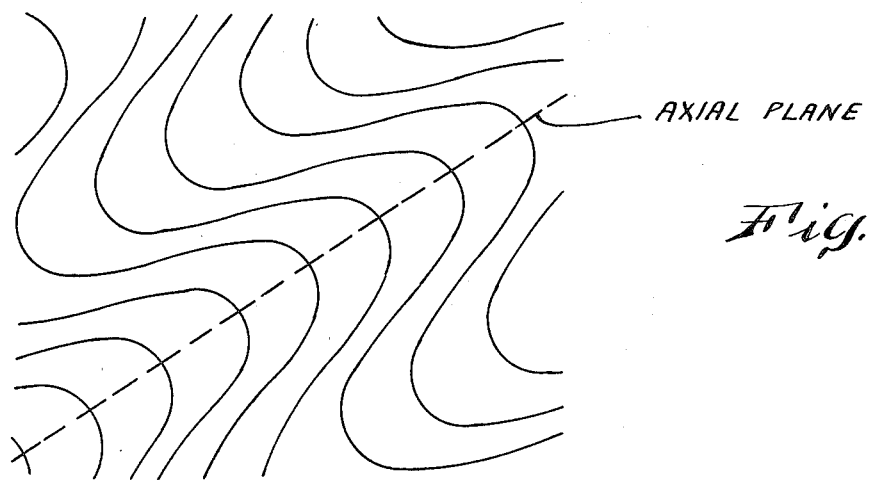
FIG. 9B shows a structural model of cylindrical surfaces which are folded parallel to one another along an axial plane.
Figure 9C:
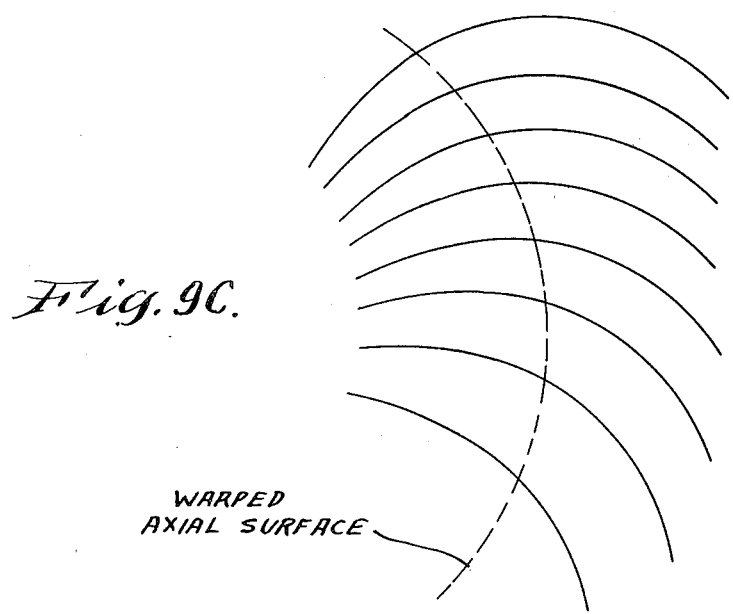
FIG. 9C shows a structural model having cylindrical surfaces in which the axial surface is warped.

As an additional example of the use of structural models produced as described above in regard to FIGS. 12A and 12B, consider the family of tilted parallel planes illustrated in FIG. 8E. Now, however, a borehole is deviated substantially from vertical and it is desired to consider the structure with respect to the borehole in order to determine its structural position.

In accordance with this invention, a three-dimensional representation may be produced of the apparent dip representations in two planes which include the borehole but are not necessarily vertical. In this case the azimuths of the apparent dips along $\Phi_P$ and $\Phi_{P'}$ are determined by the deviation and azimuth of the borehole. Preferably $\Phi_P$ = the azimuth of the deviation and the apparent dips traces correspond to intersections of the family of planes with a vertical plane aligned along $\Phi_P$. The traces on the other side of the borehole, now however, correspond to intersections of apparent dips along $\Phi_{P''}$ with a plane aligned along $\Phi_{P''}$ but inclined from vertical by an angle $\delta$ equal to the borehole deviation. In this case the apparent dips along $\Phi_{P'}$ are derived by first converting, by well known rotation techniques, the true dips and azimuth measurements to those that would be apparent from the inclined borehole and adjusting the apparent dips computed from the converted dips by the borehole deviation angle.

The above conversion technique may be applied as well to other cases, of inclined section planes. For example, where the borehole is vertical but the intersection line between the planes is not. In this manner, the sections shown in FIG. 4A may also be made. Thus, the three-dimensional representation of FIG. 8E would represent the upthrown block and the tilted plane along $\Phi_{P''}$ would represent the plane of the fault.

Still further, when the structural model of both fault blocks such as shown in FIG. 4A have been defined, the true dips and thereby the apparent dip of both fault blocks may be represented. In this case the gap g would also be known. Thus, the apparent dip trace computed for the borehole intersection in one plane would be extended to the intersection line between the two planes aligned along $\Phi_P$ and $\Phi_{P''}$. Here this intersection corresponds to the fault plane intersection as well. The above rotation technique may be used to convert the true dips to those that would be apparent along the inclined intersection line. The apparent dip trace is then displaced by the amount g corresponding to the fault displacement and continued into the next plane but now at an apparent dip for the other of the two fault separated blocks.

The usefulness of a contour map, or cross-sections produced with the processes illustrated herein will be further appreciated if the following related information is considered. Referring to a structure such as shown in FIG. 4D, for example, assume only a show of hydrocarbons was found at $D_L$ in a formation corresponding to $P_L$. Further assume formation $P_L$ pinches out to form a structural trap at its intersection with $P_U$. In such a case, a good hydrocarbon prospect would be formation $P_L$ just below its pinchout at intersection line I.

From FIGS. 4C and 4D, it will be appreciated that a sidetrack of the borehole toward the line I will intersect $P_U$ and $P_L$ at much shallower depths. It is now clear that the sidetrack must be started well above depth $D_S$ and that the horizontal borehole deviation toward line I must be less than x' or the desired prospect will be missed.

In accordance with the preceding description, methods and apparatus for automatically producing three-dimensional representations of formation features from dip and azimuth measurements in a borehole have been disclosed.

The three-dimensional representations are of several forms. In one form a cross-section is produced with traces representing the formation features as they would appear at different depths at the intersection of a substantially vertical plane. Planar formation features are indicated in the cross-section as straight line traces while folded features are indicated by curved traces indicating the changes in dip and depth with distance from the borehole in the direction of the cross-section plane.

In another form, the three-dimensional representations are structural models defined by a sequence of different dip and azimuth measurements such that surfaces in the model are tangent to a representative dip for a formation feature at its borehole intersections. Visual representations of a formation feature in the three-dimensional model may take the form of a contour map of the formation feature, which also indicates changes in dip and depth with distance from the borehole but are now unrestricted to the direction of a particular plane or planes.

In a further form, the three-dimensional representations of formation features are produced by computing a dip vector representation of the dip and azimuth measurements and representing these vectors as points on a three-dimensional spherical surface which has been divided into equal areas. A three-dimensional representation in a two-dimensional coordinate system is produced which preserves the equal-area property by appropriate transformation of the location of the points. The number of points falling in each equal area is determined. A listing of these numbers at positions corresponding to the transformed two-dimensional coordinate system produces a three-dimensional representation of the number of dip vectors in each equal area.

Another form of the invention utilizes the above representation of the three-dimensional equal area sphere to perform an analysis of the variations in both dip and azimuth measurements to determine a function of a structure common to a distribution mode for the measurements over one interval. In a specific variation thereof, the distribution mode is a maximum frequency mode representative of the structural dip for a borehole interval automatically defined by the members of the mode and distinguished from other modes, within or without the defined interval.

The above analysis is also performed to determine structural dips for a sequence of automatically determined depth intervals. These structural dips and depth intervals are also input as dips representative of formation features in the other processes described herein.

What is claimed is:

1. A method of automatically producing with a machine three-dimensional representations of formation features from measurements indicative of dip and azimuth in a borehole beneath the earth's surface, comprising:
    (a) computing apparent dip representations in a given azimuth from dip and azimuth measurements of formation features at various depths;
    (b) computing apparent dip representations in a different given azimuth from said dip and azimuth measurements at said depths; and
    (c) producing as a function of said depths a three-dimensional representation of the apparent dip representations computed in both of the given azimuths.

2. The method of claim 1 wherein said step of producing a three-dimensional representation further includes the step of producing apparent dip representations in the form of traces corresponding to the intersections of the formation features with planes aligned in the directions of the given azimuths.

3. The method of claim 2 wherein said step of producing a three-dimensional representation further includes the step of producing a representation of the intersection line between the two planes each aligned in one of the directions of the two given azimuths and positioning apparent dip traces corresponding to the intersections of the formation features with these planes on their respective sides of the representation of the intersection line.

4. The method of claim 3 and further including the step of producing a representation of a borehole intersecting the representation of the intersection line at a fixed depth and angle.

5. The method of claim 4 wherein the plane aligned in the direction of one of the given azimuths is substantially vertical and the plane aligned in the direction of the other given azimuth is fixed at a given deviation from the vertical plane.

6. The method of claim 5 wherein the step of positioning apparent dip traces corresponding to the intersections of formation features further includes positioning the traces at points along the borehole representation corresponding to the respective depths of their dip and azimuth measurements.

7. The method of claim 6 wherein the step of positioning apparent dip traces further includes the step of displacing the positions of traces corresponding to the formation features on one side of the representation of the intersection line by a displacement corresponding to a given displacement along the representation of the intersection line.

8. The method of claim 7 wherein the step of producing a representation of a borehole further includes referencing the borehole to a known position in the three-dimensional representation and adjusting said borehole representation for borehole deviations from said position.

9. The method of claim 8 and further including the step of correcting the borehole depths of the dip and azimuth measurements for borehole deviations from a vertical line.

10. The method of claim 3 wherein the two planes are each aligned substantially parallel to the borehole and said representation of the intersection line between the two planes thereby corresponds to a representation of the borehole.

11. The method of claim 10 wherein the step of producing apparent dip representations in the form of apparent dip traces corresponding to the intersections of formation features further includes the step of positioning these traces at points along the borehole representation corresponding to the respective borehole depths of the selected dip and azimuth measurements.

12. A method of automatically producing with a machine three-dimensional representations of formation features from measurements indicative of dip and azimuth in a borehole beneath the earth's surface, comprising:
   (a) providing a structural model representing changes in dip and azimuth values;
   (b) selecting a dip and azimuth measurement of a formation feature at the borehole;
   (c) computing for the selected measurement the apparent dip representation with distance from the borehole in a given azimuth in accordance with the structural model; and
   (d) producing a three-dimensional representation of the apparent dip representation in the form of a trace corresponding to the intersection of the formation feature with a plane aligned in the direction of the given azimuth.

13. The method of claim 12 and further including the steps of selecting additional dip and azimuth measurements of formation features at the borehole; computing their apparent dip representations with distance from the borehole in a given azimuth in accordance with the determined structural model; and producing additional three-dimensional representations of apparent dip representations in the form of traces corresponding to the intersections of the formation features with a plane aligned in the direction of the given azimuth.

14. The method of claim 13 and further including the step of producing a representation of the borehole, said traces intersecting the representation of the borehole at the respective depths of the selected dip and azimuth measurements.

15. A method of automatically producing with a machine three-dimensional representations of formation features from measurements indicative of dip and azimuth in a borehole beneath the earth's surface, comprising:
   (a) providing a structural model representing changes in dip and azimuth values;
   (b) selecting a dip and azimuth measurement of a formation feature at the borehole;
   (c) computing for the selected measurement the apparent dip representations with distance from the borehole in two given azimuths in accordance with the structural model; and
   (d) producing a three-dimensional representation of the computed dip representations with distance from the borehole in the given azimuths.

16. The method of claim 15 wherein said step of producing a three-dimensional representation further includes the step of producing apparent dip representations in the form of a trace corresponding to the intersections of the formation feature with planes aligned in the directions of the given azimuths.

17. The method of claim 16 and further including the steps of selecting additional dip and azimuth measurements of formation features at the borehole; computing additional apparent dip representations with distance from the borehole in the two given azimuths in accordance with the structural model; and producing additional apparent dip representations in the three-dimensional representation in the form of traces corresponding to the intersections of the formation features with said planes aligned in the directions of the given azimuths.

18. The method of claim 17 wherein said step of producing a three-dimensional representation further includes the step of producing a representation of the intersection line between the two planes each aligned in one of the azimuths of the two given azimuths and positioning the apparent dip traces corresponding to the intersection of the formation features with each plane on its respective side of the representation of the intersection line.

19. The method of claim 18, and further including the step of producing a representation of a borehole intersecting the representation of the intersection line at a fixed depth and angle.

20. The method of claim 19 wherein the plane aligned in the direction of one of the given azimuths is substantially vertical and the plane aligned in the direction of the other given azimuth is fixed at a given deviation from the vertical plane.

21. The method of claim 20 wherein the step of positioning the apparent dip traces corresponding to the intersections of formation features further includes positioning the traces at points along the borehole representation corresponding to the respective depths of their dip and azimuth measurements.

22. The method of claim 21 wherein the step of positioning the apparent dip traces further includes the step of displacing the position of traces corresponding to the formation feature on one side of the representation of the intersection line by a displacement corresponding to a given displacement along the representation of the intersection line.

23. The method of claim 22 wherein the step of producing a representation of a borehole further includes referencing the borehole to a known position in the three-dimensional representation and adjusting said borehole representation for borehole deviations from said position.

24. The method of claim 23 and further including the steps of selecting additional dip and azimuth measurements of formation features; computing apparent dip representations with distance from the borehole in the given azimuths in accordance with the structural model; and producing additional apparent dip representations in the three-dimensional representation in the form of traces corresponding to the intersections of the formation features with said planes aligned in the directions of the given azimuths, said traces intersecting the borehole representations at points along the borehole representation corresponding to the respective depths of the selected additional dip and azimuth measurements.

25. The method of claim 23 wherein the step of providing a structural model includes producing structural dip and azimuth values and the corresponding locations of borehole intersections of a formation feature; and determining a structural model common to the structural dip and azimuth values.

26. The method of claim 25 wherein the step of producing representative dip and azimuth values further includes the steps of analyzing dip and azimuth measurements of formation features from a sequence of depths to determine a dominant mode for such measurements, and computing the structural dip and azimuth values and corresponding depth interval for the dominant mode.

27. The method of claim 15 and further including the steps of selecting as a surface in the structural model a dip and azimuth measurement of a formation at the borehole; computing the position of a characteristic of the surface in accordance with the structural model; and producing a three-dimensional representation of the characteristic of the surface in the form of a trace corresponding to a constant value of the characteristic at the computed position.

28. The method of claim 27 and further including the steps of computing the position of an additional characteristic of the surface in accordance with the structural model and producing additional representations of the characteristic of the surface in the form of additional traces corresponding to a constant value of the additional characteristic at the computed position for this characteristic.

29. The method of claim 28 wherein the step of providing a structural model includes producing structural dip and azimuth values and the corresponding locations of borehole intersections of a formation feature; and determining a structural model common to the structural dip and azimuth values.

30. The method of claim 29 wherein the step of producing representative dip and azimuth values further includes the steps of analyzing dip and azimuth measurements of formation features from a sequence of depths to determine a dominant mode for such measurements, and computing the structural dip and azimuth values and corresponding depth interval for the dominant mode.

31. A method of automatically producing with a machine three-dimensional representations of formation features from measurements indicative of dip and azimuth in a borehole beneath the earth's surface, comprising:
(a) providing a structural model representing changes in dip and azimuth values;
(b) selecting as a surface in the structural model a dip and azimuth measurement of a formation feature at the borehole;
(c) computing the position of a characteristic of the formation feature surface in accordance with the structural model; and
(d) producing a three-dimensional representation of the characteristic of the surface in the form of a trace corresponding to a constant value of the characteristic at the computed position.

32. The method of claim 31 and further including the steps of computing the position of an additional characteristic of the surface in accordance with the structural model and producing additional representations of the characteristic of the surface in the form of additional traces corresponding to a constant value of the additional characteristic of the computed position for this characteristic.

33. The method of claim 32 wherein the step of providing a structural model includes producing structural dip and azimuth values and the corresponding locations of borehole intersections of formation features; and determining a structural model common to the structural dip and azimuth values.

34. The method of claim 33 wherein the step of producing representative dip and azimuth values further includes the steps of analyzing dip and azimuth measurements of formation features from a sequence of depths to determine a dominant mode for such measurements; and computing the structural dip and azimuth values and corresponding depth interval for the dominant mode.

35. A method of automatically producing with a machine three-dimensional representations of formation features from measurements indicative of dip and azimuth in a borehole beneath the earth's surface, comprising:
(a) providing representative dip and azimuth values and the corresponding locations of borehole intersections of a number of formation features;
(b) computing three-dimensional components representative of the dip and azimuth values;
(c) combining said components to determine the degree and direction of any common components;
(d) selecting equations for models composed of a family of surfaces most characteristic of the common components; and
(e) fitting the selected equations to the components to provide a structural model for the family of surfaces; which represent changes in dip and azimuth;
and further including the steps of selecting as a surface in the structural model a dip and azimuth measurement of a formation feature at the borehole; computing the position of a characteristic of the formation feature surface in accordance with the structural model; and producing a three-dimensional representation of the characteristic of the surface in the form of a trace corresponding to a constant value of the characteristic at the computed position.

36. The method of claim 35 and further including the steps of computing the position of an additional characteristic of the surface in accordance with the structural model and producing additional representations of the characteristic of the surface in the form of additional traces corresponding to a constant value of the additional characteristic at the computed position for this characteristic.

37. The method of claim 36 wherein the step of fitting the selected equations includes determining a structural model common to a provided location of a borehole intersection.

38. The method of claim 44 wherein the step of providing representative dip and azimuth values further includes the steps of analyzing dip and azimuth measurements of formation features from a sequence of depths to determine a dominant mode for such measurements; and computing the structural dip and azimuth values and corresponding depth interval for the dominant mode.

39. A method of automatically producing with a machine three-dimensional representations of formation features for measurements indicative of dip and azimuth in a borehole beneath the earth's surface, comprising:
(a) providing representative dip and azimuth values and the corresponding locations of borehole intersections of a number of formation features;
(b) computing three-dimensional components representative of the dip and azimuth values;
(c) combining said components to determine the degree and direction of any common components;
(d) selecting equations for models composed of a family of surfaces most characteristic of the common components; and (e) fitting the selected equations to the components to provide a structural model for the family of surfaces; which represent changes in dip and azimuth; and further including the steps of selecting a dip and azimuth measurement of a formation feature at the borehole; computing the apparent dip representation with distance from the borehole in a given azimuth in accordance with the structural model; and producing a three-dimensional representation of an apparent dip representation in the form of a trace corresponding to the intersection of the formation feature with a plane aligned in the direction of the given azimuth.

40. The method of claim 39 and further including the steps of selecting additional dip and azimuth measurements of formation features at the borehole; computing their apparent dip representations with distance from the borehole in a given azimuth in accordance with the structural model; and producing additional three-dimensional representations of apparent dip representations in the form of traces corresponding to the intersections of the formation features with a plane aligned in the direction of the given azimuth.

41. The method of claim 40 and further including the step of producing a representation of the borehole, said traces intersecting the representation of the borehole at the respective depths of the selected dip and azimuth measurements.

42. A method of automatically producing with a machine three-dimensional representations of formation features from measurements indicative of dip and azimuth in a borehole beneath the earth's surface, comprising:
(a) providing representative dip and azimuth values and the corresponding locations of borehole intersections of a number of formation features;
(b) computing three-dimensional components representative of the dip and azimuth values;
(c) combining said components to determine the degree and direction of any common components;
(d) selecting equations for models composed of a family of surfaces most characteristic of the common components; and
(e) fitting the selected equations to the components to provide a structural model for the family of surfaces; which represent changes in dip and azimuth; and further including the steps of selecting a dip and azimuth measurement of a formation feature at the borehole; computing the apparent dip representations with distance from the borehole in two given azimuths in accordance with the structural model; and producing a three-dimensional representation of the computed dip representations with distance from the borehole in the given azimuths.

43. The method of claim 42 wherein said step of producing a three-dimensional representation further includes the step of producing apparent dip representations in the form of a trace corresponding to the intersections of the formation feature with planes aligned in the directions of the given azimuths.

44. The method of claim 43 and further including the steps of selecting additional dip and azimuth measurements of formation features at the borehole; computing additional apparent dip representations with distance from the borehole in the two given azimuths in accordance with the structural model; and producing additional apparent dip representations in the three-dimensional representation in the form of traces corresponding to the intersections of the formation features with said planes aligned in the directions of the given azimuths.

45. An apparatus for automatically producing three-dimensional representations of formation features from measurements indicative of dip and azimuth in a borehole beneath the earth's surface comprising:
(a) means for computing apparent dip representations in two different given azimuths from dip and azimuth measurements of formation features at various depths; and
(b) means responsive to said computed representations for producing as a function of said depths a three-dimensional representation of the apparent dip representations in the form of traces corresponding to the intersections of the formation features with planes aligned in the directions of said given azimuths.

46. An apparatus for automatically producing three-dimensional representations of formation features from measurements indicative of dip and azimuth in a borehole beneath the earth's surface, comprising:
(a) means for providing a structural model representing changes in dip and azimuth values;
(b) means responsive to said model for selecting a dip and azimuth measurement of a formation feature at the borehole and computing for said measurement the apparent dip representation with distance from the borehole in a given azimuth in accordance with the structural model; and
(c) means responsive to said computations for producing a three-dimensional representation of said apparent dip representation in the form of a trace corresponding to the intersection of the formation feature with a plane aligned in the direction of the given azimuth.

* * * * *